(12) United States Patent
Fitzgerald

(10) Patent No.: US 11,242,162 B2
(45) Date of Patent: Feb. 8, 2022

(54) METHODS AND APPARATUS FOR IN-SITU MEASUREMENTS OF ATMOSPHERIC DENSITY

(71) Applicant: Massachusetts Institute of Technology, Cambridge, MA (US)

(72) Inventor: Riley Fitzgerald, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 364 days.

(21) Appl. No.: 16/366,851

(22) Filed: Mar. 27, 2019

(65) Prior Publication Data

US 2019/0300208 A1    Oct. 3, 2019

Related U.S. Application Data

(60) Provisional application No. 62/648,521, filed on Mar. 27, 2018.

(51) Int. Cl.
*B64G 1/24*     (2006.01)
*B64G 1/22*     (2006.01)
(Continued)

(52) U.S. Cl.
CPC ........... *B64G 1/244* (2019.05); *B64G 1/1021* (2013.01); *B64G 1/222* (2013.01); *B64G 1/24* (2013.01);
(Continued)

(58) Field of Classification Search
CPC ...... B64G 1/244; B64G 1/222; B64G 1/1021; B64G 1/283; B64G 1/286; B64G 1/24;
(Continued)

(56) References Cited

U.S. PATENT DOCUMENTS 2,817,209 A * 12/1957 Besserer, Jr. ........... F02C 7/042
138/46
3,171,962 A *  3/1965 Ballinger ................ G01L 21/30
250/336.1
(Continued)

FOREIGN PATENT DOCUMENTS

CN     102422179 A  *  4/2012    ........... G01N 21/538
CN     103793618 A  *  5/2014
(Continued)

OTHER PUBLICATIONS

Analog Devices, "Low Profile Six Degree of Freedom Inertial Sensor," ADIS16334 datasheet, 2013. 20 pages.
(Continued)

*Primary Examiner* — Behrang Badii
*Assistant Examiner* — Jalal C Coduroglu
(74) *Attorney, Agent, or Firm* — Smith Baluch LLP

(57) ABSTRACT

A satellite in orbit around a planetary body includes a bus and a drag flap coupled to the bus. The drag flap is used to increase the drag torque applied to the satellite. The bus may house sensors and actuators, such as a star tracker, a gyroscope, a reaction wheel, and a global position system (GPS) receiver to monitor the attitude of the satellite in response to the applied drag torque. The measurements from the sensors and actuators may be used to determine the drag torque applied to the satellite. An estimate of the atmospheric density may be then be determined based on the drag torque. Compared to conventional approaches, the satellite and methods described herein estimates the atmospheric density at comparable, if not better, resolution and bandwidth. The atmospheric density estimates may also be acquired in real-time using a cheaper, lighter, and smaller satellite.

33 Claims, 32 Drawing Sheets

| Sensor Type | COTS Part Reference | 1-sigma noise | Discretization | Sample Frequency | Bias Drift |
|---|---|---|---|---|---|
| Star Tracker | NST-1 | 2.33 arcsec | 1 arcsec | 10 Hz | - |
| Horizon Sens. | MAI-SES | 0.25 deg | 0.01 deg | 1000 Hz | - |
| MEMS Gyro | ADIS16334 | 0.19 deg/s | 0.0125 deg/s | 1000 Hz | 0.0072 deg/s |
| RW Rate Sens. | - | 5 deg/s | 5 deg/s | 1000 Hz | - |
| GPS (Position) | piNAV-L1 | 5 m | 1 mm | 1 Hz | - |
| GPS (Velocity) | piNAV-L1 | 0.05 m/s | 1 mm/s | 1 Hz | - |

(51) Int. Cl.
  *B64G 1/10* (2006.01)
  *B64G 1/28* (2006.01)
  *G01N 9/00* (2006.01)
  *B64G 1/36* (2006.01)

(52) U.S. Cl.
  CPC ............. *B64G 1/283* (2013.01); *B64G 1/286* (2013.01); *B64G 1/361* (2013.01); *G01N 9/00* (2013.01); *B64G 2001/1028* (2013.01); *B64G 2001/245* (2013.01); *B64G 2700/24* (2013.01)

(58) Field of Classification Search
  CPC .............. B64G 1/361; B64G 2001/245; B64G 2001/1028; B64G 2700/24; B64G 1/242; B64G 1/365; B64G 3/00; B64G 1/288; B64G 1/36; B64G 1/10; G01N 9/00
  See application file for complete search history.

(56) References Cited

U.S. PATENT DOCUMENTS

| | | | | |
|---|---|---|---|---|
| 4,757,200 | A * | 7/1988 | Shepherd | G01S 17/89 250/332 |
| 5,042,752 | A * | 8/1991 | Surauer | B64G 1/244 244/164 |
| 5,269,483 | A * | 12/1993 | Flament | B64G 1/285 244/164 |
| 5,703,278 | A * | 12/1997 | Murphy, Jr. | G01N 9/04 73/30.01 |
| 5,779,195 | A | 7/1998 | Basuthakur et al. | |
| 5,960,097 | A * | 9/1999 | Pfeiffer | G06K 9/3241 382/103 |
| 6,085,128 | A | 7/2000 | Middour et al. | |
| 6,116,544 | A * | 9/2000 | Forward | B64G 1/421 244/158.2 |
| 6,126,117 | A * | 10/2000 | Sekine | B64G 1/244 244/164 |
| 6,236,939 | B1 * | 5/2001 | Wu | B64G 1/361 244/164 |
| 6,370,475 | B1 * | 4/2002 | Breed | G01S 13/931 701/301 |
| 6,405,132 | B1 * | 6/2002 | Breed | G01S 7/4802 701/301 |
| 6,477,468 | B1 * | 11/2002 | Dahlke | G01W 1/10 702/3 |
| 6,526,352 | B1 * | 2/2003 | Breed | G01S 19/14 701/470 |
| 6,843,446 | B2 | 1/2005 | Scott | |
| 8,370,064 | B1 * | 2/2013 | Li | G01C 21/165 701/479 |
| 2002/0198632 | A1 * | 12/2002 | Breed | G08G 1/164 701/1 |
| 2003/0048229 | A1 * | 3/2003 | Schmid | H01Q 1/125 343/757 |
| 2003/0191568 | A1 * | 10/2003 | Breed | B60W 40/06 701/36 |
| 2004/0133350 | A1 * | 7/2004 | Veneruso | H03H 17/06 702/6 |
| 2004/0135375 | A1 * | 7/2004 | Wobben | F03D 7/0272 290/44 |
| 2004/0148068 | A1 * | 7/2004 | Fowell | B64G 1/361 701/13 |
| 2005/0060069 | A1 * | 3/2005 | Breed | G08G 1/164 701/408 |
| 2005/0060092 | A1 * | 3/2005 | Hablani | B64G 1/288 701/472 |
| 2005/0134440 | A1 * | 6/2005 | Breed | G01S 17/931 340/435 |
| 2007/0247354 | A1 * | 10/2007 | Garin | G01S 19/258 342/357.66 |
| 2008/0032571 | A1 * | 2/2008 | Dudek | B60F 3/0007 440/12.5 |
| 2010/0161284 | A1 * | 6/2010 | Wright | A61K 31/24 702/190 |
| 2012/0086606 | A1 * | 4/2012 | Mathews | G01C 21/165 342/461 |
| 2014/0232592 | A1 * | 8/2014 | Psiaki | G01S 19/42 342/357.25 |
| 2014/0249753 | A1 * | 9/2014 | Brown | G01V 99/00 702/2 |
| 2014/0275850 | A1 * | 9/2014 | Venkatraman | A61B 5/318 600/301 |
| 2014/0354477 | A1 * | 12/2014 | Robinson | B64G 1/36 342/357.78 |
| 2015/0001345 | A1 * | 1/2015 | Polle | B64G 1/283 244/158.6 |
| 2016/0318601 | A1 * | 11/2016 | Arnold | B64C 9/12 |
| 2017/0102467 | A1 * | 4/2017 | Nielsen | G01S 19/47 |
| 2017/0283095 | A1 | 10/2017 | Koehler et al. | |
| 2019/0049998 | A1 * | 2/2019 | Weiss | B64G 1/26 |
| 2020/0108951 | A1 * | 4/2020 | Cahoy | F03G 7/065 |
| 2020/0158862 | A1 * | 5/2020 | Mahmoud | G01C 21/30 |
| 2020/0256678 | A1 * | 8/2020 | Li | G01C 21/165 |

FOREIGN PATENT DOCUMENTS

| | | | |
|---|---|---|---|
| CN | 105629986 | A * | 6/2016 |
| CN | 105629986 | B * | 6/2017 |
| WO | WO-2017162197 | A1 * | 9/2017 ............. B64C 19/02 |

OTHER PUBLICATIONS

Bowman et al., "Drag coefficient variability at 175-500 km from the orbit decay analyses of spheres." Paper AAS 05-257 presented at the AIAA/AAS Astrodynamics Specialist Conference. Lake Tahoe, California. 2005. 20 pages.
Bowman et al., "High Accuracy Satellite Drag Model (HASDM) Review." AAS/AIAA Astrodynamics Specialist Conference, Aug. 2003. AAS 03-625. 10 pages.
Bruinsma et al., "Atmospheric densities derived from CHAMP/STAR accelerometer observations." Planetary and Space Science 52.4 (2004): 297-312. 16 pages.
Bryson, Applied optimal control: optimization, estimation and control. Routledge, 2018. 2 pages.
Harris et al., "Atmospheric Structure and Its Variation in the Region from 120 to 800 Km," COSPAR International Reference Atmosphere (CIRA) 1965, Space Research IV, North Holland Publishing Co., Amsterdam. 209 pages.
Henry, "SpaceX, OneWeb detail constellation plans to Congress." Space News. Retrieved from http://spacenews.com/spacex-oneweb-detail-constellation-plans-to-congress. Nov. 1, 2017. 5 pages.
Hinks et al., "Simultaneous orbit and atmospheric density estimation for a satellite constellation." AIAA/AAS Astrodynamics Specialist Conference. 2010. 27 pages.
International Search Report and Written Opinion in International Application No. PCT/US19/24374 dated Jun. 20, 2019, 18 pages.
Koehler et al., Drag and Atmospheric Neutral Density Explorer (DANDE). Colorado Univ at Boulder, 2009. 17 pages.
Lee et al., "Estimating Torque Imparted on Spacecraft Using Telemetry." (2013). Accessed at https://ntrs.nasa.gov/archive/nasa/casi.ntrs.nasa.gov/20130009417.pdf. 1 page.
Maryland Aerospace, "MAI-SES," MAI-SES datasheet. 2016. Accessed at https://www.cubesatshop.com/wp-content/uploads/2016/06/MAI-SES-Specifications-20150928.pdf. 1 page.
Mazarico, Study of the Martian upper atmosphere using radio tracking data. Diss. Massachusetts Institute of Technology, 2008. 268 pages.
Norman et al., "In-orbit estimation of inertia and momentum-actuator alignment parameters." Journal of Guidance, Control, and Dynamics 34.6 (2011): 1798-1814.
Oltrogge et al., "An evaluation of cubesat orbital decay." (2011). 25th Annual AIAA/USU Conference on Small Satellites. 12 pages.
Pilinski et al., "An innovative method for measuring drag on small satellites." (2009). 23rd Annual AIAA/USU Conference on Small Satellites. 12 pages.
Pollaine et al., Measuring spherical harmonic coefficients on a sphere. No. UCRL-JC-152280. Lawrence Livermore National Lab. (LLNL), Livermore, CA (United States), 2003. 16 pages.

(56) References Cited

OTHER PUBLICATIONS

Shoemaker et al., "Atmospheric density reconstruction using satellite orbit tomography." Journal of Guidance, Control, and Dynamics38.4 (2014): 685-698.
Sinclair Interplanetary, "Picosatellite Reaction Wheels," RW-0.01 datasheet. 2016. Accessed at http://www.sinclairinterplanetary.com/reactionwheels. 2 pages.
SkyFox Labs, "Space-Friendly Ultra Low Power CubeSat GPS Receiver," piNAV-L1 datasheet, Rev. H, 2017. 17 pages.
Tapley et al., "Neutral density measurements from the gravity recovery and climate experiment accelerometers." Journal of Spacecraft and Rockets 44.6 (2007): 1220-1225. 6 pages.
Tighe et al., "In-orbit measurements of the Columbus lab vacuum environment using the MEDET pressure gauge." ISMSE-11, Int. Symp. on Materials in Space Environment. 2009. 5 pages.
TY-Space (Beijing) Ltd. "Nano Star Tracker NST-1," NST-1 datasheet. 2016. Accessed at http://www.ty-space.com/en/. 2 pages.
Vallado, "An analysis of state vector propagation using differing flight dynamics programs." Paper AAS 05-199 presented at the AAS/AIAA Space Flight Mechanics Conference. Copper Mountain, CO. 2005. 33 pages.
Von Engeln et al., "Using CHAMP radio occultation data to determine the top altitude of the planetary boundary layer." Geophysical research letters 32.6 (2005). 4 pages.
Walker, "Satellite Constellations." Journal of the British Interplanetary Society, vol. 37, Dec. 1984, pp. 559-572.
Wertz et al., "Spacecraft Attitude Determination and Control," Astrophysics and Space Science Library, vol. 73. pp. 571-573. Kluwer Academic Publishers. 1978. 7 pages.
Woodman, An introduction to inertial navigation. No. UCAM-CL-TR-696. University of Cambridge, Computer Laboratory, 2007. 37 pages.
Young, "Determination of Atmospheric Density in Low-Earth Orbit Using GPS Data," U.S.N.A. Trident Scholar project report, No. 287, 2001. 90 pages.
Ziebart, "Generalized analytical solar radiation pressure modeling algorithm for spacecraft of complex shape." Journal of spacecraft and rockets 41.5 (2004): 840-848.

* cited by examiner

| Sensor Type | COTS Part Reference | 1-sigma noise | Discretization | Sample Frequency | Bias Drift |
|---|---|---|---|---|---|
| Star Tracker | NST-1 | 2.33 arcsec | 1 arcsec | 10 Hz | - |
| Horizon Sens. | MAI-SES | 0.25 deg | 0.01 deg | 1000 Hz | - |
| MEMS Gyro | ADIS16334 | 0.19 deg/s | 0.0125 deg/s | 1000 Hz | 0.0072 deg/s |
| RW Rate Sens. | - | 5 deg/s | 5 deg/s | 1000 Hz | - |
| GPS (Position) | piNAV-L1 | 5 m | 1 mm | 1 Hz | - |
| GPS (Velocity) | piNAV-L1 | 0.05 m/s | 1 mm/s | 1 Hz | - |

FIG. 3

| Spacecraft Parameter | Symbol | Value | Notes |
|---|---|---|---|
| Reaction Wheel Mass | $m_{rw}$ | 0.050kg | — |
| Reaction Wheel MOI | $J_{rw}$ | $2.8 \times 10^{-5}$ kgm$^2$ | — |
| Spacecraft Body Mass | $m_{body}$ | 1.0kg | Not including reaction wheel |
| Spacecraft Body MOI | $J_{body}$ | $3.0 \times 10^{-3}$ kgm$^2$ | Not including reaction wheel |
| Body Cube Dimension | $d_{body}$ | 10cm | Cubesat standard body size |
| Flap Dimension | $d_{flap}$ | 10cm | — |
| Flap Thickness | $t_{flap}$ | 1.0mm | — |
| Flap Mass | $m_{flap}$ | 0.010kg | — |
| Drag Arm Length | $L_{arm}$ | 0.525m | From body center to flap center |
| Drag Arm Diameter | $D_{arm}$ | 2.0mm | — |
| Drag Arm Mass | $m_{arm}$ | 0.031kg | — |

FIG. 7C

| Estimator Parameter | Symbol | Value | Notes / Motivation |
|---|---|---|---|
| Torque Error Integrator Gain | $k_\tau$ | $2\pi/60$ | Reflects 1min$^{-1}$ bandwidth system goal |
| Angular Acceleration Filter BW | $\omega_\theta$ | $2\pi/12$ | Tuned value necessarily faster than $\omega_\tau$ |
| External Torque Filter BW | $\omega_\tau$ | $2\pi/60$ | Reflects 1min$^{-1}$ bandwidth system goal |
| Gyro Bias Correction BW | $\omega_B$ | $2\pi/100$ | Reflects typical bias drift time of 100s |
| θ Process Deviation | $\sigma_{x_1}$ | $5 \times 10^{-3}$ | Tuned to reflect error in θ estimate |
| θ Process Deviation | $\sigma_{x_2}$ | $1 \times 10^{-3}$ | Approximate max deviation of $\tau_{ex}/J_{sat}$ |
| $\omega_{rw}$ Process Deviation | $\sigma_{x_3}$ | $5 \times 10^{-10}$ | Tuned, reflects predictability of $\omega_{rw}$ |
| $\tau_{rw}$ Process Deviation | $\sigma_{x_4}$ | $1 \times 10^{-6}$ | Tuned, reflects uncertainty in $k_{rw}$ |

FIG. 10B

| Error Subject | Error Type | Value | Notes |
|---|---|---|---|
| Satellite Moment of Inertia | Relative | 0.02% $J_{sat}$ | Limited by RW noise |
| Reaction Wheel MOI | Relative | <1 × 10-6 $J_{rw}$ | — |
| Gyroscope Bias Estimate | RMSE | <3 × 10$^{-5}$ rad/s | < 25% $\Delta B$ |
|  | Maximum | <1 × 10$^{-4}$ rad/s | — |
| $\rho_1$ $\tau_{ex}$ Estimation Error | RMSE | 7.7 × 10$^{-6}$ Nm | — |
|  | Relative | 2.5% $\tau_{ex}$ Amplitude | — |
| $\rho_1$ Estimation Error | RMSE | 1.3 × 10$^{-13}$ kg/m³ | ~ $\rho$ variation at 740km |
|  | Relative | 1.3% $\rho_1$ Amplitude | — |
| $\rho_2$ $\tau_{ex}$ Estimation Error | RMSE | 3.5 × 10$^{-8}$ Nm | — |
|  | Relative | 5.0% $\tau_{ex}$ Amplitude | — |
| $\rho_2$ Estimation Error | RMSE | 1.0 × 10$^{-13}$ kg/m³ | ~ $\rho$ variation at 740km |
|  | Relative | 5.0% $\rho_2$ Amplitude | — |
| Desaturation Flip Downtime | Absolute | 120s/flip | — |
|  | Relative | 0.4% operation | — |
| Desaturation Flip $\rho^*$ Error | Relative | 4 RMSE($\rho^*$) | During known time |
| -3dB $^{\wedge}\rho$ Estimation Bandwidth | Absolute | 1min$^{-1}$ | Above 90orbit$^{-1}$ |
| -3dB Point Phase Margin | Absolute | 95° | — |
| Optimal Walker constellation configuration: | | $\ell_{max}$ is even | |
| | | $i = 90° \left(1 - \frac{1}{\ell_{max}+1}\right)$ | |
| | | $t = \left\lceil \sqrt{\frac{p}{p_{needed}}} \right\rceil (\ell_{max}+1)$ | |
| | | $p = \ell_{max} + 1$ | |
| | | $f \neq 0$ | |
| Density test map reconstruction error: | | O (1%) | With 20% 3σ TF error |

FIG. 15

METHODS AND APPARATUS FOR IN-SITU MEASUREMENTS OF ATMOSPHERIC DENSITY

CROSS-REFERENCE TO RELATED PATENT APPLICATION

This application claims priority, under 35 U.S.C. § 119(e), to U.S. Application No. 62/648,521, filed on Mar. 27, 2018, entitled "METHOD FOR LOW-COST IN-SITU POINT MEASUREMENTS OF ATMOSPHERIC DENSITY IN LOW EARTH ORBIT," which is incorporated herein by reference in its entirety.

BACKGROUND

The current push towards the commercialization of space has expanded the utilization of satellites deployed in low Earth orbit (LEO). As more satellites are deployed in this space, accurate orbital forecasting is becoming increasingly important. In particular, the position and orbit of each satellite should be tracked and/or predicted with greater accuracy in order to ensure safe usage of this space, especially as commercial constellations of hundreds or thousands of small satellites in LEO become more common. The accuracy of orbital forecasting, however, is dependent, in part, on accurate predictions of LEO perturbations. Typically, one of the largest contributors to orbital propagation error in low orbits is atmospheric drag, which can vary significantly with altitude, latitude, and solar activity.

SUMMARY

The Inventors have recognized and appreciated accurate and real-time orbital forecasting can enable safer deployment of satellites, especially in LEO, where commercial constellations of hundreds or thousands of satellites are becoming more common. However, the Inventors have also recognized that conventional approaches are typically unable to simultaneously provide accurate and real-time estimates of the atmospheric density. Furthermore, conventional approaches often rely upon specialized high-precision instrumentation or ground-based systems, which increase system complexity, the cost, and the payload size.

The present disclosure is thus directed to various inventive apparatuses and methods for estimating the atmospheric density. In one example, a satellite (also referred to herein as the "Satellite Producing Aerodynamic Torque to Understand LEO Atmosphere (SPATULA)") includes a bus and a drag flap coupled to the bus where the drag flap is configured to deploy during an orbit to subject the satellite to a drag torque about a first axis passing through the bus of the satellite. The drag flap may include a moment arm and a drag panel. The drag flap may have a proximal end coupled to the bus and a distal end coupled to the drag panel. The drag flap is configured to deploy during orbit to subject the satellite to a drag torque about a first axis of the satellite. The bus may include a reaction wheel to measure a reaction wheel angular velocity output, a star tracker to measure a star tracker output, a gyroscope to measure a gyroscope output, and a global position system (GPS) receiver to measure a position and a velocity of the satellite. The satellite may also include a processor configured to execute a method of estimating the atmospheric density described below.

In some implementations, the satellite is not coupled to a tracking system or a processor on the ground. In some implementations, the satellite does not include a magnetic torquer or a thruster to desaturate the reaction wheel.

An exemplary method of estimating the atmospheric density using a satellite includes the following steps: (A) operating the satellite during the orbit to subject the satellite to a significant external torque, (B) determining the external torque to which the satellite is subjected during the orbit, and (C) estimating the atmospheric density proximate to the satellite based at least in part on the external torque determined in (B).

In some implementations, the satellite may include a bus and a drag flap coupled to the bus. In some implementations, step (A) includes (A1) deploying the drag flap during the orbit to subject the satellite to a drag torque about a first axis passing through the bus of the satellite, the significant external torque comprising the drag torque. The drag flap may include a moment arm having a proximal end coupled to the bus and a distal end and a drag panel coupled to the distal end of the moment arm, where in (A1), the moment arm has a length such that a significant angular acceleration of the satellite is generated about the first axis per unit drag force applied to the flap and the moment arm has a natural frequency greater than or equal to about 1 min$^{-1}$. The drag flap may have a proximal end coupled to the bus and a distal end where the proximal end and the distal end of the drag flap define a longitudinal axis of the drag flap and (A1) includes deploying the drag flap such that the longitudinal axis of the drag flap is substantially parallel to a gravitational gradient.

The satellite may also include a reaction wheel such that (A) includes after (A1), (A2) applying a first torque to the satellite about the first axis, via the reaction wheel, to counteract the external torque to which the satellite is subjected so as to substantially mitigate rotation of the satellite about the first axis. In some implementations, the step (A) may further include the following steps: (A1) deploying the drag flap such that the longitudinal axis of the drag flap is in a plane perpendicular to the first axis and is positioned at a first angle of rotation about the first axis, during (A2), a first angular momentum of the reaction wheel about the first axis increases until reaching a first saturation point, (A3) upon the first angular momentum of the reaction wheel about the first axis reaching the saturation point, allowing the satellite to rotate about the first axis to reposition the drag flap in the plane perpendicular to the first axis at a second angle of rotation about the first axis so as to desaturate the first angular momentum of the reaction wheel about the first axis, (A4) applying a second torque to the satellite about the first axis, via the reaction wheel, to counteract the external torque to which the satellite is subjected so as to substantially mitigate rotation of the satellite about the first axis, wherein during (A4), a second angular momentum of the reaction wheel about the first axis increases until reaching a second saturation point, (A5) upon the second angular momentum of the reaction wheel about the first axis reaching the second saturation point, allowing the satellite to rotate about the first axis to reposition the drag flap in the plane perpendicular to the first axis at the first angle of rotation about the first axis so as to desaturate the second angular momentum of the reaction wheel about the first axis, and (A6) repeating step (A2).

In some implementations, the satellite may include a star tracker, a gyroscope, and a reaction wheel and step (B) includes the following: (B1) estimating a moment of inertia of the satellite and a moment of inertia of the reaction wheel, (B2) applying a Kalman filter to the moment of inertia of the satellite from (B1), the moment of inertia of the reaction wheel from (B1), and a measurement vector to determine an attitude state of the satellite where the measurement vector comprises a star tracker output, a gyroscope output, and a reaction wheel angular velocity output and the attitude state of the satellite comprises an angular position of the satellite, an angular velocity of the satellite, a reaction wheel angular velocity, and a reaction wheel torque of the reaction wheel, (B3) determining an angular acceleration of the satellite based on the angular velocity of the satellite determined in (B2), (B4) determining a net torque on the satellite as the product of the angular acceleration determined in (B2) and the moment of inertia of the satellite determined in (B1), and (B5) determining the external torque to which the satellite is subjected during the orbit by subtracting the reaction wheel torque determined in (B2) from the net torque determined in (B4).

In some implementations, the method described may further include between (B1) and (B2), the following: applying a first low-pass filter transfer function to the star tracker output to obtain a filtered star tracker output, applying a second low-pass filter transfer function to the gyroscope output to obtain a filtered gyroscope output, determining a time derivative of the filtered gyroscope output, subtracting the filtered star tracker output from the time derivative of the filtered gyroscope output to obtain a bias estimate, subtracting the bias estimate from the gyroscope output to obtain a corrected gyroscope output, and using the corrected gyroscope output in the measurement vector in place of the gyroscope output.

In some implementations, the step of estimating the moment of inertia of the satellite and the moment of inertia of the reaction wheel in (B1) includes: (B1a) applying a first torque to the satellite, (B1b) measuring the gyroscope output as a function of time during (B1a) to determine a first angular acceleration of the satellite, (B1c) measuring the reaction wheel angular velocity output as a function of time during (B1a) to determine a first angular acceleration of the reaction wheel, (B1d) applying a second torque to the satellite, the second torque being substantially similar in magnitude with the first torque and in a direction substantially opposite to the first torque, (B1e) measuring the gyroscope output as a function of time during (B1d) to determine a second angular acceleration of the satellite, (B1f) measuring the reaction wheel angular velocity output as a function of time during (B1d) to determine a second angular acceleration of the reaction wheel, (B1g) dividing an average of the respective magnitudes of the first torque and the second torque applied in (B1a) and (B1d), respectively, by an average of the first angular acceleration determined of the satellite in (B1b) and the second angular acceleration of the satellite determined in (B1e) to estimate the moment of inertia of the satellite, (B1h) dividing an average of the respective magnitudes of the first torque and the second torque applied in (B1a) and (B1d), respectively, by an average of the first angular acceleration determined of the reaction wheel in (B1c) and the second angular acceleration of the reaction wheel determined in (B1f) to estimate the moment of inertia of the satellite.

In some implementations, the step (C) includes the following: (C1) measuring a position and a velocity of the satellite, (C2) determining a solar radiation pressure torque and a gravity gradient torque from the position and the velocity measured in (C1) and the attitude state in (B2), and (C3) determining a drag torque applied to the satellite by subtracting the solar radiation pressure torque and the gravity gradient torque determined in (C2) from the external torque measured in (B).

In some implementations the satellite may be a cubesat. In some implementations, the estimated atmospheric density has a root mean square (RMS) error ranging between about $1 \times 10^{-13}$ kg/m$^3$ to about $2 \times 10^{-12}$ kg/m$^3$. In some implementations, the estimated atmospheric density has a bandwidth ranging between about 0.03 min$^{-1}$ to about 1 min$^{-1}$.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3 shows a table of the type of sensors used in the satellite and exemplary noise and discretization parameters.

FIG. 7C shows a table of physical parameters for the exemplary satellite of FIG. 7B.

FIG. 10B shows a table of tuning parameters and values of the attitude and external torque estimators.

FIG. 15 shows a table summarizing the atmospheric density estimates and density map reconstruction tests for several cases.

DETAILED DESCRIPTION

In low Earth orbit (LEO), the perturbations that most significantly affect orbital propagation error are (1) the $J_2$ effects, which are caused by the non-sphericity of the Earth, (2) atmospheric drag, and (3) other third-body effects and gravity potential terms. Gravitational effects, despite their complexity, are predictable based on the position of the satellite and third bodies. Thus, in practice, the greatest errors in predicting the orbit of a satellite are due to the uncertainties of atmospheric drag effects.

Although several models have been developed to simulate and predict the effects of atmospheric drag, often to great precision, the use of accurate real-time measurements of atmospheric drag can better reduce orbital propagation errors caused by unpredictable weather, space weather events, or any other dynamic atmospheric phenomena not captured by the aforementioned models. For example, solar particle events, solar flares, and variations in solar activity due to the solar cycle may greatly affect the overall atmospheric density in LEO. Additionally, the dynamics of tides and waves within the atmosphere can further cause local deviation in atmospheric drag effects from values predicted by developed models. Measurements of atmospheric drag effects may also be used as the basis for new and/or improved thermospheric models of the atmosphere as well.

However, measurements of atmospheric drag are quite challenging, especially in-situ, because such measurements are typically based, in part, on measurements of the atmospheric density, which is small in LEO (e.g., on the order of grams per kilometer cubed). One conventional approach is to measure the drag force applied to the satellite by measuring the effects of the drag force on the satellite orbit. From the drag force, the atmospheric density can be extracted. In this manner, the atmospheric density can be used to predict the effects of atmospheric drag on other satellites in LEO. Although the atmospheric density in LEO is small, a satellite in LEO is typically traveling at high orbital velocities (e.g., on the order of 7.5 km/s in LEO), thus producing appreciable drag forces that can be measured. However, real-time measurements of the drag force applied to a satellite are difficult due to other perturbing forces applied to the satellite, which may be substantially greater in magnitude compared to the drag force. In this application, real-time is defined as being able to measure a detectable change in atmospheric density at a particular location in the atmosphere on a time scale of about 1 minute.

Figure 1A:
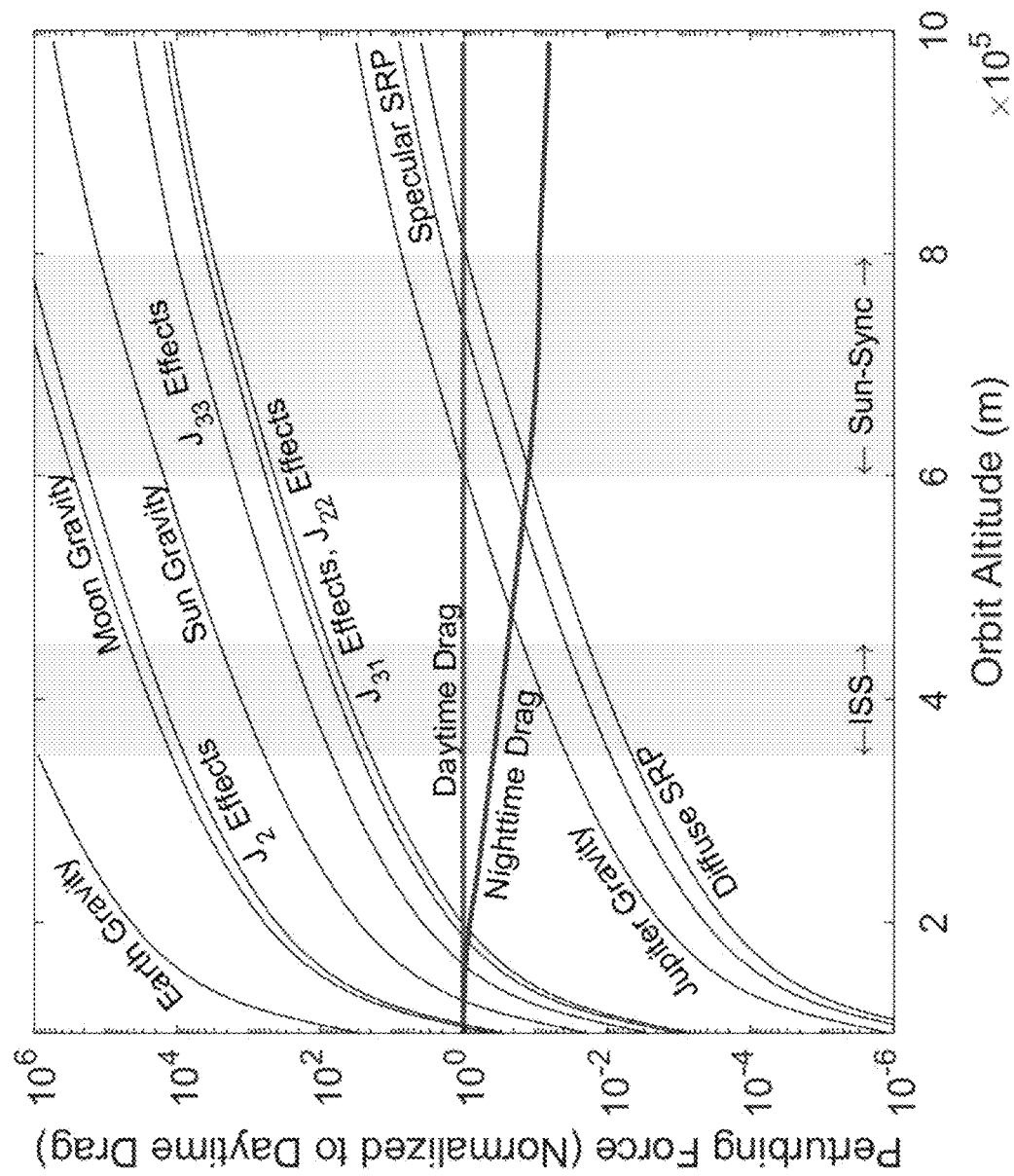
FIG. 1A shows the relative magnitudes of perturbing forces experienced by a typical cubesat in LEO. The values are normalized by the largest daytime drag at a particular altitude calculated by the Harris-Priester atmospheric mode. All perturbations are evaluated under worst case conditions.

FIG. 1A shows the magnitude of various perturbation forces normalized to the largest daytime drag predicted by the Harris-Priester atmospheric mode as a function of altitude. The various perturbation forces were evaluated under worst-case conditions. As shown, perturbation forces caused by gravitational potential terms and third-body effects may be orders of magnitude larger than the drag force. As a result, accurate measurements of the drag force are typically not possible without proper compensation and prediction of these other perturbing forces. Nevertheless, several approaches to measure the atmospheric density based on the drag force have been previously demonstrated.

Conventional Approach 1: Accelerometer-Based Systems

One conventional approach to measure the drag force in-situ is based on the use of high precision accelerometers deployed in the satellite. For example, the Drag And Neutral Density Explorer (DANDE) satellite proposed by the Colorado Space Grant Consortium and University of Colorado at Boulder was designed to produce in-situ density measurements in the LEO region at an altitude of about 350 km altitude. DANDE was a 50 kg spherical satellite, which used six high-precision accelerometers to directly measure the deceleration of the satellite caused by drag. However, the accelerometer system was of sufficient size to prohibit deployment in smaller sized satellites (e.g., cube-sat class satellites). In terms of performance, DANDE was designed to provide a horizontal resolution of 500 km, corresponding to about 64 s of along-track time. This approximately 60-second temporal resolution was set by the cadence of the accelerometer output. The overall error of the system was predicted to be approximately $2 \times 10^{-12}$ kg/m$^3$, when accounting for changes to the cross sectional area, wind, and drag coefficient.

Other examples of an accelerometer-based satellite system are the Challenging Minisatellite Payload (CHAMP) satellite and the Gravity Recovery And Climate Experiment (GRACE) satellite, which are both similar in design. CHAMP and GRACE each carry a high-precision accelerometer, the Space Three-axis Accelerometer for Research (STAR) and SuperSTAR, respectively. Both satellite systems enabled accurate estimates of the atmospheric density, but the accelerometer data used were calibrated and processed on the ground thus making these measurements ex-situ. The STAR data from CHAMP was shown to be sufficiently accurate to map the global density distribution over the course of a day, in part, because the acceleration measurement has a precision of approximately $1 \times 10^{-9}$ g. Although other sources of acceleration were modeled and subtracted, the resulting density data was able to follow predictive models within a few percent error when available. The density data also showed complex polar transients not predicted by the model. The CHAMP satellite was also able to estimate the atmospheric density via radio occultation, but this measurement technique can only sense neutral density up to 60-80 km in altitude, which is far under the normal operating range of LEO satellites.

The GRACE satellite was used primarily to measure the gravitational potential field of the Earth using, in part, microwave ranging between the two satellites. The SuperSTAR accelerometers, however, also enabled the satellite to estimate non-gravitational forces to high accuracy. The accelerometer data produced by these accelerometers was offloaded to the ground, where the data was then processed to produce a measurement of the drag force. The accelerometers were able to measure at 3 Hz with a listed acceleration precision of $1 \times 10^{-12}$ g. Although the measurement was precise, the measurement also tended to be subject to noise (e.g., from other forces on the satellite) that should be calibrated separately on the ground. The GRACE satellite was able to estimate density data that followed predictive models from $5 \times 10^{-13}$ kg/m$^3$ to $3 \times 10^{-12}$ kg/m$^3$, showing fast transient deviations from predicted models.

Although these satellite systems estimated atmospheric density data accurately, the high-precision accelerometers used by the satellites were very specialized and, hence, expensive instruments as well as large in size thus limiting their use in smaller, less expensive satellite systems (e.g., cubesat class satellites). Furthermore, the data recorded by the accelerometer-based satellites had to be processed separately on the ground to yield useful estimates, thus adding additional infrastructure costs and system complexity.

Conventional Approach 2: High-Vacuum Gauges

Another conventional approach to estimate the atmospheric density and, hence, atmospheric drag is through the use of high-vacuum gauges. Vacuum gauge technologies have been developed with the capability of measuring the atmospheric pressure in LEO. For example, Tighe et al. demonstrated the use of a cold-cathode discharge vacuum gauge on orbit. The gauge was disposed on the ram face of the Columbus Laboratory on the ISS. This gauge was able to measure the atmospheric pressure on orbit and the diurnal variation.

However, the pressure data recorded by the gauge cannot be simply converted into atmospheric density. First, the pressure measurements taken by the high-vacuum gauge showed a strong dependence on the attitude of the gauge. For instance, the pressure varied by several orders of magnitude when the station was reoriented such that the gauge was oriented along the anti-ram direction (i.e., opposite to the ram direction). Second, the diurnal pressure variation is not only a function of the density change, but may also depend on temperature variations caused by solar heating. Measurements of gas temperature are also challenging since the atmosphere is in the free-molecular flow regime in LEO. These effects, combined with the large size and expense of the precision high-vacuum gauge, make the use of high-vacuum gauges unsuitable for low-cost, small satellite systems.

Conventional Approach 3: Constellation Communication

Yet another conventional approach to estimate atmospheric density is to use a constellation of satellites in orbit. Specifically, atmospheric drag effects can be measured by precisely tracking the position of each satellite in the constellation relative to one another. This may be accomplished by carefully-controlled communication between the satellites in orbit. Another, more common method is to use a global positioning system (GPS), which provides a simple, standardized measurement of the position and the velocity of each satellite. The position and velocity data of each satellite in the constellation may be used to determine atmospheric drag effects. However, since the external forces applied to each satellite are small, the effects of the external forces on the position and velocity of the satellite are comparatively small relative to the noise of a typical GPS system. In practice, a GPS-based constellation of satellites can only estimate the atmospheric density averaged over an orbit of the satellite. Finer measurements of atmospheric density (e.g., along a shorter section of the satellite's orbit) are typically limited by the noise in the GPS data. Additionally, GPS receivers typically do not operate in real-time as defined in the present application.

Alternatively, a self-referential constellation of satellites may provide density tracking information with less uncertainty. For example, Hinks and Psiaki demonstrated that a constellation of 50-100 satellites in multiple orbital planes can estimate the atmospheric density using ranging crosslinks with cm-scale accuracy. This data was used to produce a set of cross-constellation ranges, which can then be used to determine high-drag regions of the atmosphere. The modeling used in this analysis is based, in part, on prior knowledge of the density to manage the estimation errors. Compared to the GPS-based approach, the self-referential approach was shown to reduce uncertainty in known measurements and to increase the fidelity of the constellation's own orbit propagation. Compared to a single satellite, a constellation of satellites can be used to further reduce the uncertainty in the atmospheric density estimates. However, in practice, the deployment of numerous satellites is limited, in part, by the cost of each satellite due to the large quantity of satellites typically used in such constellations.

Conventional Approach 4: Passive Body Tracking

Yet another conventional approach to estimate atmospheric density is to utilize ground-based tracking of passive bodies. This method has been used in the analysis of orbital perturbations including atmospheric drag. For example, radio tracking data of the Mars Odyssey and Mars Reconnaissance Orbiter aerobraking and orbital decay have enabled characterization of the Martian atmosphere.

Ground-based tracking allows an object to be tracked without the object having to include expensive measurement equipment or to even be operational. As a result, simple, low cost objects with well-characterized areas and drag coefficients can be used. For example, Orbital Debris Radar Calibration Spheres (ODERACS), Starshine spheres, Calspheres, GFZ-1, and Taifun calibration spheres are all small spherical bodies used by ground tracking stations to calibrate radar and measure orbital decay. These spheres are made to be tracked either by radar (ODERACS, etc.) or by optical instruments (Starshine).

The use of a ground-based tracking system to measure the position and velocity of the object can provide accurate estimates of the local atmospheric density proximate to the spheres. This approach may also be used to measure the coefficients of drag of the object based, in part, on the physical properties of the object. In particular, the deorbit patterns of objects have been used previously to study the drag coefficients of the objects.

Radar (or optical) tracking of passive bodies may also be used to reconstruct an atmospheric density model even if the bandwidth or resolution of the measurements is unable to capture small variations in the atmospheric density. For example, Shoemaker et al. showed that tomographic methods can be used to reconstruct atmospheric density features beyond the resolution of any one measurement by considering different measurements as slices. A finer density map of a region may also be obtained by tracking the trajectory of multiple satellites passing through said region with different orbital properties. This approach typically produces data that is spatially fine, but time-averaged. In other words, ground-based tracking of passive bodies is suitable for producing atmospheric models, but is limited for applications that rely on real-time orbit propagation.

A Torque-Based Approach to Estimate Atmospheric Density

As described above, various approaches have been developed to estimate the atmospheric density in LEO based on measurements of the drag force applied to the satellite during orbit. However, in order to estimate the atmospheric density accurately, these approaches should account for perturbing forces (e.g., gravitational potential forces, third-body effects) acting upon the satellite during orbit, which may be orders of magnitude larger than the drag force. In order to measure the drag force in the presence of these perturbation forces, these approaches relied upon (1) high precision instrumentation, which were expensive and large in size or (2) ground-based support systems, which increases system complexity (e.g., the satellite and the ground-based system have to work in concert with one another). Additionally, these approaches were unable to provide real-time changes to the atmospheric density.

The Inventors have thus recognized and appreciated the need for a low cost density measurement platform that can simultaneously provide high-resolution and real-time estimates of atmospheric density. Additionally, the density measurement platform should preferably be a self-contained system where measurements and data processing are performed in-situ. In this manner, density measurement platform does not depend upon ground-based systems to estimate the atmospheric density, which may otherwise complicate system design and limit real-time estimation of the atmospheric density. The present disclosure is thus directed to a satellite (also referred to herein as the "Satellite Producing Aerodynamic Torque to Understand LEO Atmosphere (SPATULA)") designed to be subjected to a significant external torque and methods for estimating the atmospheric density from a drag torque determined from the external torque.

Figure 1B:
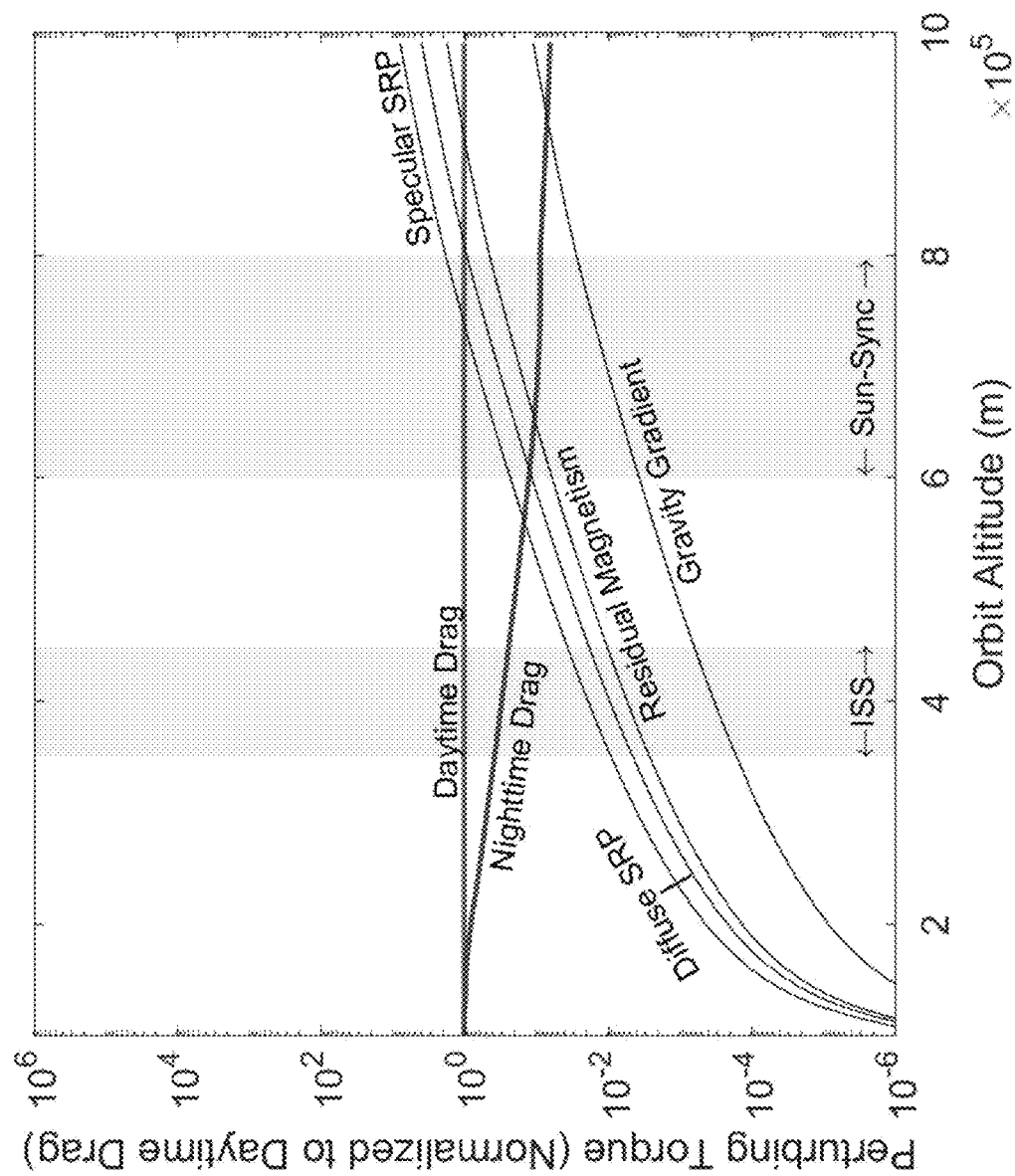
FIG. 1B shows the relative magnitudes of perturbing torques experienced by a typical cubesat in LEO. The values are normalized by the largest daytime drag at a particular altitude calculated by the Harris-Priester atmospheric mode. All perturbations are evaluated under worst case conditions.

Compared to the drag force, the drag torque typically applied to a satellite is substantially larger in magnitude compared to other sources of perturbation torques. FIG. 1B shows the magnitude of various perturbation torques normalized to the torque induced by the largest daytime drag force as used in FIG. 1A as a function of altitude. The various perturbation torques were again evaluated under worst-case conditions. As shown in FIG. 1B, the drag torque can be several orders of magnitude larger than other perturbation torques at most orbital altitudes. In FIG. 1A, the largest perturbation forces were primarily due to gravitational potential forces and third body effects. In FIG. 1B, these gravitational and third body effects do not induce appreciable torques on the satellite. In fact, the gravity gradient torque caused by Earth, which is substantially stronger than these other effects, is still orders of magnitude weaker than the drag torque.

The relative magnitude of the various perturbation torques and the drag torque in FIG. 1B suggests measurements of the drag torque are substantially less sensitive to perturbing effects compared to the drag force. Thus, the drag torque may be measured using standard, commercially-available components and sensors integrated into the satellite rather than the specialized high-precision instrumentation or ground-based systems previously used to measure the drag force, which reduces cost and the overall size of the satellite. Furthermore, measurements of the drag torque may enable estimation of the atmospheric density with an accuracy and bandwidth comparable to conventional approaches, but, unlike conventional approaches, estimates of the atmospheric density may be provided in real-time.

In other words, the satellite described herein can provide estimates of the atmospheric density with similar or better performance than conventional approaches while being smaller and cheaper than conventional satellites. These characteristics may enable practical deployment of a constellation of such satellites to map the LEO atmospheric density around the Earth in real-time, especially when considering the increased availability and decreased cost of small satellite buses, sensors, and launches.

An Exemplary SPATULA Satellite

Figure 2A:
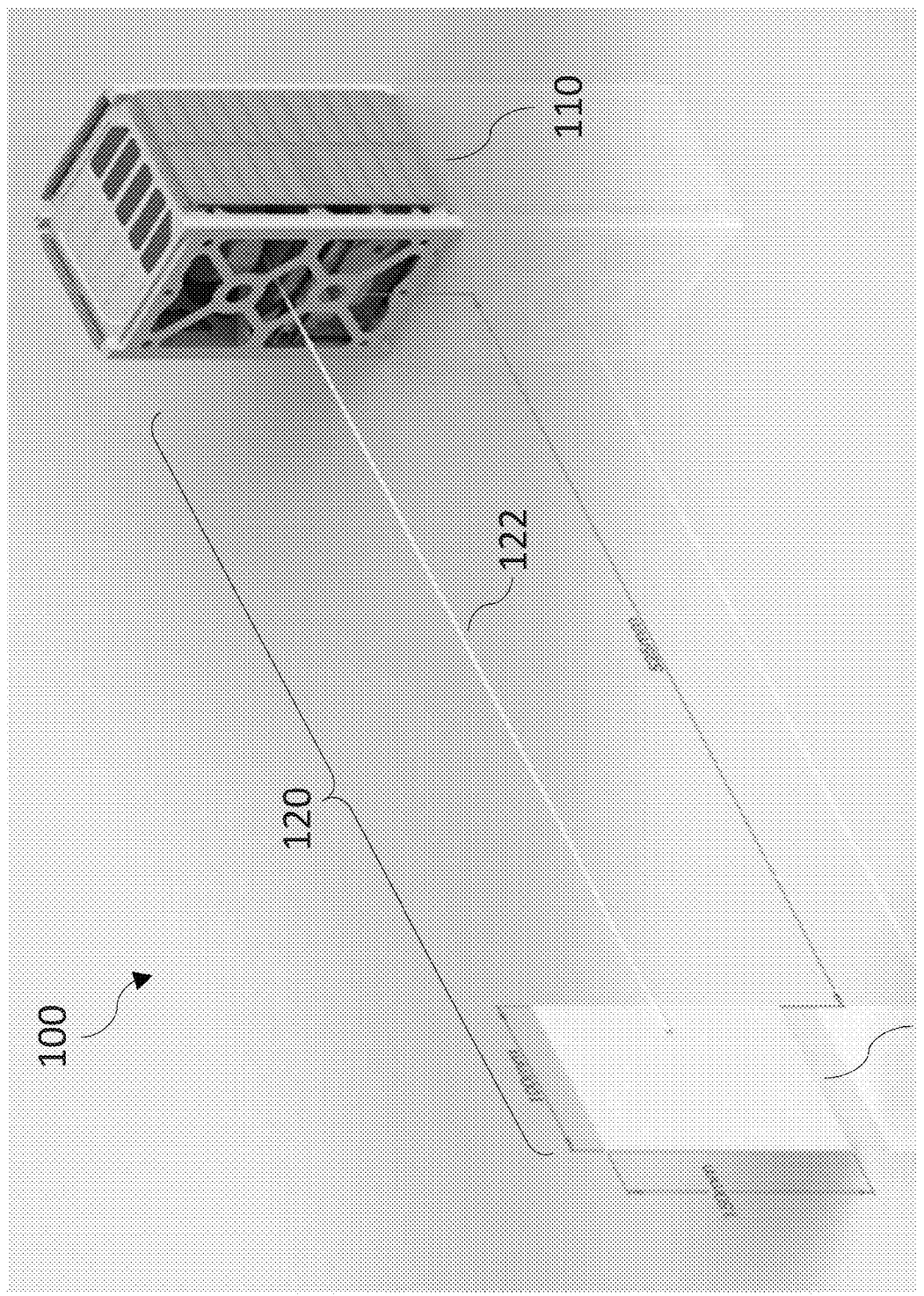
FIG. 2A shows a perspective view of an exemplary satellite, according to an implementation.
Figure 2B:
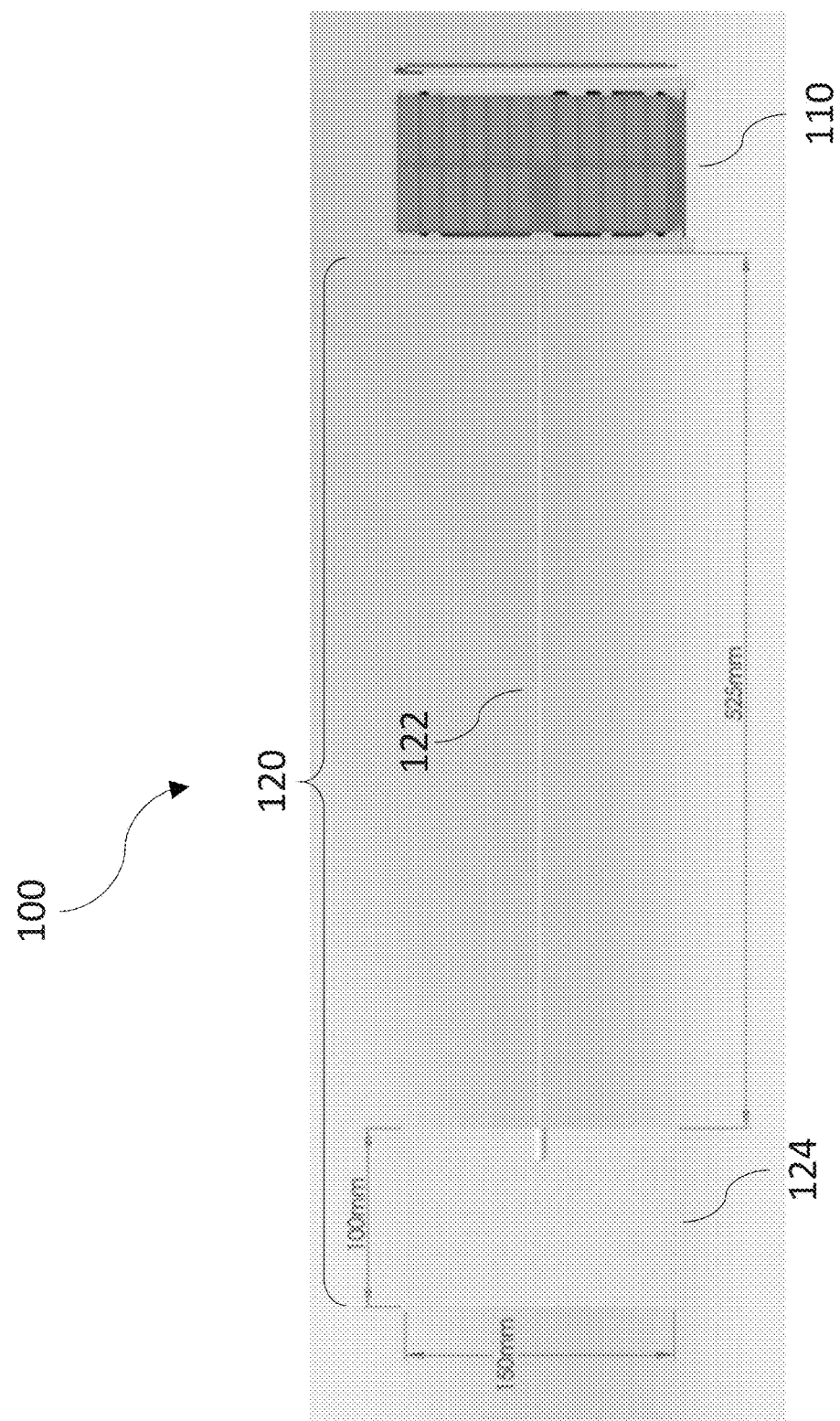
FIG. 2B shows a side view of the satellite shown in FIG. 2A.

FIGS. 2A and 2B show a perspective view and a side view, respectively, of a satellite 100, according to an implementation. As shown, the satellite 100 may include a bus 110 that functions, in part, as the housing of the satellite 100 for various sensing and actuation components. A drag flap 120 may be coupled to the bus 110 to increase the drag torque applied to the satellite 100. In this manner, the drag torque may constitute a larger portion of the total external torque applied to the satellite 100, thus reducing the effects of other perturbing torques on the resolution and bandwidth of the atmospheric density estimate. As shown, the drag flap 120 may include a moment arm 122 with a proximal end coupled to the bus 110 and a distal end coupled to a drag panel 124. The proximal end and the distal end of the moment arm 122 may be on opposing sides of the moment arm 122.

The bus 110 may define the shape and the size of the satellite 100 during launch and before deployment in orbit. In general, the bus 110 may house at least the sensors and actuators used to estimate the atmospheric density. For example, the satellite 100 may provide multiple modalities, one of which is the estimation of the atmospheric density, and thus may include different sensors and actuators to support the different modalities. The shape and size of the bus 110 may thus depend, in part, on the type of components disposed therein.

In some implementations, the shape and size of the bus 110 may vary depending on the desired specifications imposed on the design of the satellite 100. These specifications may include, but are not limited to, the size of the satellite 100, the weight of the satellite 100, the power source to support operation of the sensors, actuators, and/or other subsystems in the satellite 100, and the cost of the satellite 100. In some implementations, the shape and size of the bus 110 may be constrained to a standardized satellite form factor. For example, the satellite 100 may be a cubesat and the bus 110 may be dimensioned according the cubesat standard unit of 1U equal to 10 cm (X) by 10 cm (Y) by 10 cm (Z). The size of the bus 110 may thus be a multiple of the 1U standard unit (e.g., 1U, 1.5U, 2U, 3U, and so on). It should be appreciated that other standardized satellite form factors may be used to constrain the size and shape of the bus 110.

The bus 110 may house various sensors and actuators used to monitor and control, respectively, the attitude of the satellite 100. For example, the bus 110 may include a reaction wheel that applies a torque to the satellite 100 to change the orientation of the satellite 100 about a single rotation axis (e.g., a Z axis). Multiple reaction wheels may be included in the bus 110 to control the orientation of the satellite 100 about multiple rotation axes (e.g., X, Y, and Z axes), thus allowing the satellite 100 to be oriented along any desired direction. In some implementations, the reaction wheel corresponding to the rotation axis about which the drag torque applied to the drag flap 120 acts upon may be configured to store a higher angular momentum compared to the other reaction wheels due to the larger drag torque applied about that axis.

The bus 110 may include a star tracker and/or an Earth horizon sensor to monitor the angular position of the satellite 100 during orbit. The bus 110 may also include a gyroscope to monitor the angular velocity of the satellite 100. The reaction wheel described above may also include a reaction wheel sensor to monitor the angular velocity of the reaction wheel separately from the satellite 100. The reaction wheel angular velocity may be used to determine the torque applied by the reaction wheel. A global positioning system (GPS) receiver may also be included to monitor the position and velocity of the satellite 100 in orbit.

FIG. 3 shows a table summarizing various exemplary sensors and their respective specifications that may be used in the satellite 100. As shown, the sensors may all be commercially off the shelf (COTS) components in order to reduce the cost of the satellite 100. Although the sensors in FIG. 3 are COTS, these sensors can still estimate the atmospheric density at a resolution and bandwidth comparable to conventional approaches as will be discussed below. It should be appreciated that other types of actuators (e.g., a magnetorquer, a thruster, a control moment gyroscope) and/or sensors (e.g., a sun sensor, a magnetometer) may be used that provide similar functionality in terms of orientation control and attitude monitoring. It should also be appreciated that the sensors used to estimate the atmospheric density may also be used for other functions in the satellite 100 (e.g., correcting and maintaining the attitude of the satellite 100).

As described above, the drag flap 120 is used to increase the drag torque applied to the satellite 100 such that the drag torque is substantially greater than other perturbing torques acting upon the satellite 100 about at least one rotation axis. The drag flap 120 may increase the drag torque, in part, by displacing the center of pressure from the center of mass of the satellite 100. The center of pressure is the point on a body through which an external force representing an external pressure field (e.g., atmospheric drag) acts upon a body. Thus, in order to increase the drag torque applied to the satellite 100, the drag flap 120 should increase the distance between the center of pressure and the center of mass of the satellite 100. Said in another way, the drag flap 120 should be designed to increase the angular acceleration of the satellite 100 at a particular atmospheric density and orbital velocity. Various parameters of the drag flap 120 may be adjusted to increase the drag torque including, but not limited to the total mass, the mass distribution, the drag coefficient, and the shape and dimensions of the cross-sectional area.

For example, the drag flap 120 may include a moment arm 122 and a drag panel 124 as shown in FIGS. 2A and 2B. The drag panel 124 is the portion of the drag flap 120 that is primarily subjected to the drag force and thus responsible for the drag torque applied to the satellite 100. The moment arm 122 is the portion of the drag flap 120 that physically separates the drag panel 124 from the bus 110 and is tailored to increase the drag torque by increasing the distance between the center of pressure and the center of mass. In some implementations, the moment arm 122 and the drag panel 124 may be formed as a single part. In some implementations, the moment arm 122 and the drag panel 124 may be initially manufactured as separate components that are then assembled to form the drag flap 120.

With respect to the center of mass, the moment arm 122 and the drag panel 124, in particular, should preferably be lightweight in order for the center of mass of the satellite 100 to remain near the bus 110. This may be accomplished through a combination of using lightweight materials and component designs that utilize less material. However, since an appreciable drag force may be applied to the drag flap 120, the drag flap 120 should also be sufficiently rigid to reduce unwanted deformation (elastic and plastic) or flexure along at least the direction the drag force is being applied. Furthermore, the drag flap 120 should support natural frequencies substantially greater than the bandwidth of the atmospheric density estimate to ensure mechanical vibrations along the drag flap 120 do not contribute additional uncertainty to the atmospheric density. For instance, the drag flap 120 may be designed to have a first natural frequency substantially greater than about 1 $min^{-1}$.

With respect to the center of pressure, the drag panel 124 should preferably have a large drag coefficient (e.g., a flat plate where the flat face is oriented to face the ram side of the satellite 100) and/or a large cross-sectional area to increase the drag force applied to the drag panel 124. In some implementations, the drag panel 124 may have a cross-sectional area constrained to be similar to or smaller than one face of the bus 110. In the case of the drag panel 124 being shaped as a flat plate, it should be appreciated the flat side of the flat plate does not have to directly face the ram side of the satellite 100, but can instead be at an angle relative to the ram side such that the drag panel 124 still produces a drag torque on the satellite 100. By comparison, the moment arm 122 should preferably have a small drag coefficient and a small cross-sectional area. In this manner, atmospheric drag is primarily applied to the drag panel 124, thus positioning the center of pressure closer to the drag panel 124 on the satellite 100.

Figure 4:
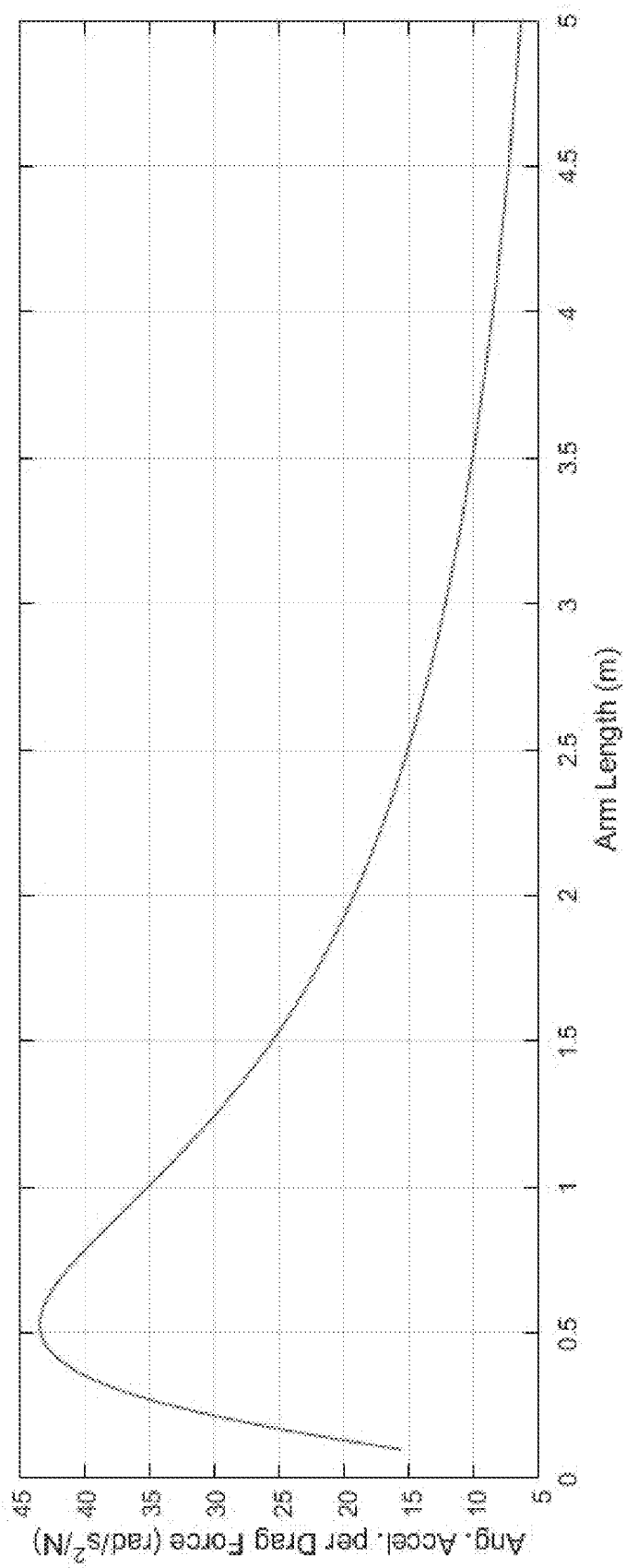
FIG. 4 shows a chart of the angular acceleration of the satellite about a rotation axis per unit of drag force applied to the flap as a function of the moment arm length.

It should be appreciated that the bus 110 will also be subjected to a drag force, which may affect the resultant drag torque applied to the satellite 100. In some implementations, the design of the drag flap 120 may be coupled to the design of the bus 110. For example, the moment arm 122 in the satellite 100 shown in FIGS. 2A and 2B has a preferred length that increase the angular acceleration of the satellite 100 when assuming the drag panel 124 and the bus 110 each have a fixed moment of inertia. This is due to the torque being proportional to the length of the moment arm 122 and the moment of inertia of the moment arm 122 having a term proportional to the squared length of the moment arm 122. FIG. 4 shows a plot of the angular acceleration per unit drag force applied to the satellite 100 as a function of the length of the moment arm 122 for an exemplary satellite 100 with specifications shown in FIG. 7C.

Figure 5:
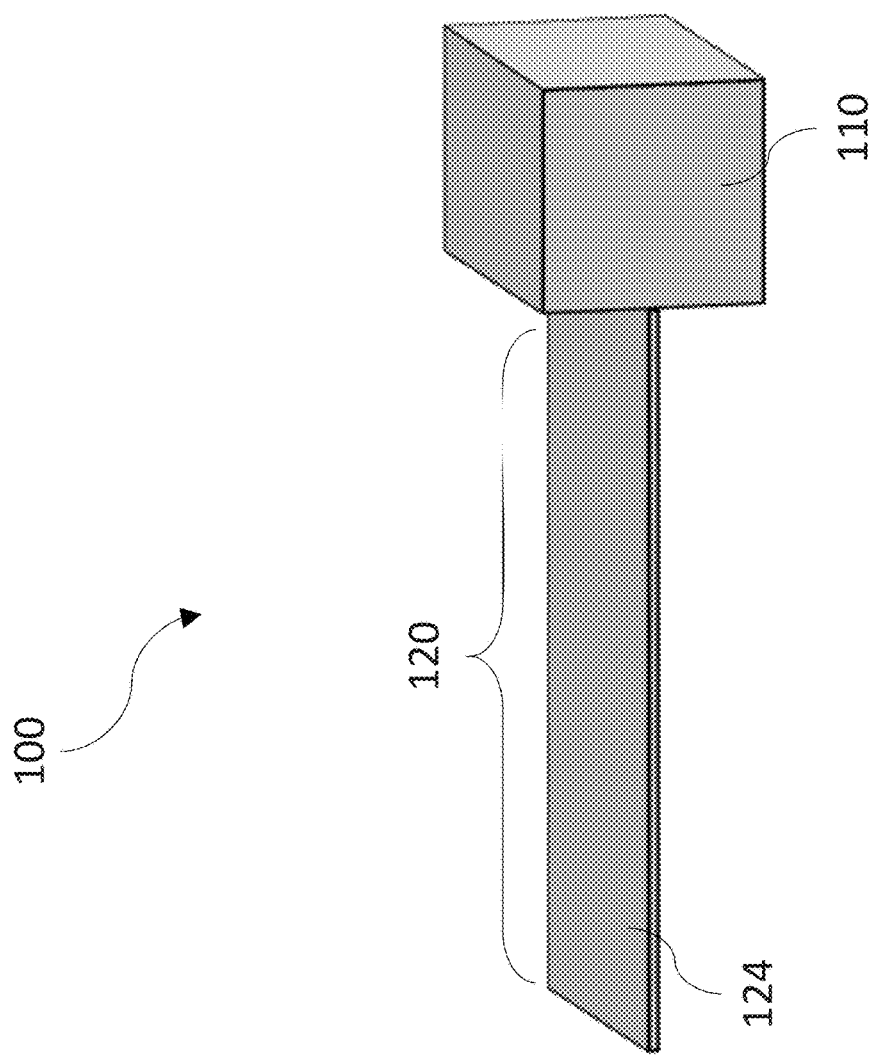
FIG. 5 shows another exemplary satellite with another type of drag flap, according to an implementation.

In another example, the drag flap 120 may only include a drag panel 124 with no separate moment arm 122. FIG. 5 shows an exemplary drag flap 120 where the drag panel 124 is a rectangular beam extending from the bus 110. The flat planar side of the drag panel 124 may be oriented to face the ram side of the satellite 100 to increase the drag torque. Compared to the drag flap 120 in FIGS. 2A and 2B, the drag flap 120 in FIG. 5 may not provide as high of an angular acceleration per unit drag force. However, the drag flap 120 in FIG. 5 is simpler in design and thus may be cheaper to integrate onto the satellite 100. Nevertheless, it should be appreciated that the drag flap 120 in both FIGS. 2A and 2B and FIG. 5 can be used to increase the drag torque for the purposes of estimating the atmospheric density. It should also be appreciated that other designs of the drag flap 120 are possible under the same general design principles described above, namely designing the drag flap 120 to (1) increase angular acceleration and/or (2) increase the distance between the center of pressure and the center of mass.

The drag flap 120 may also be a deployable component. During launch, the drag flap 120 may initially be stowed on the bus 110 to reduce the size of the payload. Once the satellite 100 is deployed in orbit, a release mechanism may be used to deploy the drag flap 120. The release mechanism may be a single-use mechanism (e.g., once the drag flap 120 is deployed, the drag flap 120 cannot be retracted) or a multi-use mechanism (e.g., the drag flap 120 may be deployed or retracted). Various types of release mechanisms may be used including, but not limited to sprung hinges and memory metal joint actuators.

Figure 6A:
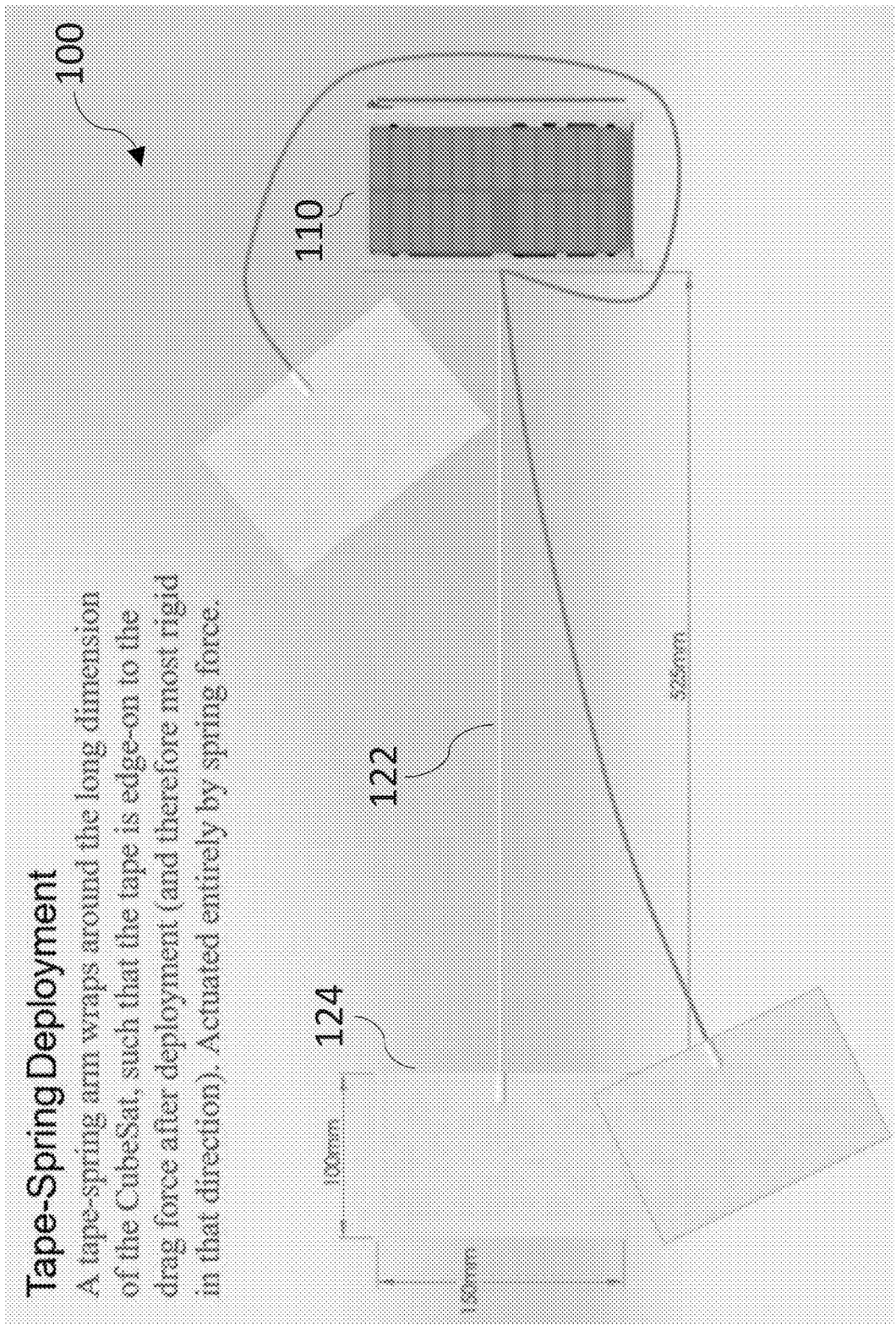
FIG. 6A shows an illustration of an exemplary deployment mechanism based on a tape-spring arm.

The mechanism by which the drag flap 120 is deployed may also vary. For example, FIG. 6A shows the drag flap 120 using a tape-spring arm 122 as the moment arm 122. The tape-spring arm 122 is initially wrapped around the bus 110. Once the release mechanism is used, internal stress in the tape-spring arm 122 or a built-in spring may cause the tape-spring arm to unravel in the manner shown in FIG. 6A. In some implementations, the tape-spring arm 122 may be a substantially thin, flat component. The leading edge of the tape-spring arm 122 may be oriented to face the ram side of the satellite 100 to reduce atmospheric drag on the tape-spring arm 122. Additionally, the flat side of the tape-spring arm 122 may be oriented orthogonal to the drag panel 124 in order to increase the bending stiffness along the rotation axis about which the drag force on the drag panel 124 is applied.

Figure 6B:
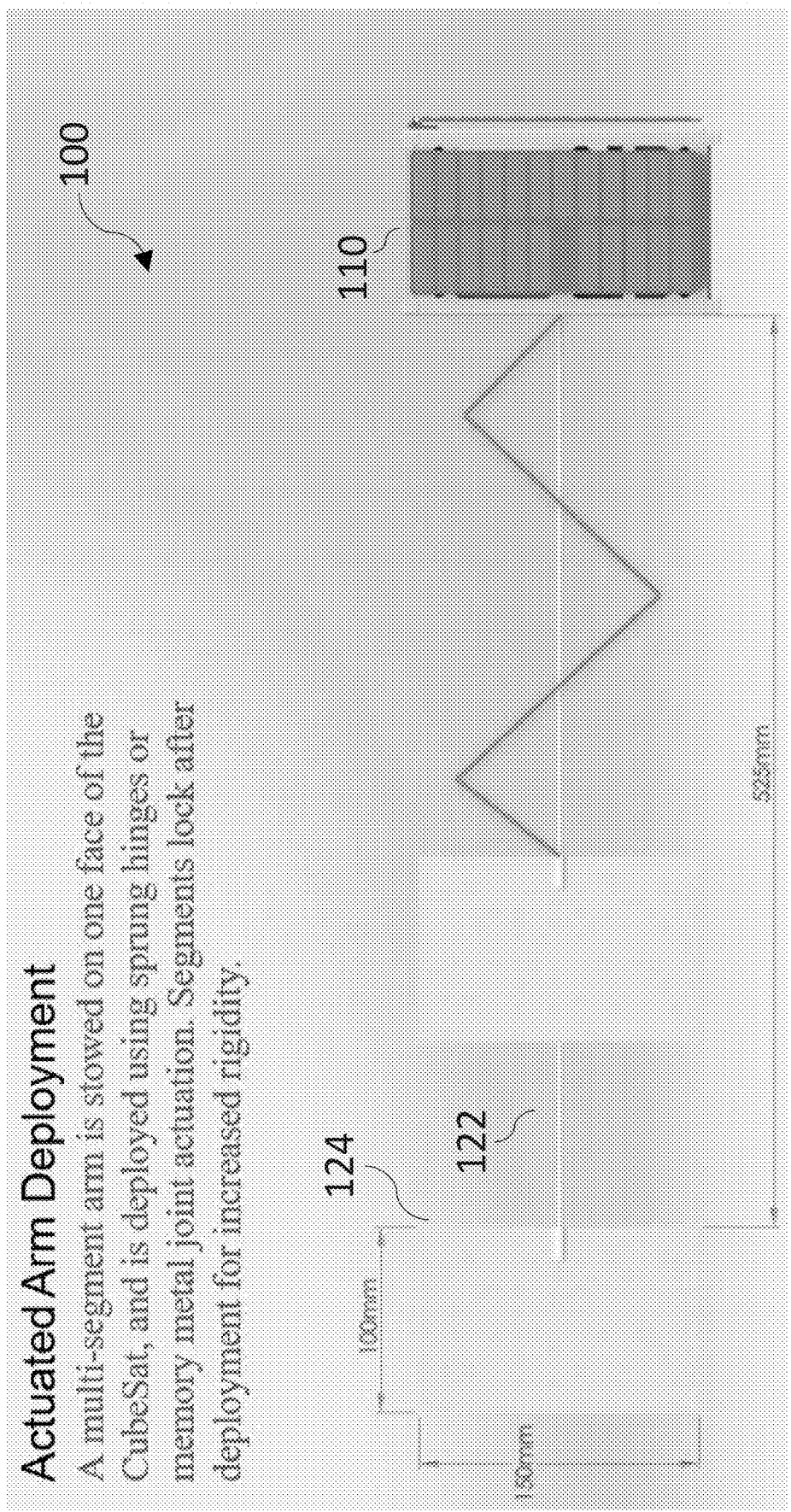
FIG. 6B shows an illustration of an exemplary deployment mechanism based on an actuated multi-segment arm.

In another example, FIG. 6B shows the drag flap 120 using a multi-segment arm 122 as the moment arm 122. As shown, the multi-segment arm 122 may include multiple segments that are rotatably coupled to one another using, for example, a pin joint. When stowed, the multi-segment arm 122 may initially lie flat on one side of the bus 110. Once the release mechanism is used, internal stress or a built-in spring causes the multi-segment arm 122 to extend similar to a scissor mechanism until all the segments of the multi-segment arm 122 are aligned colinearly with one another.

Once deployed, the drag flap 120, may be locked to the bus 110, thus providing a rigid attachment to the bus 110. Various coupling mechanisms may be used to couple the drag flap 120 to the bus 110 including, but not limited to latching hinges, locking hinges, locking pins, sprig tension, and memory metal latches.

Figure 7A:
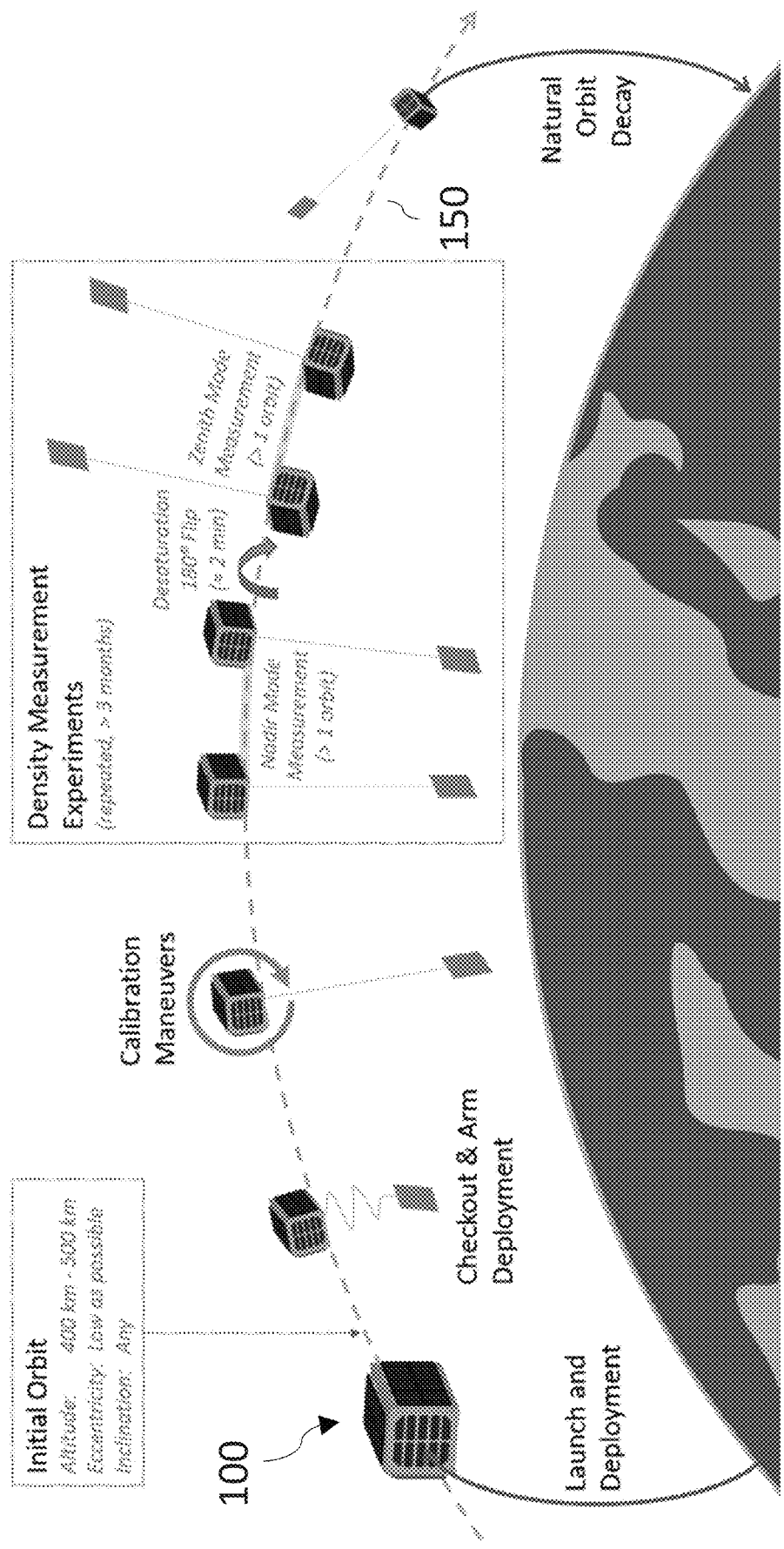
FIG. 7A shows an illustration of the life cycle of an exemplary satellite.

An Exemplary Method of Estimating the Atmospheric Density using the SPATULA Satellite FIG. 7A shows an illustration of an exemplary life cycle of a satellite 100 used to measure the atmospheric density. Once the satellite 100 is launched and released into an orbit 150, the drag flap 120 is deployed. After the drag flap 120 is deployed, a series of calibration maneuvers are performed by the satellite 100 in preparation for measurements of the drag torque and estimates of the atmospheric density. As will be described below, these calibration maneuvers may include calibrating the moment of inertia of the satellite 100 and the reaction wheel, respectively. After the calibrations are complete, the satellite 100 is then used to repeatedly measure the drag torque applied to the drag flap 120 in order to estimate the atmospheric density at multiple points along the orbit 150.

During measurements of the drag torque, the satellite 100 utilizes a reaction wheel to apply a compensating torque to substantially reduce rotation of the satellite 100 about a rotation axis in a local coordinate system. The external torque applied to the satellite 100 can thus be determined based, in part, on the amount of torque applied by the reaction wheel. For clarity, the local coordinate axes are defined with respect to the satellite 100 and move along the orbit 150 with the satellite 100. The global coordinate axes are defined with respect to the Earth and remain fixed regardless of the location of the satellite 100 along the orbit 150. For instance, at a given location in the local coordinate system, a first axis may be oriented tangent to the orbit 150 (e.g. along the orbital velocity), a second axis may be oriented along a radial axis of the orbit 150 (e.g., along the local vertical axis), and the third axis may be orthogonal to the first axis and the second axis (e.g., normal to the orbital plane defined by the first and second axes). In some implementations, the origin of the local coordinate system may move with the satellite 100 while the direction of the coordinate axes remain fixed with respect to the global coordinate system. Thus, at one location, the first axis may be aligned to the orbital velocity of the satellite 100. At a second location located a quarter-orbit relative to the first location, the first axis may be aligned to the local vertical axis instead.

Additionally, the compensating torque generated by the reaction wheel will cause the reaction wheel to accelerate and thus spin at a progressively faster angular velocity over time. This buildup of angular momentum in the reaction wheel may reach a saturation point where the rate at which the reaction wheel spins approaches the operational limits of the reaction wheel. In order to prevent saturation of the reaction wheel, a desaturation process may be periodically performed. This process may involve rotating the satellite 100 to a new attitude such that the external torque previously applied to the satellite 100 is now applied in a direction opposite to the built up angular momentum in the reaction wheel. In this manner, the compensating torque generated by the reaction wheel causes the reaction wheel to decelerate and release the stored angular momentum. However, over time, the reaction wheel may accelerate and build up angular momentum in the opposite direction at which point another desaturation process may be performed.

If no corrections are made to the orbit 150, the external forces applied to the satellite 100 during operation, particularly while the drag flap 120 is deployed, may cause the orbit 152 of the satellite 100 to decay over time until the satellite 100 eventually re-enters Earth's atmosphere. The rate at which the orbit 152 decays depends, in part, on the amount of drag force the satellite 100 is subjected to. In some implementations, the design and orientation of the drag flap 120 may consider one or both of increasing the angular acceleration for a fixed atmospheric density and orbital velocity, as described above, and increasing the operational lifetime of the satellite 100 assuming no corrections are made to the orbit 150 (e.g., using a propulsion system to compensate for the decay in the orbit 150).

The following sections describes the general methodology to estimate the atmospheric density based on the drag torque applied to the satellite 100. As an exemplary demonstration of the method, a numerical simulation of a small cubesat attitude control system in orbit is performed to assess the viability of measuring drag effects through torque. Perturbing forces and torques are simulated as well as noisy sensor readings. These readings are then run through a series of controllers and estimators in order to extract a measurement of the torque, and ultimately the atmospheric density, experienced by the satellite 100.

1. Satellite Model

Figure 7B:
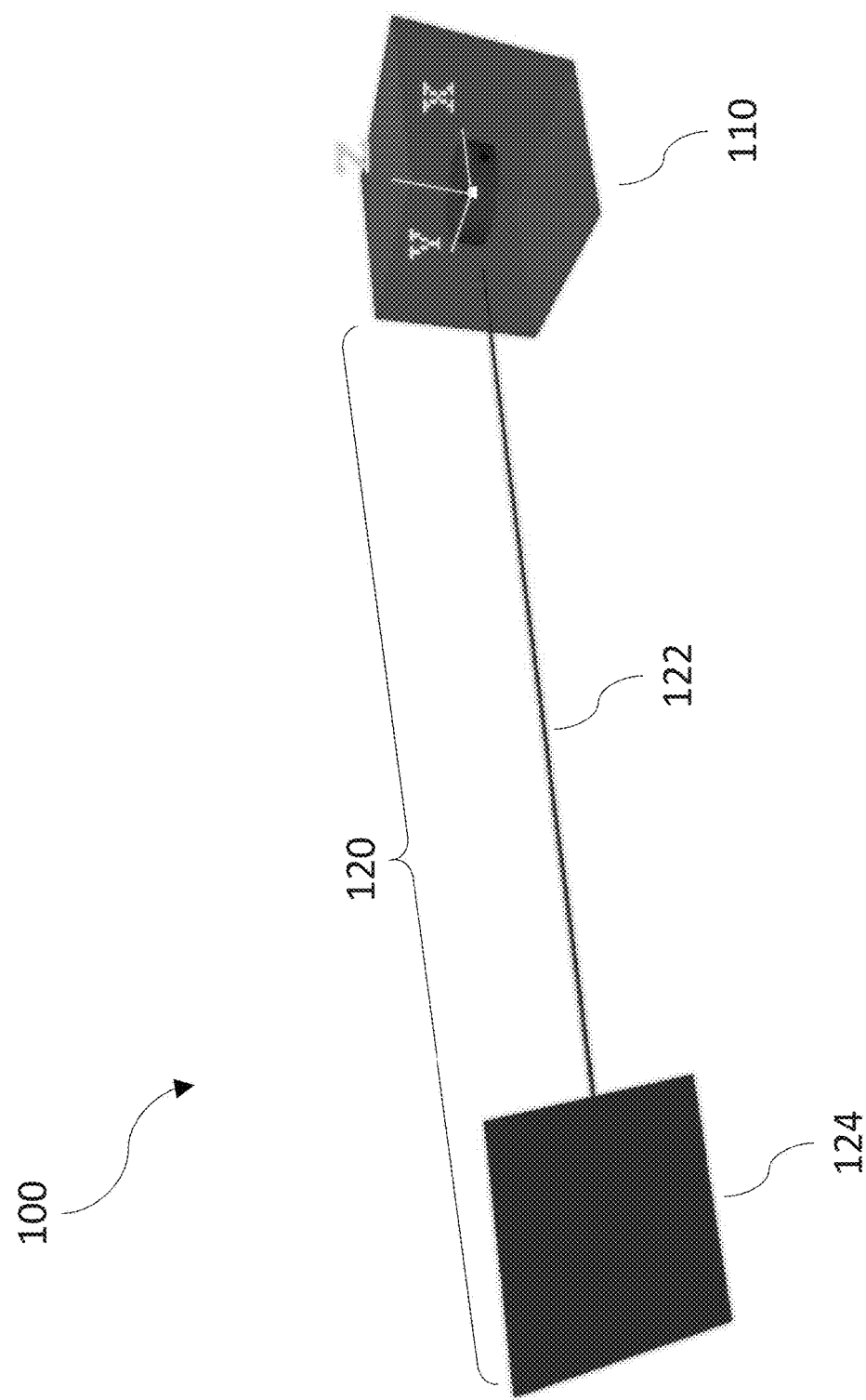
FIG. 7B shows an illustration of a satellite model used to demonstrate the method of estimating atmospheric density. In the displayed coordinate frame, X is the local vertical, Y is along the velocity vector, and Z is normal to the orbital plane.

An exemplary SPATULA satellite 100 is modeled for the purposes of the numerical simulation and demonstration of the method of estimating the atmospheric density described herein. The satellite 100 is modeled as a 1U (10 cm×10 cm×10 cm) cubesat bus 110 with a deployable drag flap 120. The drag flap 120 includes a 10 cm×10 cm drag panel 124 and a deployable arm 122 similar to the satellite 100 shown in FIGS. 2A and 2B. FIG. 7B shows the model of the satellite 100.

The model satellite 100 was simulated using Simulink SimMechanics. The satellite 100 was treated as a rigid body since the perturbing torques considered were small in magnitude and low frequency. As shown in FIG. 7B, three degrees of freedom were considered: the (X,Y) position in the orbital plane and the angle of rotation about the Z axis normal to the orbital plane. The satellite 100 is expected to rotate primarily about the Z axis since the symmetry of the satellite 100 about the X-Y plane reduces external torques induced in the X-Y plane and out-of-plane orbital forces (e.g., J2 effects) induce small torques as shown in FIG. 1B. In practice, the satellite 100 may experience undesirable rotational motion of the satellite 100 about the X and Y axes due to these perturbing forces and torques. However, such unwanted motion may be corrected by reaction wheels and/or other actuators disposed on the satellite 100.

The orbit 150 of the satellite 100 was simulated as a circular equatorial orbit at an altitude of 400 km. The radius of the orbit 150, $R_o$, is taken from the center of the Earth to the 400 km altitude. A circular orbit is typical for many satellites, but the altitude may vary based on the desired measurement location. The attitude dynamics and orbital dynamics were modeled numerically by the SimMechanics Multibody physics solvers by running variable-step algorithms with a relative tolerance of $1\times10^{-6}$.

FIG. 7C shows a table of the physical parameters of the modeled SPATULA satellite 100. The physical values shown in FIG. 7C were chosen to reflect realistic materials and properties as well as typical masses for these components (where available). The length of the moment arm 122 was chosen to increase the angular acceleration given a fixed moment of inertia (MOI) for the bus 110 and the drag panel 124 as described above. As shown, the length of $L_{arm}$=0.525 m should be used to increase the angular acceleration of the satellite 100 under the parameters in FIG. 4.

1.1 Force and Torque Models

The attitude and position response of the satellite 100 was simulated under the influence of atmospheric drag, solar radiation pressure, and gravity. Additional perturbing torques, such as the residual magnetic moment of the satellite 100 may also be considered in the model as well. As shown in FIG. 1B, the contribution of the residual magnet fields is several orders of magnitude smaller than the drag torque at most altitudes and is thus not expected to affect the methodology described hereafter. However, such effects may also be calibrated as well.

1.1.1 Atmospheric Drag

Atmospheric drag may be modeled separately on each surface of the spacecraft, according to, $$F_D = \sum_{i=1}^{N_{surf}} F_{D,i} = -\sum_{i=1}^{N_{surf}} \frac{1}{2}\rho v^2 C_D A_i \cos\alpha_i \hat{v} \qquad (1)$$

where $F_D$ is the drag force, $\alpha_i$ is the angle between the surface normal and the velocity vector of the satellite 100, $A_i$ is the area of surface i, v is the velocity of the satellite 100, and $\rho$ is the atmospheric density. The coefficient of drag, $C_D$, may be considered constant at 2.2 for all surfaces, which is a typical value used for satellites in low orbit. The combined action of these forces produces a drag torque, $\tau_D$, given by, $$\tau_D = \sum_{i=1}^{N_{surf}} \mathbf{r}_{\rightarrow i} \times F_{D,i} \qquad (2)$$

where $\mathbf{r}_{\rightarrow i}$ is the vector from the satellite 100 center of mass to the centroid of surface i.

1.1.2 Solar Radiation Pressure

The radiation pressure conditions on each surface of the satellite 100 may be described by the coefficient of specular reflection $\eta_s$, the coefficient of diffuse reflection $\eta_d$, and the coefficient of absorption $\eta_a$. Specifying any two of these values is sufficient to solve for the third via Eq. (3), which accounts for the conservation of the reflected and absorbed energy, $$\eta_s + \eta_d + \eta_a = 1 \qquad (3)$$

For this simulation, $\eta_s$, $\eta_d$, and $\eta_a$ were given moderate values of 0.3, 0.3, and 0.4, respectively, corresponding to a semi-reflective/diffuse material with an absorptivity similar to a light, non-white paint. Based on these coefficients for each surface and assuming each surface has uniform properties, the solar radiation pressure force on each unshaded surface may be provided in terms of the unit vector normal to the surface $\hat{N}_i$ and the unit vector toward the sun $\hat{S}$ as follows, $$F_{s,i} = -2\frac{W}{c}A_i\eta_{s,i}\cos^2\gamma_i\hat{N}_i \qquad (4)$$

-continued $$F_{d,i} = \frac{W}{c} A_i \eta_{d,i} \left( -\frac{2}{3} \cos \gamma_i \hat{N}_i - \cos \gamma_i \hat{S} \right) \quad (5)$$

$$F_{a,i} = -\frac{W}{c} A_i \eta_{a,i} \cos \gamma_i \hat{S} \quad (6)$$

$$F_{SRP} = \sum_{i=1}^{N_{surf}} F_{SRP,i} = \sum_{i=1}^{N_{surf}} (F_{s,i} + F_{d,i} + F_{a,i}) \quad (7)$$

where $\gamma_i$ is the angle between the surface normal and the incoming sunlight, $A_i$ is the area of the considered surface, and c is the speed of light in vacuum. The solar constant W at 1 AU is assumed to be 1361 W/m² outside of the Earth eclipse, zero inside the umbra of Earth's shadow, and varies linearly between these two values as the satellite 100 passes through the penumbra. The total force on the satellite 100 is given by the sum of these forces on each of the N non-shaded surfaces. The resultant torque, $\tau_{SRP}$, is described as follows, $$\tau_{SRP} = -\sum_{i=1}^{N_{surf}} \mathbf{r}_{\ominus-i} \times F_{SRP,i} \quad (8)$$

where $\mathbf{r}_{\ominus-i}$ is the vector from the satellite 100 center of mass to the centroid of surface i.

1.1.3 Gravity and Gravity Gradient

Gravity is modeled as Newtonian gravity from a spherical Earth. The gravitational force, $F_g$, is treated as acting separately at the center of mass of each component of the satellite 100 (e.g., the bus 110, the moment arm 122, the drag panel 124) as follows, $$F_g = \sum_{i=1}^{N_{comp}} F_g = -\mu_\oplus \sum_{i=1}^{N_{comp}} \frac{m_i}{r_i^3} r_i \quad (9)$$

where $\mu_\oplus$ is the Earth gravitational parameter, the vector $r_i$ corresponds to the location of the component's center of mass relative to the center of the Earth, and $r_i$ gives the magnitude of the vector $r_i$. Except for the moment arm 122, the components in the satellite 100 have a small aspect ratio. The moment arm 122 contributes a small fraction of the overall satellite 100 mass. Thus, the satellite 100 is very well approximated by an extended collection of rigidly-connected point masses (i.e. a "dumbbell" model), and the gravity gradient torque, $\tau_g$, is implicitly modeled by the force of gravity acting separately at each center of mass as follows, $$\tau_g = \sum_{i=1}^{N_{comp}} \mathbf{r}_{\ominus-i} \times F_{g,i} \quad (10)$$

1.2 Sensor and Actuator Models

The SPATULA satellite 100 may include five sensors and one main actuator in the model according to FIG. 3: a star tracker, an Earth horizon sensor, a MEMS gyroscope, a GPS receiver, and a reaction wheel with rate readout. These sensors and actuator provide the only input into the control and estimation systems of the satellite 100. The noise characteristics in FIG. 3 are also used in the simulation to more accurately represent typical readings in practice.

1.2.1 Attitude Sensors

The star tracker and the Earth horizon sensors may both be modeled as discrete-time signals with zero-mean Gaussian noise and quantized output. At each sample n=0, 1, 2, . . . , both sensors output a measured angle θ'[n] according to, $$\theta'[n] = \Delta \left\lfloor \frac{\theta(n/f_s) + V_n}{\Delta} \right\rfloor \quad (11)$$

$$V_n \sim N(0, \sigma^2) \quad (12)$$

where θ is the angle of the satellite 100 with respect to the X axis, Δ is the resolution of quantization, $f_s$ is the sample rate in Hz, N is the Gaussian (normal) random variable, and σ is the standard deviation of the noise. The superscript, $\square'$, is used to denote measurement of some variable. The floor-ceiling notation represents rounding to the nearest integer. The values of these constants for each sensor are given in FIG. 3.

It should also be appreciated that the star tracker and the Earth horizon sensor may provide redundant data for the purposes of the method described below. Thus, in some implementations, the satellite 100 may include the star tracker and/or the Earth horizon sensor.

1.2.2 MEMS Gyroscope

The MEMS Gyroscope is modeled as a discrete-time signal with zero-mean Gaussian noise, quantized output, and a continuously-drifting zero-rate bias B(t), $$\dot{\theta}'[n] = \Delta \left\lfloor \frac{\dot{\theta}(n/f_s) + \mathcal{B}(n/f_s) + V_n}{\Delta} \right\rfloor \quad (13)$$

$$V_n \sim N(0, \sigma_{gy}^2) \quad (14)$$

where $\dot{\theta}'$ is the measured angular velocity of the satellite 100, the accent, $\dot{\square}$, being used to denote the time derivative of some variable.

The noise deviation, quantization resolution, and sample rate are given in FIG. 3. The angular random walk (ARW) of the gyroscope for the given noise and sampling parameters is ARW=$\sigma_{gy}/\sqrt{f_s}$≈0.36°/hr. The bias is a continuous random signal, which is generated before a simulation run according to the following method: assume the startup behavior of the gyroscope is well-characterized such that the bias can be calibrated to 0 at time t=0. Given the gyroscope bias instability ΔB=0.0072°/s, generate a random walk of Gaussian random variables by, $$\mathcal{B}_o = 0 \quad (15)$$

$$\mathcal{B}_n \sim N(\mathcal{B}_{n-1}, \Delta \mathcal{B}^2) \quad (16)$$

Lastly, assuming that the bias instability was measured with a typical Allan variance period of about 100 s, cubic spline interpolation may be used to generate a continuous-time bias signal B(t) such that the various values of $B_n$ occur at times $t_n$=(100 n)s.

1.2.3 Reaction Wheel

A 3-axis-stabilized satellite 100 typically uses three non-redundant reaction wheels to compensate and correct unwanted rotational motion about the X, Y, and Z axes. For the purposes of the simulation, only one reaction wheel is modeled for rotation about the Z axis in the simulation. As describe above, the other two reaction wheels are assumed to be small and have negligible effect on the measurement axis of the craft since the satellite 100 and the drag flap 120 is designed to increase the effects of disturbance torques around the Z axis while reducing such effects about the other X and Y axes. Actuators (e.g., magnetorquers, thrusters) may be used to desaturate orbital momentum build up along the X and Y axes. However, the method described below, may generally be adapted to facilitate operation of a 3-axis stabilized satellite 100 by estimating external torques applied about the X, Y, and Z axes.

The modeled reaction wheel is based on the Sinclair Interplanetary RW-0.01 reaction wheel, which is a small reaction wheel with on-orbit operational experience in smaller cubesats. The wheel takes in a torque command $\tau_c$, and has finite-bandwidth dynamics modeled by, $$\tau_{rw} = k_{rw}(\tau_c - \tau_{rw}) \tag{17}$$

$$k_{rw} = (2\pi b_{rw})^{-1} \tag{18}$$

where $\tau_{rw}$ is the current torque provided by the reaction wheels, $k_{rw}$ is a scalar gain, and $b_{rw}$ is the control bandwidth of the reaction wheels. The control bandwidth is set at 100 Hz for this model. The reaction wheel outputs an angular velocity measurement $\omega_{rw}^0$ as a discrete-time signal with zero-mean Gaussian noise and quantized output governed by, $$\omega'_{rw}[n] = \Delta \left\lfloor \frac{\omega_{rw}(n/f_s) + V_n}{\Delta} \right\rfloor \tag{19}$$

$$V_n \sim N(0, \sigma_{rw}^2) \tag{20}$$

1.2.4 GPS Receiver

The GPS receiver is modeled as a discrete-time signal with zero-mean Gaussian noise and a quantized output. It outputs a sequence of four-dimensional data, corresponding to a 2-D position in the plane of the orbit, r, and a 2-D velocity in the plane of the orbit, v, $$\begin{bmatrix} r'_{gps} \\ v'_{gps} \end{bmatrix}[n] = \Delta \left\lfloor \frac{[r(n/f_s)v(n/f_s)]^T + V_n}{\Delta} \right\rfloor \tag{21}$$

$$V_n \sim N(0_{4,1}, [\sigma_{gps}^2 \; \sigma_{gps}^2 \; \sigma_{gpsv}^2 \; \sigma_{gpsv}^2]^T) \tag{22}$$

2. Atmospheric Density Measurement Methodology

The following section describes the method steps to estimate the atmospheric density based on measurements from the sensors described above and actuation inputs from the reaction wheel. Although models were used to represent the perturbing forces applied to the satellite 100 and the sensor readings, the method steps are general and may be utilized in practice for a satellite 100 deployed in orbit using actual sensor readings.

2.1 Estimating the Moment of Inertia

As described above, the SPATULA satellite 100 may be used to measure small torques. In order to accurately measure these small torques, the satellite 100 should first undergo calibration once the drag flap 120 is deployed. For example, the moment of inertia of the satellite 100, $J_{sat}$, should be estimated prior to measuring the drag torque. This may be accomplished by monitoring the motion of the satellite 100 under a known torque.

Figure 8A:
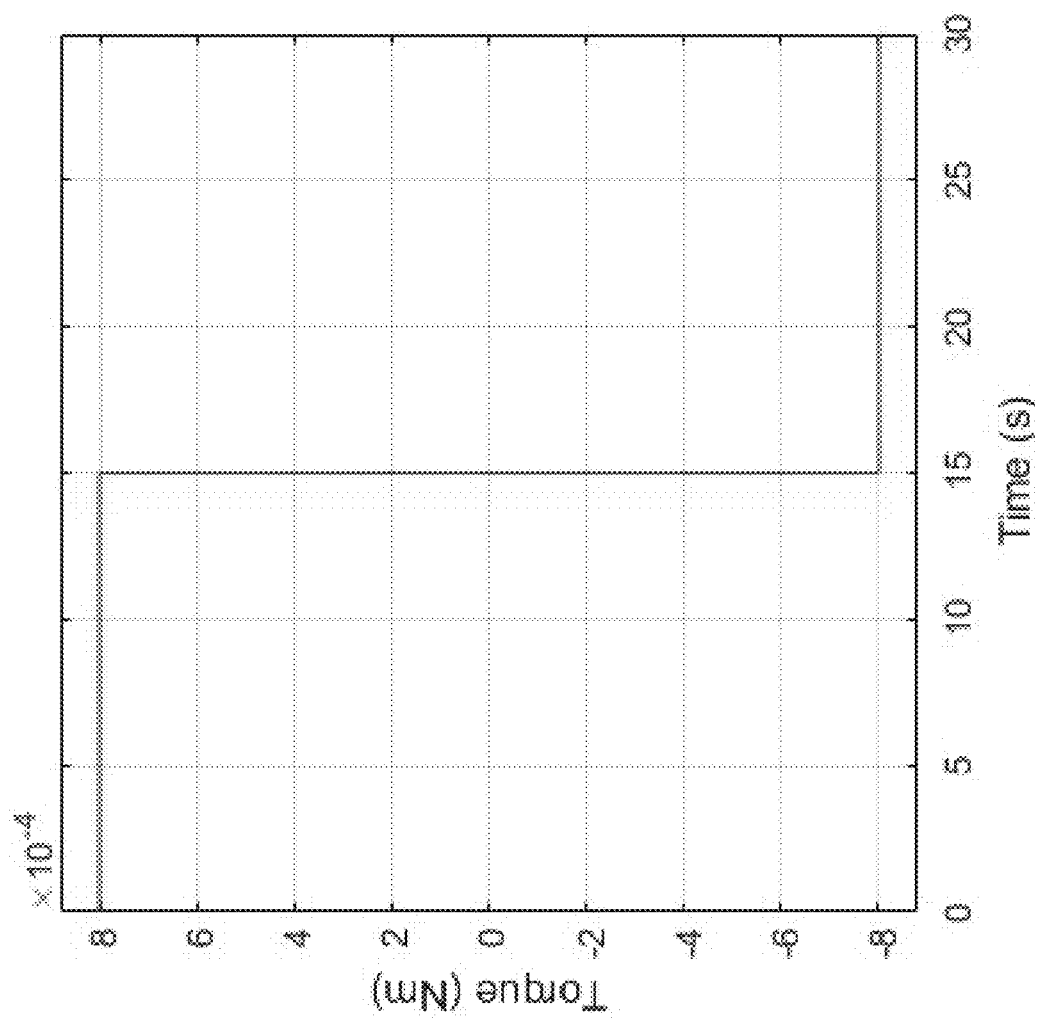
FIG. 8A shows an exemplary torque profile from the reaction wheel used to calibrate the satellite moment of inertia (MOI) and the reaction wheel MOI.

The reaction wheel, as modeled, may store a total of 0.018 N·m·s of angular momentum, which is equivalent to an 18-second burst at the highest commanded torque. To work with margin, a calibration maneuver may include two 15-second bursts of a constant torque at 80% the magnitude of the highest commanded torque in opposite directions. In this manner, the stored angular momentum in the satellite 100 may remain unchanged before and after the maneuver, while still providing long-duration constant-torque inputs for the measurement of the moment of inertia. FIG. 8A shows the torque profile used in this calibration maneuver as a function of time.

Figure 8B:
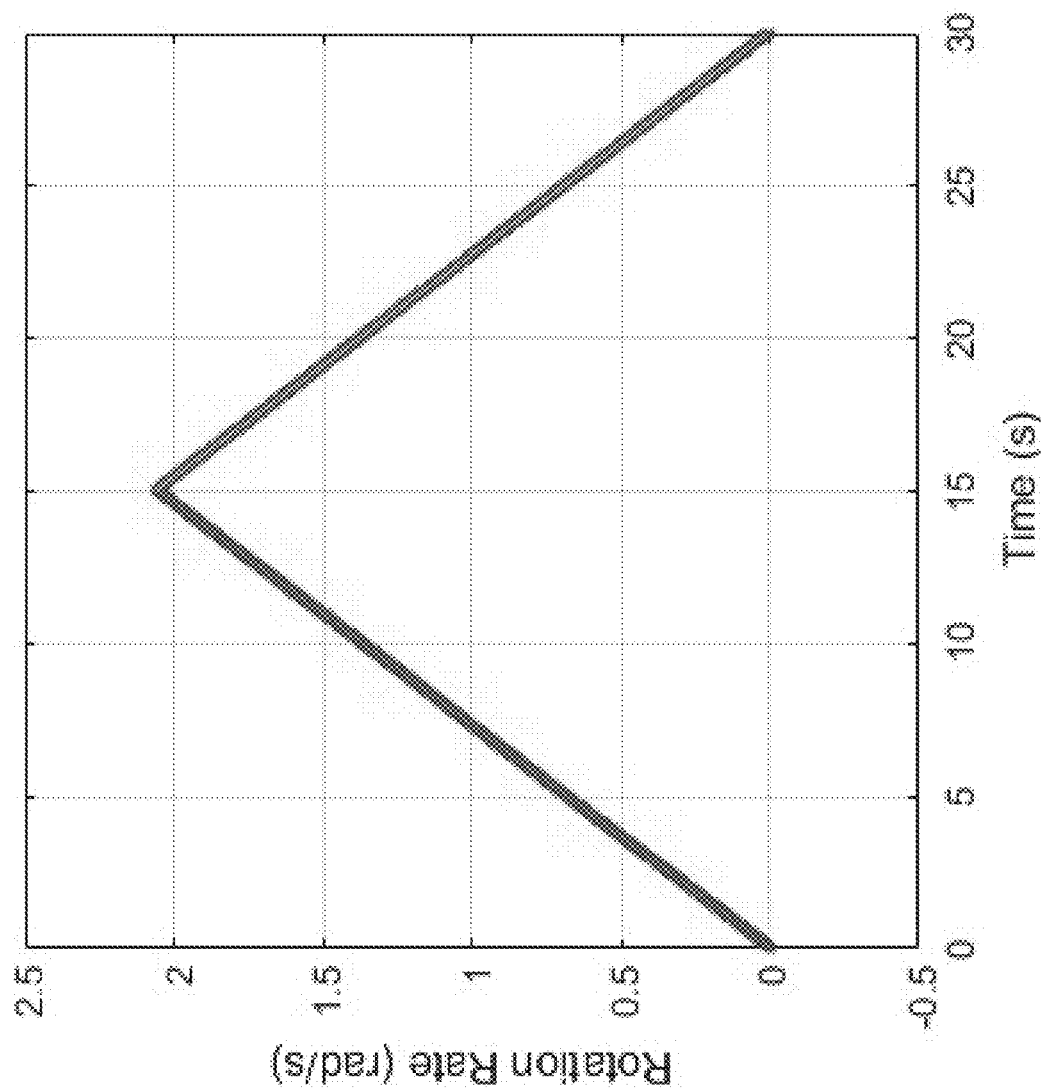
FIG. 8B shows the angular velocity of the satellite in response to the torque profile of FIG. 8A.
Figure 8C:
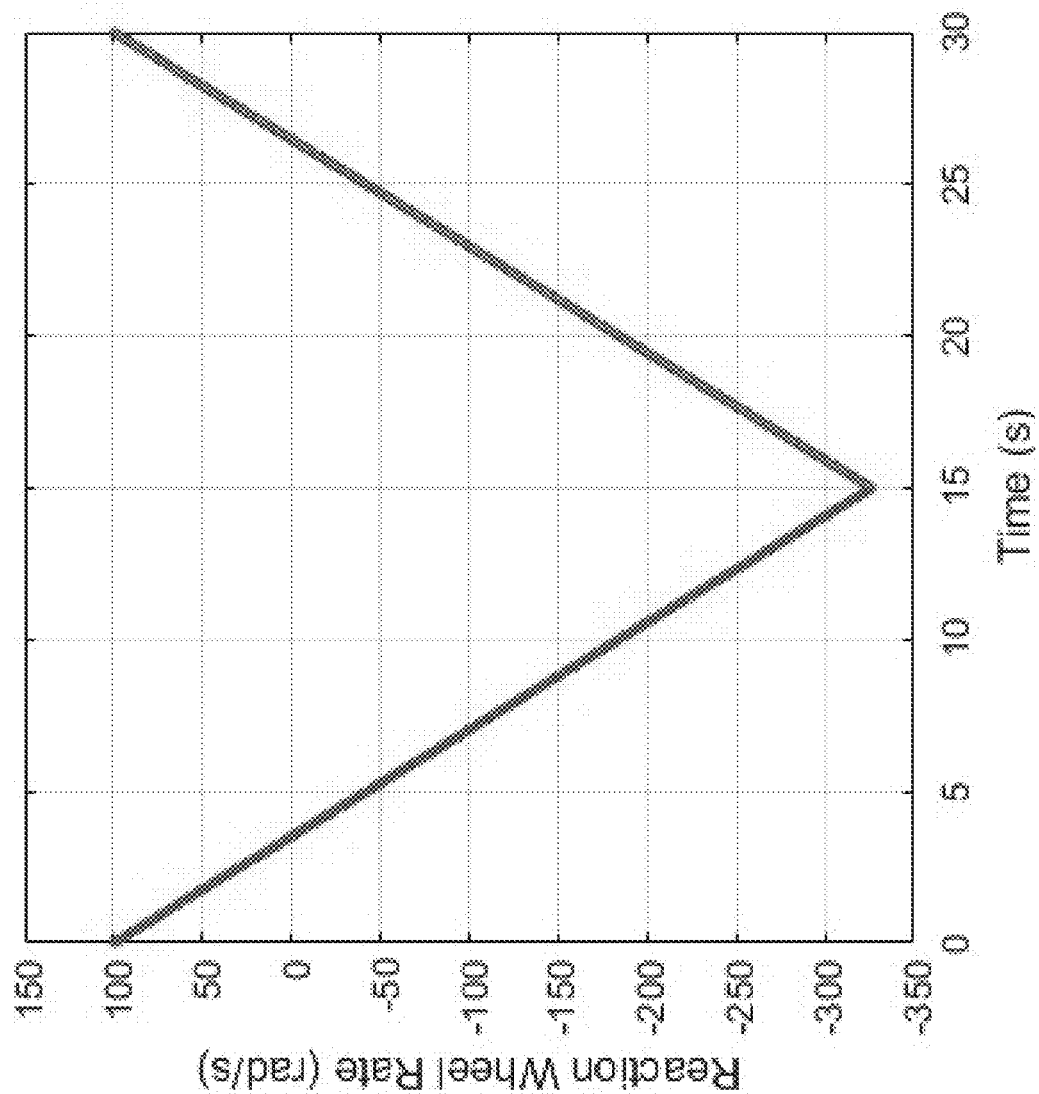
FIG. 8C shows the angular velocity response of the reaction wheel in response to the torque profile of FIG. 8A.

FIGS. 8B and 8C show the resultant data measured by the gyroscope and the reaction wheel rate sensor, respectively. The raw gyroscope data and the raw reaction wheel rate data may be processed to determine the moment of inertia of the satellite and the reaction wheel, respectively. Two lines of best fit are calculated though the two phases of the noisy gyroscope data and the average slope of these two lines, e.g., the averaged angular acceleration, $\bar{\ddot{\theta}}$, is used to estimate the satellite moment of inertia $J_{sat}$ from the calibration torque command $\tau_{cal}$ with Eq. (23). The accent, $\Box$, represents the mean of some variable. Similarly, the raw reaction wheel rate data is fit with two lines of average slope, e.g., the angular acceleration, $\bar{\dot{\omega}}_{rw}$, which are used to determine the reaction wheel moment of inertia $J_{rw}$ with Eq. (24), $$J_{sat} = \frac{\tau_{cal}}{\bar{\ddot{\theta}}} \tag{23}$$

$$J_{rw} = -\frac{\tau_{cal}}{\bar{\dot{\omega}}_{rw}} \tag{24}$$

For the single rotation axis model being used, this maneuver is sufficient to characterize the spacecraft moment of inertia about the measurement axis (i.e., the Z axis). In a full-fidelity model or real implementation of the satellite 100, a single maneuver as described above may only be able to estimate one principle component of the inertia matrix. A more complex maneuver and estimation method, such as those developed by Norman, Peckt, and O'Shaughnessy, may be used to estimate the principle components in the inertia matrix.

In some implementations, the moment of inertia of the satellite 100 and the reaction wheel may be estimated once after the drag flap 120 is deployed. In some implementations, the moment of inertia of the satellite 100 and the reaction wheel may be re-estimated periodically during operation.

2.2 Measurement Mode Control Methodology

The satellite 100 is controlled by a simple LQR controller, derived in ignorance of reaction wheel dynamics or external torques. The controller is derived assuming the satellite 100 obeys the following dynamics, $$\begin{bmatrix} \dot{\theta} \\ \ddot{\theta} \end{bmatrix} = \begin{bmatrix} 0 & 1 \\ 0 & 0 \end{bmatrix} \begin{bmatrix} \theta \\ \dot{\theta} \end{bmatrix} + \begin{bmatrix} 0 \\ J_{sat}^{-1} \end{bmatrix} \tau_c. \tag{25}$$

where $\theta$ is the angular position and $\dot{\theta}$ is the angular velocity. The angular position, $\theta$, may be defined as the nadir-pointing angular position, which is calculated as the estimated true longitude of the orbit $\hat{\Pi}(t) = \tan^{-1}(\hat{Y}/\hat{X})$. The angular velocity, $\dot{\theta}$, may be defined as the estimated orbital mean motion $\hat{n} = \sqrt{\mu_\oplus/\hat{r}^3}$.

The accent, $\hat{\square}$, represents the estimate of some variable.

The controller costs were chosen by Bryson's rule with an approximate angular error up to 0.03 rad, an angular rate error up to 0.003 rad/s, and a control torque up to 1 mN·m as specified by the reaction wheel. The resulting cost matrices are, $$Q_c = \begin{bmatrix} 0.1 & 0 \\ 0 & 10 \end{bmatrix}, \qquad (26)$$

$$R_c = [1000]. \qquad (27)$$

where $Q_c$ is the process noise covariance matrix and $R_c$ is the measurement noise covariance matrix.

The LQR gain corresponding to these costs and the system matrices is solved using the MatLab lqr solver. The resultant controller is found to be of the form, $$\tau_c = \underbrace{[0.01 \ 0.1]}_{K}(x_c - \hat{x}). \qquad (28)$$

where K is the LQR controller gain.

2.3 Desaturation of the Reaction Wheel

The reaction wheel is used to apply a compensating torque to reduce and, in some instances, mitigate rotation about the measurement axis (e.g., the Z axis). As described above, maintaining the attitude of the satellite 100 for extended periods of time may induce a momentum buildup in the reaction wheel and thus result in saturation of the reaction wheel.

Figure 9A:
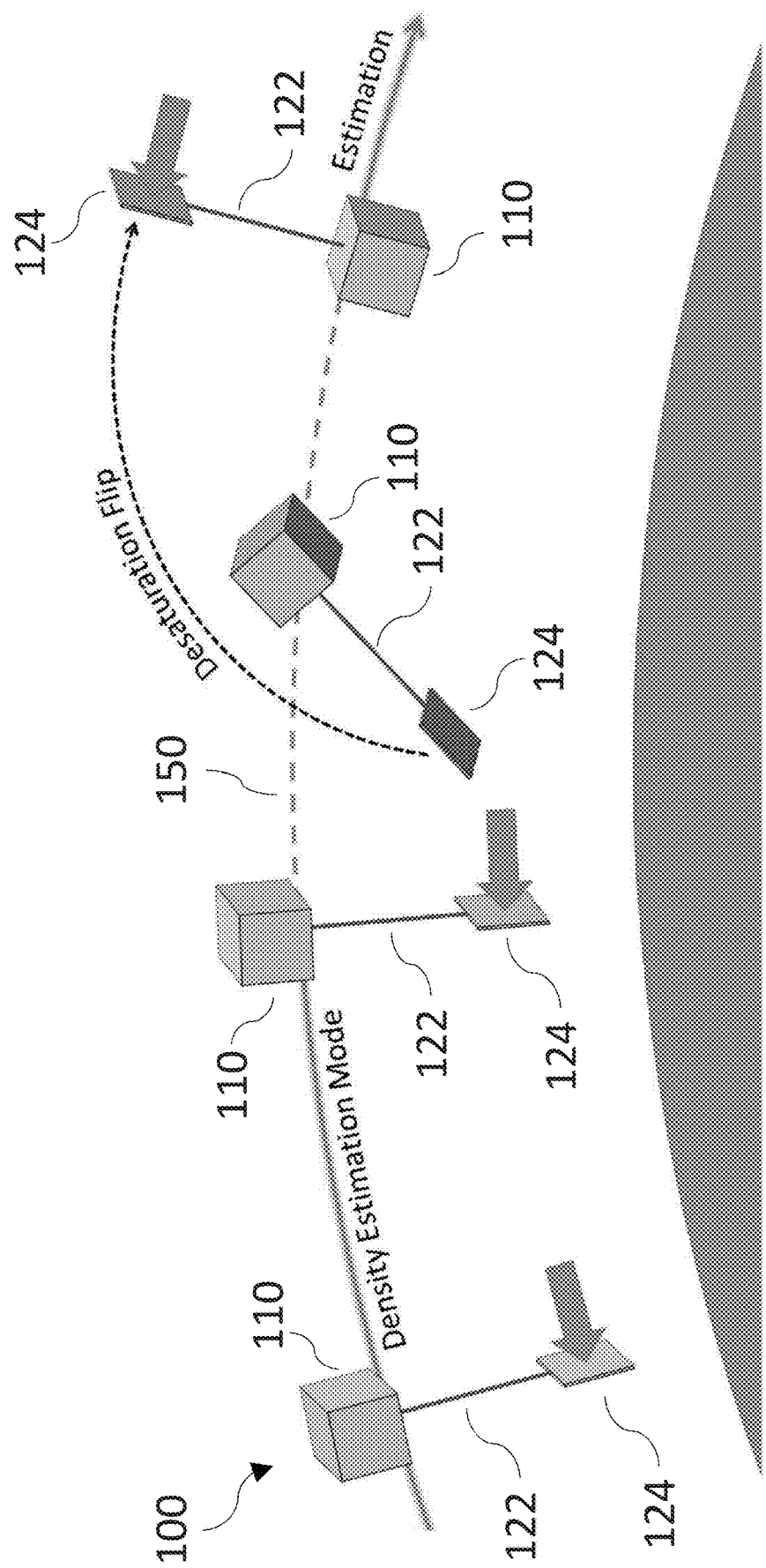
FIG. 9A shows an illustration of an exemplary desaturation process.

Saturation of the reaction wheel may be compensated by performing a desaturation process where the satellite 100 is rotated from a first angular position to a second angular position. The first and second angular positions may be defined relative to the X axis. The desaturation process may occur between estimates of the atmospheric density (e.g., estimates of the atmospheric density may be temporarily paused while performing the desaturation process). As illustrated in FIG. 9A, a drag force may be applied to a first side of the drag panel 124 on the drag flap 120 at the first angular position. Upon rotating to the second angular position, the drag force is applied to a second side of the drag panel 124, opposite to the first side. In this manner, the drag force applied to the drag panel 124 in the second angular position may be used to reduce the angular momentum in the reaction wheel, at least until the reaction wheel begins to build up angular momentum along the opposing direction.

Figure 9B:
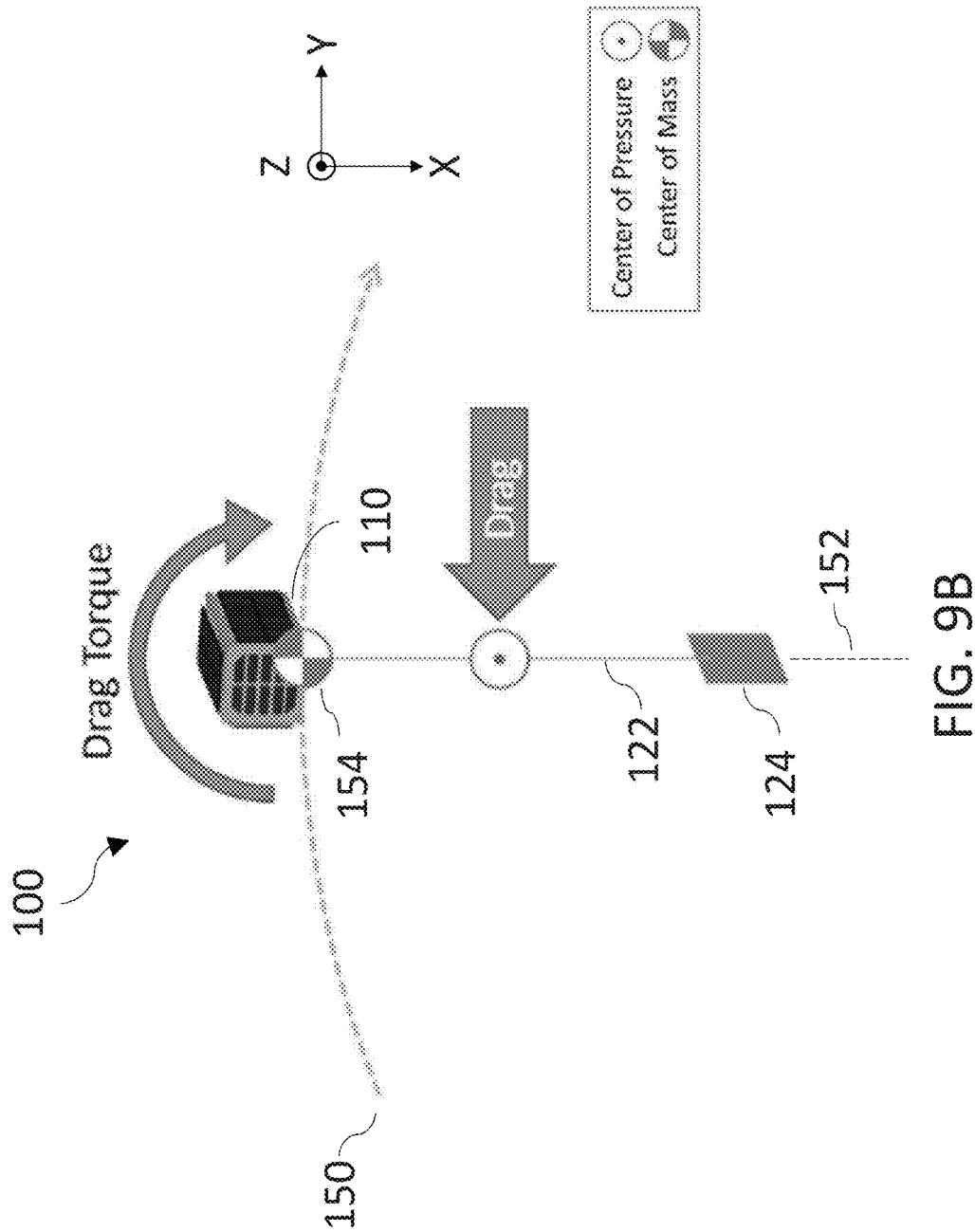
FIG. 9B shows an illustration of the satellite at a first angle about a rotation axis where the longitudinal axis of the drag flap is parallel to a gravity gradient and the drag flap is on the nadir side of the satellite.
Figure 9C:
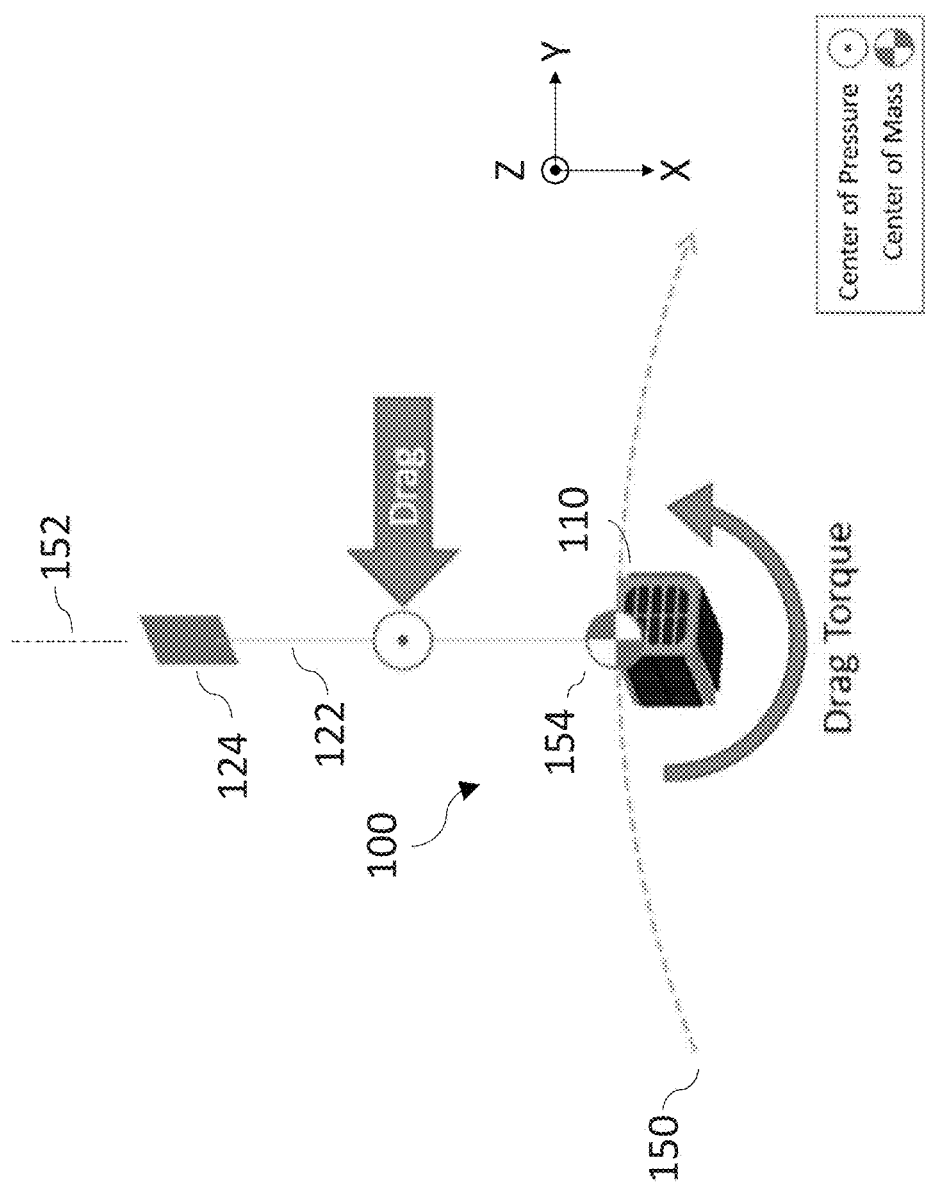
FIG. 9C shows an illustration of the satellite of FIG. 9B at a second angle about a rotation axis where the longitudinal axis of the drag flap is parallel to a gravity gradient and the drag flap is on the anti-nadir side of the satellite.

In one example, the first angular position may correspond to the drag flap 120 being oriented on the nadir side of the satellite 100 as shown in FIG. 9B. The second angular position may correspond to the drag flap 120 being oriented on the anti-nadir side of the satellite 100 as shown in FIG. 9C. Once the reaction wheel has stored a predetermined amount of angular momentum along one direction (e.g., at the first angular position or the second angular position) specified by the reaction wheel angular velocity, $\omega_{flip}$, the desaturation process may rotate the satellite 100 180 degrees about the Z axis to transition between the first and second angular positions.

Figure 9D:
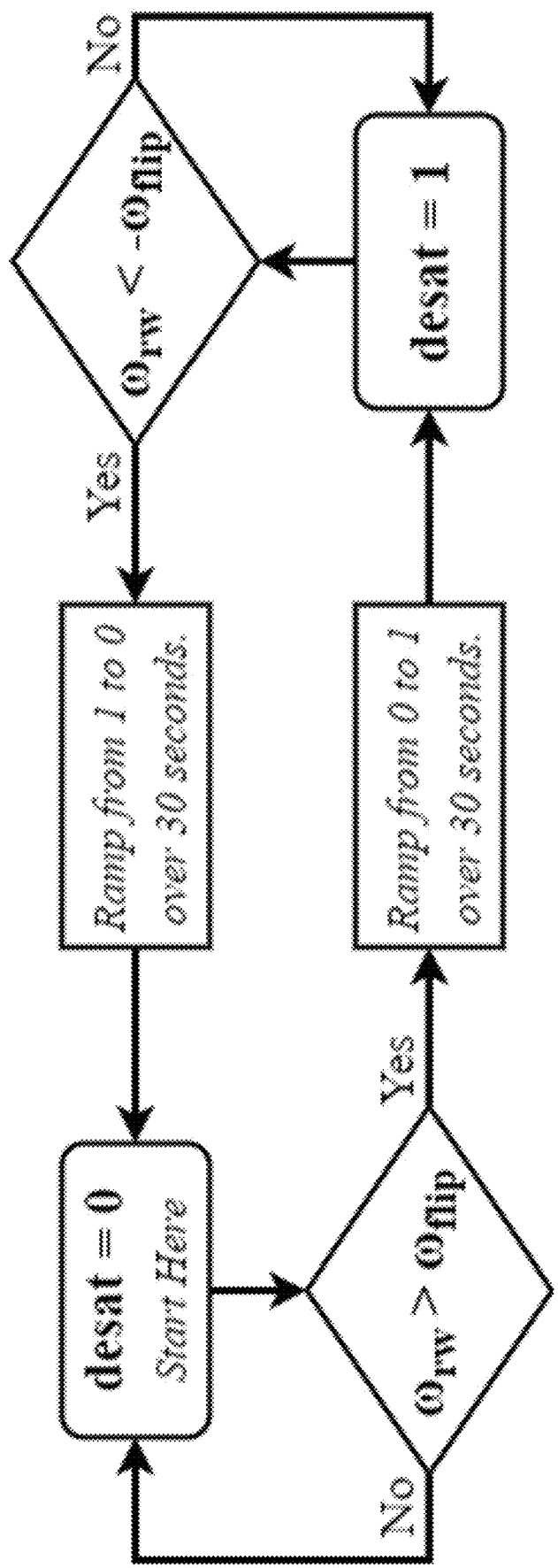
FIG. 9D is a flowchart describing the steps of the exemplary desaturation process of FIG. 9A.

FIG. 9D shows an exemplary flow chart of the logic used to trigger and execute the desaturation process. The desaturation mode of the satellite 100 may be captured by the variable desat, which ranges from zero to one as the craft flips about the desired measurement axis as follows, $$x_c = \begin{bmatrix} \prod(t) + \pi desat \\ \sqrt{\mu_\oplus / R_D^3} \end{bmatrix} \qquad (29)$$

$$desat \in [0.1] \qquad (30)$$

Additionally, the output of all estimators may be paused for two minutes at the initiation of a desaturation flip maneuver to prevent noise from throwing off the measurement. The external torque estimate and external torque estimate mean are both multiplied by a factor of −1 at the end of this pause period before resuming, to capture the fact that the torque is not equal in magnitude but acting in the opposite direction.

In conventional satellites, such desaturation processes are typically performed using an on-board actuator, such as a magnetorquer or a thruster. Here, the satellite 100 is instead utilizing an externally applied torque. Therefore, in some implementations, the satellite 100 may not include said actuators, at least along the rotation axis (e.g., the Z-axis) to desaturate the reaction wheels, thus reducing the size and cost of the satellite 100.

2.4 Measurement Mode Estimation Methodology

The satellite 100 may be positioned at the first angular position or the second angular position described above while the satellite 100 estimates the atmospheric density. The choice of these angular positions as well as the orientation of the drag flap 120 at these angular positions within the local coordinate X, Y, Z axes may vary depending on the desired drag torque applied to the satellite 100 (e.g., a low, intermediate, or high drag torque) and/or the stability of the satellite 100 in response to other perturbing forces and torques.

For example, FIGS. 9B and 9C show two exemplary orientations of the satellite 100 with respect to the local X, Y, Z axes. The Y axis may be aligned to the orbital velocity at this particular location of the orbit 150. The X axis may be parallel to the radial axis of the orbit 150 (e.g., aligned to the local vertical axis) and, hence, oriented towards (or away) from the Earth. The Z axis may be the first rotation axis orthogonal to the X and Y axes and thus the normal to the orbital plane defined by the X and Y axes. The origin of the X,Y,Z axes may coincide with the center of mass 154.

In one preferred orientation, the drag panel 124 of the drag flap 120 may be oriented such that one of the flat sides of the drag panel 124 faces the ram side of the satellite 100, thus increasing the drag force and the drag torque applied to the satellite 100. The moment arm 122 may define a longitudinal axis 152 that is oriented colinearly with the X axis. In this manner, the moment arm 122 may be aligned to a gravitational gradient acting up on the satellite 100, thus further reducing the effects of perturbing gravitational forces and torques acting upon the drag flap 120. As shown in FIGS. 9B and 9C, the drag flap 120 may be colinear with the X axis on either the nadir side or the anti-nadir side of the satellite 100.

It should be appreciated that other orientations of the drag flap 120 may still be used to estimate the atmospheric density. For example, the longitudinal axis of the moment arm 122 may be colinear with the Z axis, thus causing the satellite 100 to rotate about the X axis. In another example, the drag flap 120 may be rotated about a Z axis (normal to the X-Y orbital plane) at an angle relative to the X axis (aligned to the local vertical axis) towards (or away) from the ram side of the satellite 100, thus changing the drag force and the drag torque applied to the satellite 100 by the modifying the cross-sectional area (e.g., proportional to A·cos (α) where a is the angle relative to the X axis) and the drag coefficient of the drag flap 120. For this orientation, the drag forces are kept within the X-Y orbital plane, thus compensation may still be provided primarily by a single reaction wheel. Similarly, the longitudinal axis of the moment arm 122 may be colinear with the X axis (as depicted in FIGS. 9B and 9C), but the drag panel 124 may be rotated about the X axis to also modify the cross-sectional area and the drag coefficient of the drag flap 120. For this orientation, the drag force and the drag torque may cause rotation about multiple axes, which may be compensated by corresponding multiple reaction wheels.

Figure 10A:
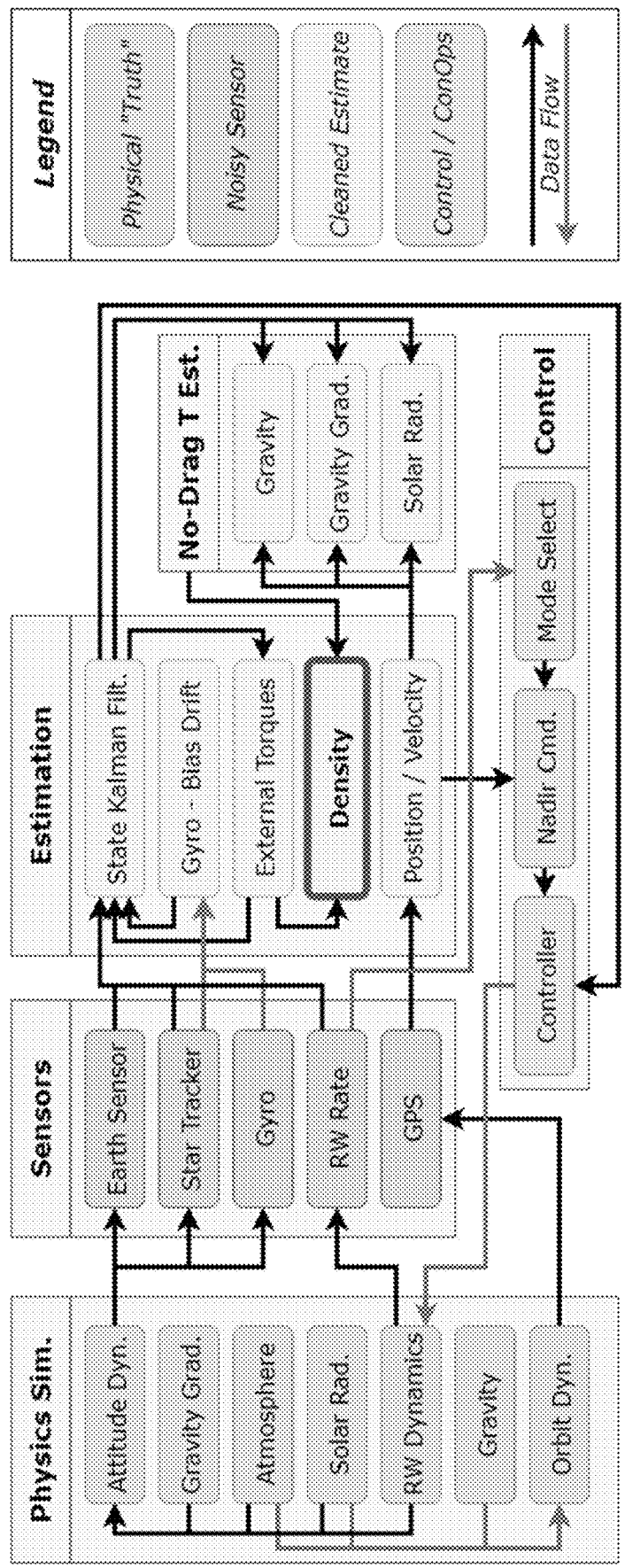
FIG. 10A shows an illustration of the method used to estimate an atmospheric density based, in part, on sensory data acquired by the satellite.

The following describes the method to estimate the atmospheric density using a series of estimators to (1) determine the attitude of the satellite 100, (2) extract the drag torque applied to the satellite 100, and (3) determine an estimate of the atmospheric density based, in part, on the drag torque. FIG. 10A shows an illustration summarizing the methodology used to estimate the atmospheric density including the flow of information from the simulated models, the sensors, and the estimators. It should be appreciated that the sensors and the estimators may be used for actual measurements of the atmospheric density.

2.4.1 Gyroscope Bias Correction

In order to sense the small, low-frequency changes in angular momentum caused by external torques applied to the satellite 100, a bias instability in the MEMS gyroscope should be corrected. Extracting the bias information from the gyroscope output may be accomplished by referencing the output of gyroscope against another measurement of the angular velocity of the satellite 100. Since the bias drift changes slowly with time, the rate baseline measurement may also be recorded slowly with time.

For example, the star tracker, which outputs the angular position, may be used to provide a reference measurement of the angular velocity based on the change of the angular position over time. The current bias estimate B(t) is estimated by applying (1) a first-order low-pass filter transfer function to the incoming gyroscope signal, (2) a derivative and first-order low-pass transfer function to the star tracker signal, and (3) taking the difference between the two processed signals as follows, $$\hat{B}(t) = \mathcal{L}^{-1}\left\{\frac{1}{\frac{1}{\omega_B}s+1}\dot{\Theta}'_{gy} - \frac{s}{\frac{1}{\omega_B}s+1}\Theta'_{st}\right\} \tag{31}$$

where $\dot{\Theta}'_{gy}$ indicates the angular velocity signal of the gyroscope considered in the Laplace domain, and $\Theta'_{st}$ indicates the angular position signal from the star tracker considered in the Laplace domain, where both are converted to continuous-time signals via zero-order-holds. The variable s corresponds to the Laplace domain complex frequency. The bandwidth of the bias correction $\omega_B$ may be chosen as $$\frac{2\pi}{100}$$

because the bias instability drift is known to have a characteristic time of 100 s. Thus, transients and noise at time scales faster than the characteristic time are rejected by the filters and the bias is given by the low-frequency difference between the filtered gyroscope angular velocity and the average angular velocity observed by the star tracker. The bias may then be subtracted from the gyroscope signal to yield a corrected gyroscope measurement $\dot{\Theta}'^c_{gy}(t)$ before being passed to the attitude estimation filter. The accent, $\square^c$, represents the corrected version of some variable.

2.4.2 Attitude State Estimation Filter

In order to extract the drag torque from the various sensor readings on the satellite 100, a continuous-time Kalman filter, or Linear-Quadratic Estimator (LQE) is used to first determine an estimate of an attitude state of the satellite 100. The attitude sate, x, includes the angular position, angular rate, reaction wheel rate, and current reaction wheel torque. A measurement vector y includes the measurements from the corrected star tracker, earth horizon sensor, corrected gyroscope, and reaction wheel rate sensor, which are considered as continuous-time signals by zero-order holds. The correction of the star tracker involves adding a constant equal to the expected angular drift (e.g., the orbital mean motion) over half the sample period of the star tracker, or $\frac{1}{2}n/f_{s,st}$. This corrects the star tracker signal such that the average value of the continuous-time signal over the zero-order hold provides the correct value. This correction is applied, in part, because of the high accuracy and low sample rate of the star tracker sensor. The input to the system u is composed of the commanded reaction wheel torque $\tau_c$ and the mean external torque $\bar{\tau}_{ex}$, the latter acting only to enhance the fidelity of state prediction, $$x = [\theta \dot{\theta} \omega_{rw} \tau_{rw}]^T \tag{32}$$

$$y = [\Theta'^c_{st} \theta\alpha_{eh} \dot{\theta}\Theta'^c_{gy} \omega'_{rw}]^T \tag{33}$$

$$u = [\tau_c \bar{\tau}_{ex}]^T \tag{34}$$

For the purposes of the Kalman filter, the state is assumed to evolve according to the dynamics of Eq. (35), which defines the state matrix A and input matrix B of the state-space system, $$\dot{x} = \frac{d}{dt}\begin{bmatrix}\theta \\ \dot{\theta} \\ \omega_{rw} \\ \tau_{rw}\end{bmatrix} = \begin{bmatrix}\dot{\theta} \\ (\tau_{rw}+\bar{\tau}_{ex})/J_{sat} \\ -\tau_{rw}/J_{rw} \\ k_{rw}(\tau_c - \tau_{rw})\end{bmatrix} = \underbrace{\begin{bmatrix}0 & 1 & 0 & 0 \\ 0 & 0 & 0 & J_{sat}^{-1} \\ 0 & 0 & 0 & -J_{rw}^{-1} \\ 0 & 0 & 0 & -k_{rw}\end{bmatrix}}_{A}x + \underbrace{\begin{bmatrix}0 & 0 \\ 0 & J_{sat}^{-1} \\ 0 & 0 \\ k_{rw} & 0\end{bmatrix}}_{B}u \tag{35}$$

The measurement matrix C (or output matrix C) is defined by which states of x correspond to the four sensors. For instance, the star tracker and Earth horizon sensor both directly monitor $\theta' \approx x_1$, the corrected gyroscope directly monitors $\dot{\theta}' \approx x_2$, and the reaction wheel sensor measures the reaction wheel rate with respect to the rotating craft body, or $\omega'_{rw} \approx x_3 - x_2$. Therefore, the measurement matrix C and feedthrough matrix D are given by, $$y = \underbrace{\begin{bmatrix}1 & 0 & 0 & 0 \\ 1 & 0 & 0 & 0 \\ 0 & 1 & 0 & 0 \\ 0 & -1 & 1 & 0\end{bmatrix}}_{C}x + \underbrace{0_{4,2}}_{D}u \tag{36}$$

where and the feedthrough matrix D is zero. The measurement noises given by the sensor noises listed in FIG. 3 are used to define the measurement noise covariance matrix R. The process noises for each state $x_i$ are notated as $\sigma_{xi}$ and define the process noise covariance matrix Q. The values for each process noise term is given in FIG. 10B, along with the motivation for each value, $$R = \begin{bmatrix} \sigma_{st}^2 & 0 & 0 & 0 \\ 0 & \sigma_{eh}^2 & 0 & 0 \\ 0 & 0 & \sigma_{gy}^2 & 0 \\ 0 & 0 & 0 & \sigma_{rw}^2 \end{bmatrix} \quad (37)$$

$$Q = \begin{bmatrix} \sigma_{x_1}^2 & 0 & 0 & 0 \\ 0 & \sigma_{x_2}^2 & 0 & 0 \\ 0 & 0 & \sigma_{x_3}^2 & 0 \\ 0 & 0 & 0 & \sigma_{x_4}^2 \end{bmatrix} \quad (38)$$

The matrices A, B, C, D, R, and Q are used to solve for the LQE gain matrix L using the MatLab built-in solver for Kalman filter gains, kalman. The LQE gain L then defines the response of the estimated state to the measurement by $$\dot{\hat{x}} = A\hat{x} + Bu + \underbrace{\begin{bmatrix} 4.42 \times 10^2 & 2.97 \times 10^{-3} & 5.78 \times 10^{-4} & -8.11 \times 10^{-7} \\ 4.84 \times 10^1 & 3.25 \times 10^{-4} & 2.56 \times 10^{-1} & -3.58 \times 10^{-4} \\ 8.45 \times 10^{-2} & 5.68 \times 10^{-7} & 4.47 \times 10^{-4} & 6.45 \times 10^{-4} \\ 2.58 \times 10^{-9} & 1.06 \times 10^{-14} & 2.02 \times 10^{-11} & -5.91 \times 10^{-12} \end{bmatrix}}_{L} \quad (39)$$

$$(y - C\hat{x}).$$

2.4.3 External Torque Estimation

The external torque estimator receives as input the estimated state $\hat{x}$ over time, which is used to estimate the external torques acting on the satellite 100 to produce the observed motion. The external torque estimator first estimates the angular acceleration from the estimated angular rate by applying a time derivative and first-order low-pass filter transfer function with bandwidth $\omega_{\ddot{\theta}}$, the value of which is given in FIG. 10B, as follows, $$\hat{\ddot{\theta}}(t) = \mathcal{L}^{-1}\left\{\frac{s}{\frac{1}{\omega_{\ddot{\theta}}}s + 1}\hat{\dot{\Theta}}\right\} \quad (40)$$

Based on the estimate of the angular acceleration, the net torque applied to the satellite 100 that produces the angular acceleration in Eq. (40) should be equal to $J_{sat}\hat{\ddot{\theta}}$. The net torque is the sum of all torques applied to the satellite 100, namely the external torque and the reaction wheel torque. Thus, by subtracting the reaction wheel torque from the net torque, the external torque may be determined.

An integrator with gain $k_\tau$ may be used to produce a first measurement of a primary external torque estimate, $\hat{\tau}'_{ex}$, by integrating the difference between the predicted external torque and the current primary external torque estimate, $\hat{\tau}'_{ex} = J_{sat}\hat{\ddot{\theta}} - \hat{\tau}_{rw}$, according to the dynamics of Eq. (41). The primary external torque estimate, $\hat{\tau}'_{ex}$, is then run through another low-pass filter transfer function of bandwidth $\omega_\tau$ to produce the final estimate of the external torque, $\hat{\tau}_{ex}$, according to Eq. (42).

$$\hat{\tau}'_{ex} = k_\tau\left(J_{sat}\hat{\ddot{\theta}} - \hat{\tau}_{rw} - \hat{\tau}'_{ex}\right) \quad (41)$$

$$\hat{\tau}_{ex}(t) = \mathcal{L}^{-1}\left\{\frac{s}{\frac{1}{\omega_\tau}s + 1}\hat{T}'_{ex}\right\} \quad (42)$$

where $\hat{T}'_{ex}$ is the primary external torque estimate represented in the Laplace domain.

The running external torque mean $\bar{\tau}_{ex}$ is calculated as an average of the estimated external torque over the last orbital period P (or since the simulation start if the estimator has been running for less than an orbit). This is value is fed back to the state estimator as the second input in order to increase the fidelity of the state estimate without passing noise into the state estimate, $$\bar{\tau}_{ex}(t) = \begin{cases} \dfrac{1}{t}\displaystyle\int_0^t \hat{\tau}_{ex}(t)dt & \text{if } t < P \\[2mm] \dfrac{1}{P}\displaystyle\int_{t-P}^t \hat{\tau}_{ex}(t) & \text{if } t > P \end{cases} \quad (43)$$

2.4.4 Position and Velocity Estimation

For this model, a rough position and velocity estimator is used that assumes an initial position and velocity measurement were both correct, and propagates the position according to the last known velocity vector.

For GPS sample times given by $t_0, t_1 \ldots t_n, t_{n+1} \ldots$, the estimated position and velocity are given by, $$\begin{bmatrix}\hat{r}\\\hat{v}\end{bmatrix}(t) = \begin{bmatrix}r'_{gps} + v'_{gps}(t - t_n) \\ v'_{gps}\end{bmatrix}(t_n) \text{ for } t \in [t_n, t_{n+1}). \quad (44)$$

The noise of the GPS receiver is typically low in comparison to the large position magnitudes and orbital velocities. Thus, a simplistic representation of the GPS receiver may still effectively provide the information used to extract the atmospheric density.

For instance, only the position estimate of the satellite 100 is used to determine an estimate of the angular position of the satellite 100 within the orbit in order to determine the nadir direction and attitude with respect to the sun. A typical GPS receiver has a noise standard deviation of 5 m along track, which corresponds to a 15 m/6771000 m≈0.15 arcsec of 1σ noise in the position along track. This is an order of magnitude lower than even the star tracker's resolution, which indicates the simplistic representation of the GPS receiver is well justified.

2.4.5 Atmospheric Density Estimation

The last step in the chain of estimators is to extract the atmospheric density from the measured external torque. This may be accomplished by calculating the expected torques provided by the non-drag perturbations, subtracting them from the estimated external torque, and then solving for the density.

A best guess for current the solar radiation pressure torque and the gravity gradient torque are estimated from the estimated position and orientation of the satellite 100 using Eqs. (4)-(10) to yield $\hat{\tau}_{SRP}$ and $\hat{\tau}_g$. These estimates are both passed through a first-order low-pass filter transfer function identical to the filtering used in the external torque estimate. The output are corrected estimates $\hat{\tau}^c_{SRP}$ and $\hat{\tau}^c_g$ solar radiation pressure torque and the gravity gradient torque. By applying identical filter functions in this manner, the estimates of the different torques are assured to have temporal consistency with respect to one another.

The external torque estimate is corrected to account for the desaturation logic (e.g., by using a multiplication factor of −1 if the flipped desat mode is active) yielding $\hat{\tau}^c_{ex}$. The sign flip accounts for the fact that the external torque will be sensed in the opposite direction when the satellite flips around 180° into desaturation mode. This multiplication factor thus prevents a large discontinuity in the measured torque when the satellite flips. Then, the product of the estimated atmospheric density and coefficient of drag is given as, $$C_D \hat{\rho}(t) = \frac{2(\hat{\tau}^c_{ex} - \hat{\tau}^c_{SRP} - \hat{\tau}^c_g)}{(A_{flap} r_{\otimes-flap} - A_{body} r_{\otimes-body}) \hat{y}^2 \cos(\hat{\theta} - \hat{\Pi})}. \quad (45)$$

If the coefficient of drag for the spacecraft is known, then Eq. (45) may be divided by $C_D$ to give the estimated density. Otherwise, the satellite 100 outputs an estimate of the product of $C_D$ and $\rho$.

It should be appreciated that the coefficient of drag may also be unpredictable and may also change over time due to solar activity, temperature, and light conditions. Thus, in some implementations, the satellite 100 may output the product of $C_D$ and $\rho$ instead of the atmospheric density, $\rho$. The product of $C_D$ and $\rho$ may still be used to predict the orbital motion of the satellite 100 (and other satellites at similar altitudes) thus compensating for variabilities in atmospheric drag.

3. Exemplary Results Using a Simulated SPATULA Satellite

3.1 Calibration of the Moments of Inertia

FIGS. 8B and 8C show a typical simulated response to the calibration torque profile in FIG. 8A. If the reaction wheel torque is well-characterized and controlled as described by the RW model, a two-piece linear fit to the raw gyroscope data may produce a measurement of the moment of inertia of the satellite 100 to within approximately 0.02% error of the correct value. A two-piece linear fit to the raw reaction wheel data may produce a measurement of the moment of inertia of the reaction wheel with an error of less than one part in one million.

The errors in these estimates of the moment of inertia of the satellite 100 and the reaction wheel are small compared to the noise in the satellite 100. Thus, such uncertainties in the moment of inertia are negligible compared to other sources of measurement error. These calibrations are not an appreciable source of measurement error. Thus, for the remainder of the simulations, the estimated values for the moment of inertia of the satellite 100 and the reaction wheel are used to solve for the controller and estimator gain matrices before each simulation run as well as to calculate the estimated external torque.

3.2 MEMS Gyroscope Bias Correction

Figure 11A:
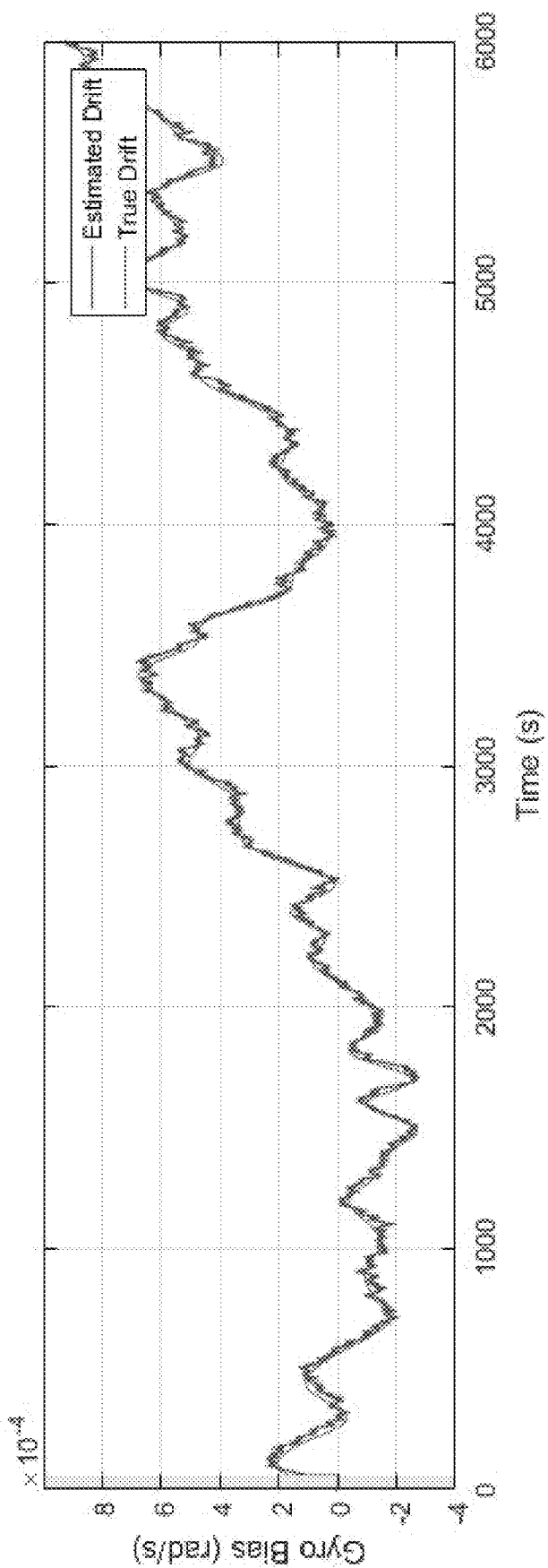
FIG. 11A shows a typical MEMS gyroscope bias and an estimated gyroscope bias over the course of a full simulated orbit.

FIG. 11A shows a typical gyroscope bias random walk as well as the estimate of the bias. As shown, the high accuracy of the filtered derivative of the star tracker signal captures even large amounts of bias drift. In the exemplary data shown in FIG. 11A, the bias drift over the course of a simulated orbit was as high as about $1 \times 10^{-3}$ rad/s, which corresponds to approximately 90% of the rotational velocity of the satellite 100. The satellite 100 would thus be unable to function over the course of the orbit 150 without the corrections provided by the bias corrector.

With the corrections, the root mean square error (RMSE) of the bias estimate over the entire orbit 150 is held under $3 \times 10^{-5}$ rad/s with the simulated gyroscope and star tracker. This corresponds to less than 2.5% error in the commanded angular velocity of satellite. This also corresponds to approximately 24% of the one-period bias instability $\Delta B$ of the gyroscope. Even over orbital timescales significantly longer than those of the gyroscope bias drift, the estimator is able to hold the bias error to fractions of the bias instability. The largest error observed after the startup transient was typically less than $1 \times 10^{-4}$ rad/s, which is only three times the RMSE error and equivalent to approximately 8% of the commanded satellite angular velocity.

3.3 External Torque and Density Estimation

Multiple atmospheric density profiles were used to test the methods described above. These density profiles were categorized as either periodic or non-periodic. The periodic waveforms comprised of low-frequency sinusoidal density profiles, which were approximately representative of the known atmospheric density variation from the light side to the dark side of the Earth, as described in the Harris-Priester atmospheric model. The non-periodic test waveform was comprised of a non-physical frequency chirp used primarily to test the frequency response of the atmospheric density estimate.

3.3.1 Periodic Density Profiles

The first density profile $\rho_1(t)$ was a high-amplitude cosine wave that varied in amplitude from 0 kg/m³ to $10 \times 10^{-12}$ kg/m³ with a period equal to the orbital period as described by Eq. (46). This profile replicates the shape of a Harris-Priester atmosphere, but with a larger amplitude than what the Harris-Priester model predicts at 400 km altitude. For reference, the Harris-Priester model predicts the magnitude at the 400 km altitude ranges between approximately $7.5 \times 10^{-12}$ kg/m³ and $2.2 \times 10^{-12}$ kg/m³.

Figure 11B:
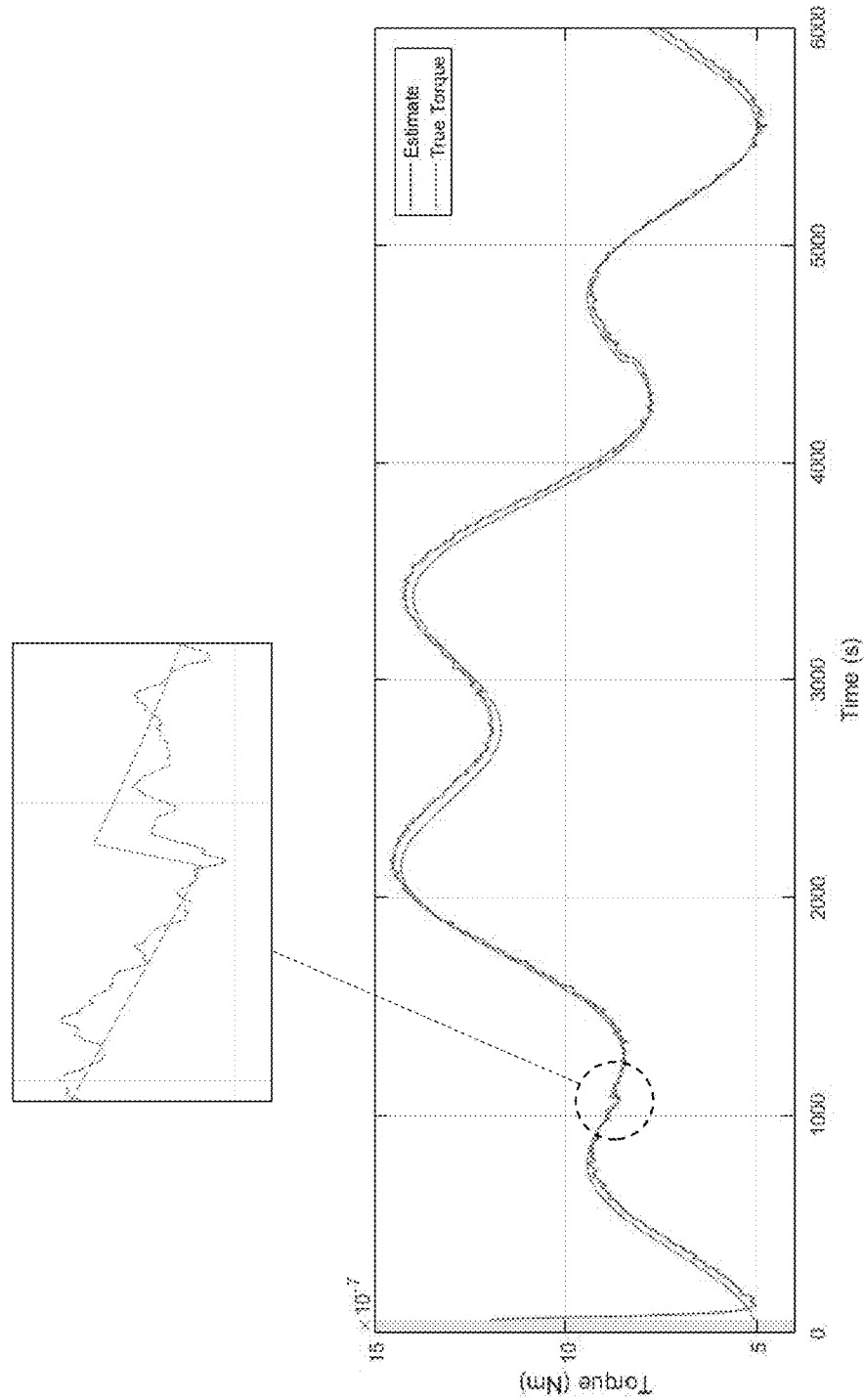
FIG. 11B shows the estimated external torque in a modeled atmosphere based on the second density profile, $\rho_2(t)$, according to Eq. (47).

The second profile $\rho_2(t)$ is a more complex sinusoid with higher-frequency components and a smaller amplitude. The second profile is intended to test unpredictable changes in the atmosphere at higher altitudes. The profile is described by Eq. (47) and roughly approximates the amplitude of the Harris-Priester atmospheric variation at 440 km with the addition of higher-frequency variation. A typical estimated external torque response to $\rho_2$ is shown in FIG. 11B. As shown, discontinuities are observed in the true torque, which may be attributed to the satellite 100 entering/exiting the eclipse.

$$\rho_1(t) = 5 \times 10^{-12} \text{ kg/m}^3 (1 - \cos \Pi(t)) \quad (46)$$

$$\rho_2(t) = 3 \times 10^{-12} \text{ kg/m}^3 - 1 \times 10^{-12} \text{ kg/m}^3 \cos \Pi(t) - 5 \times 10^{-13} \text{ kg/m}^3 \cos 4\Pi(t) \quad (47)$$

After performing multiple simulation runs with the first atmospheric density profile, $\rho_1$, the RMS error of the external torque estimate was found to be $7.7 \times 10^{-8}$ N·m, or 2.5% of the torque range measured. The RMS error of the atmospheric density estimate was determined to be at around $1.3 \times 10^{-13}$ kg/m³, or 1.3% of the density amplitude.

After performing multiple simulation runs with the second atmospheric density profile, $\rho_2$, the RMS error of the external torque estimate was reduced to $3.5 \times 10^{-8}$ N·m, or approximately 5% of the torque range measured. The RMS error of the atmospheric density estimate was approximately $1.0 \times 10^{-13}$ kg/m$^3$, or 5.0% of the density amplitude. The error values from these simulations are summarized in FIG. 15.

3.3.2 Frequency Response

As described above, a non-periodic atmospheric density waveform, $\rho_3$, was used to test the frequency response of the atmospheric density estimate. The density waveform included a quadratic frequency chirp in density from 1/15 min$^{-1}$ to 2 min$^{-1}$ with an amplitude of $2 \times 10^{-12}$ kg/m$^3$. It should be noted that the density waveform, $\rho_3$, is not representative of actual atmospheric density variation. This level of variation is roughly equivalent to tracking the atmospheric density variation at an altitude of around 440 km.

Figure 12A:
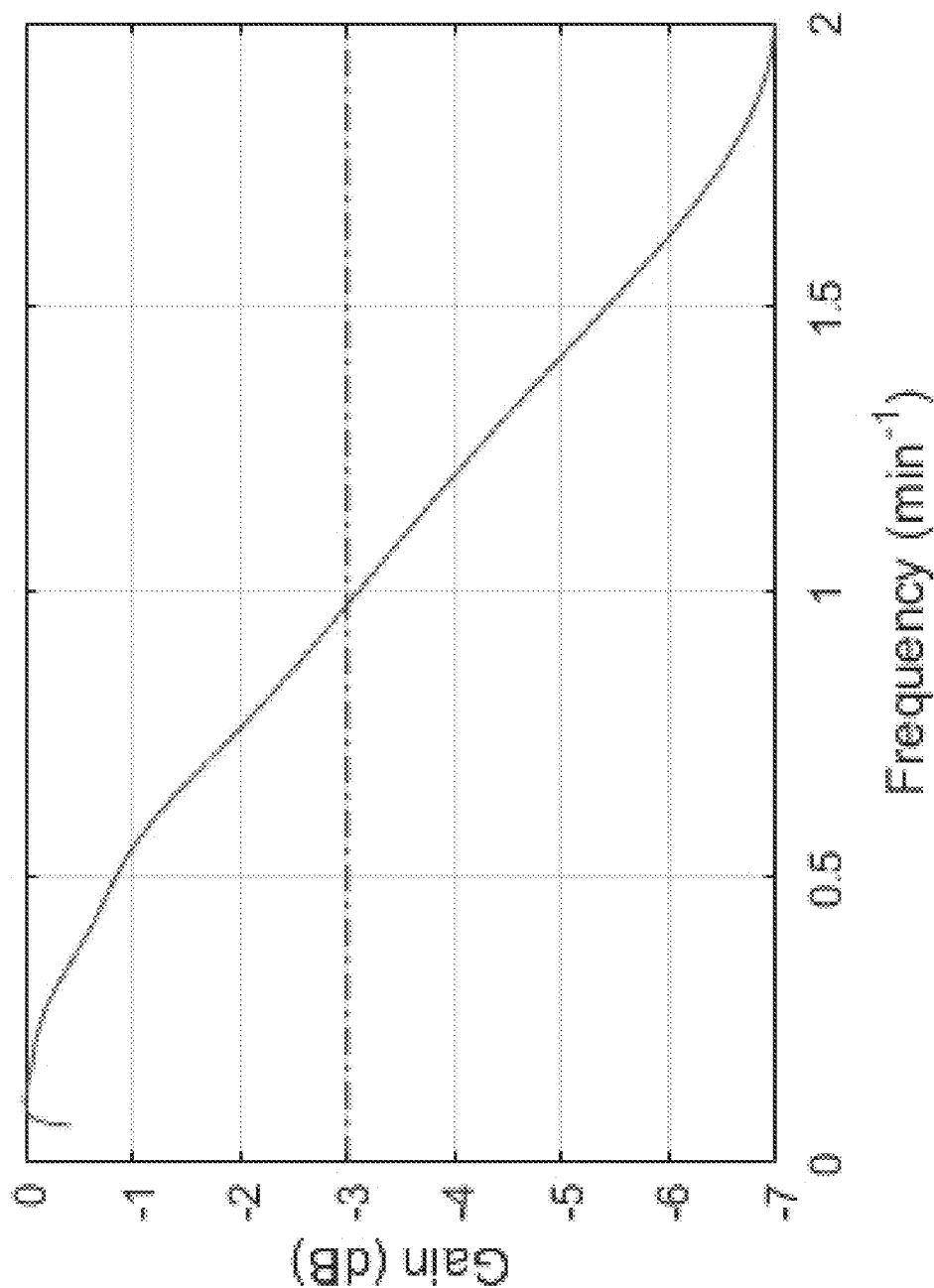
FIG. 12A shows a Bode plot of the gain in a frequency response of the density estimation simulated using a density chirp with an amplitude of $2\times10^{-12}$ kg/m$^3$.
Figure 12B:
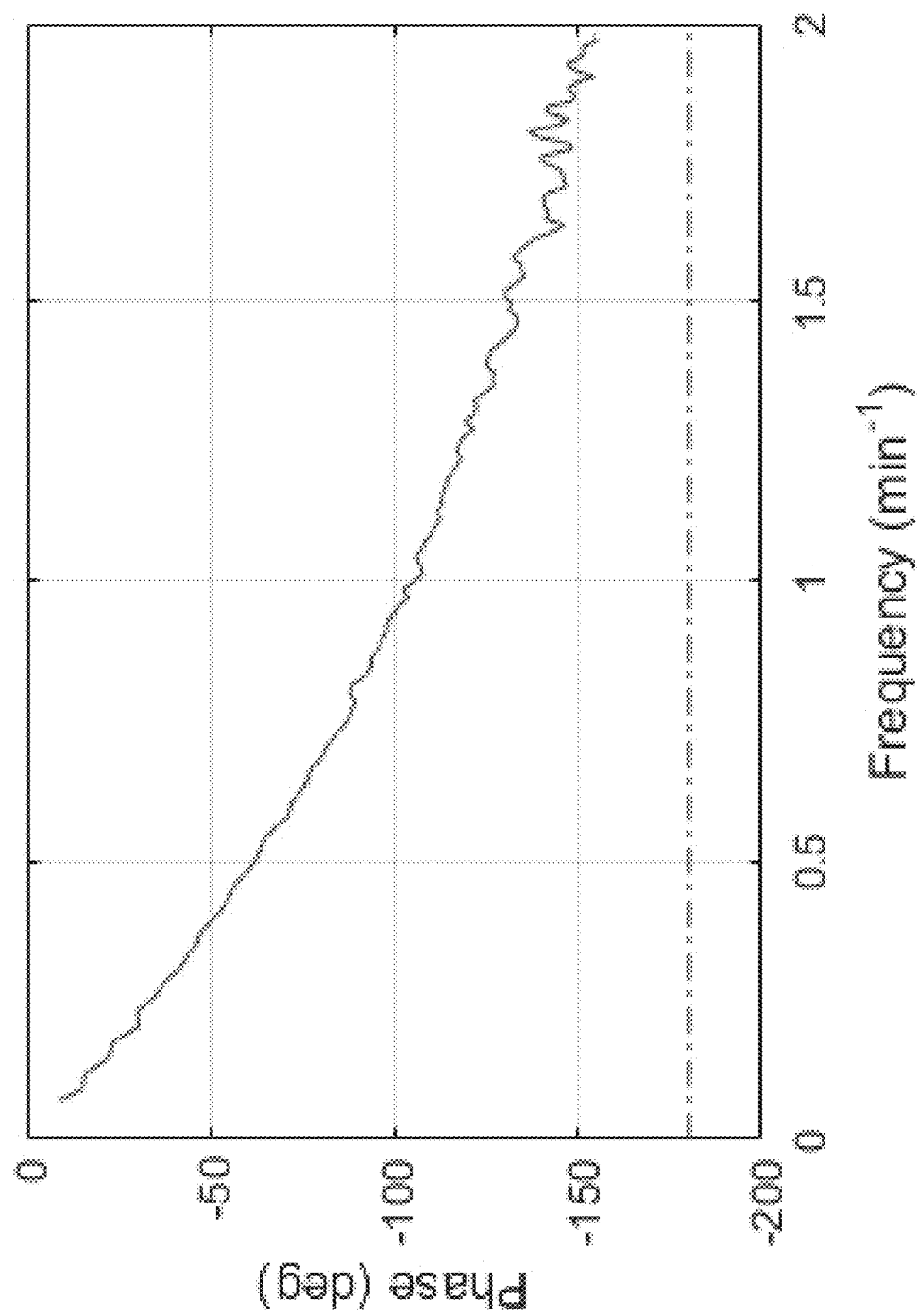
FIG. 12B shows a Bode plot of the phase of the frequency response of FIG. 12A.

FIGS. 12A and 12B show Bode plots of the frequency response to this density profile. The −3 dB bandwidth is equal to 1 min$^{-1}$, which corresponds to the bandwidth of the low-pass filter used in the estimator. The phase margin at the −3 dB point is approximately 95°, which indicates the model of the satellite 100 and the methods described above may track high-rate changes with manageable phase lag. It should be appreciated the bandwidth of the estimator may be tuned during operation to other values. For instance, a narrower bandwidth may be used to increase the accuracy of the atmospheric density estimates so long as the atmospheric density fluctuates slowly. For instance, the bandwidth may be tuned to about 0.03 min$^{-1}$ to about 1 min$^{-1}$.

3.4 Desaturation

Figure 13A:
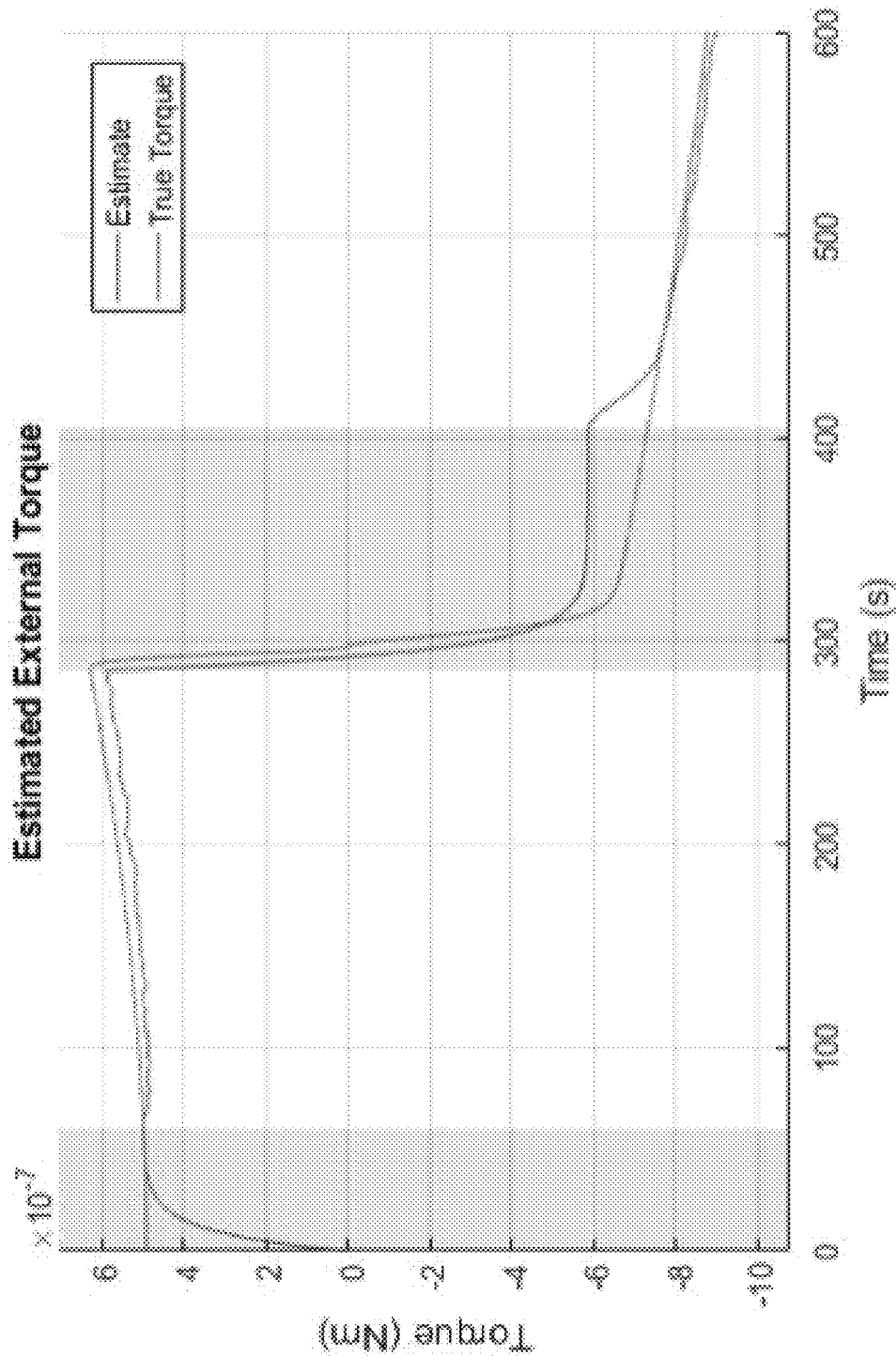
FIG. 13A shows a chart of the estimated external torque during saturation and desaturation of the reaction wheel. The shaded region of the plot indicates the period of time when the estimators of torque and density are paused for the flip.
Figure 13B:
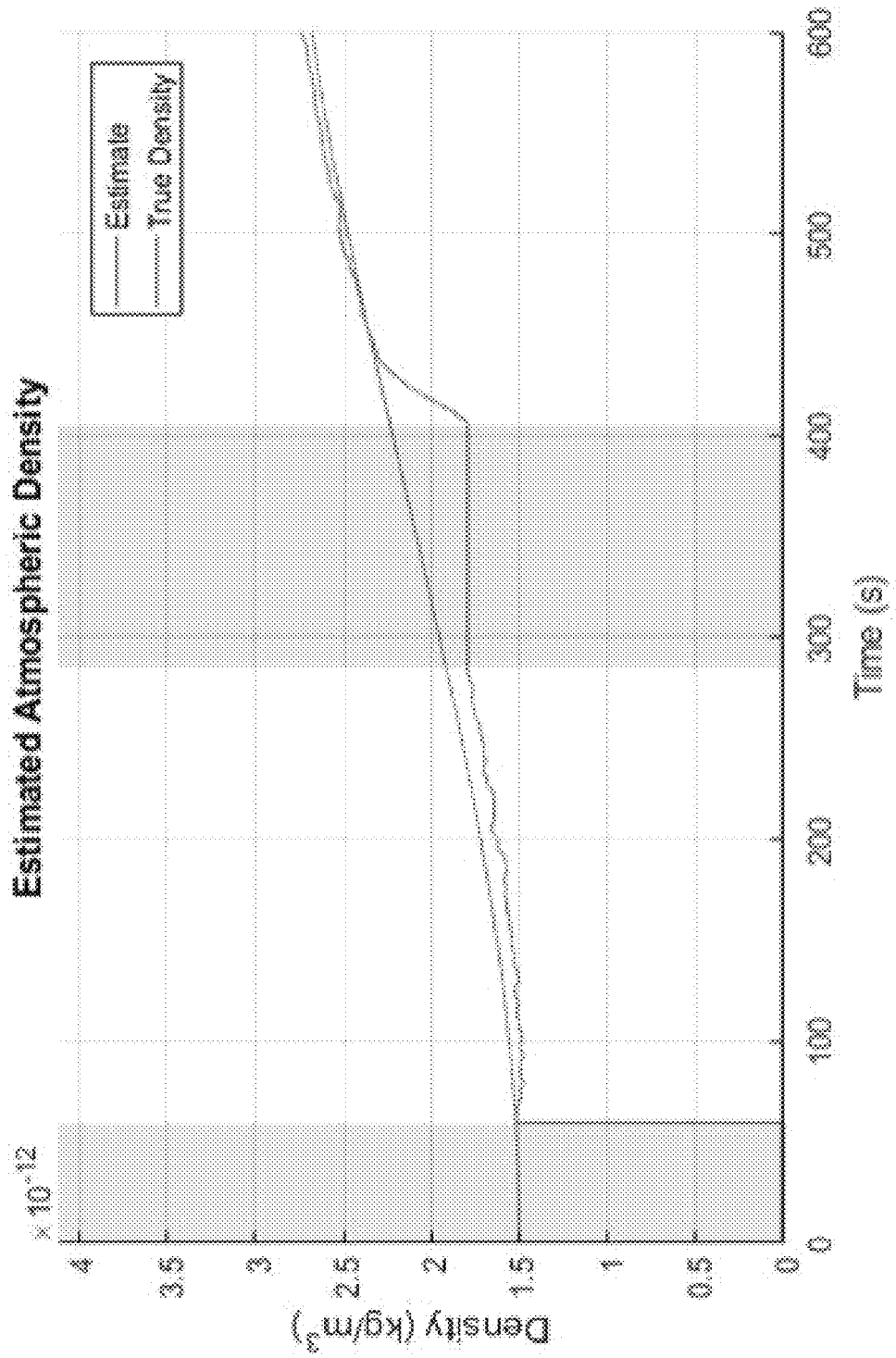
FIG. 13B shows a chart of the estimated atmospheric density during the saturation and desaturation of the reaction wheel of FIG. 13A. The shaded region of the plot indicates the period of time when the estimators of torque and density are paused for the flip.

Simulations of the desaturation process, specifically the flipping maneuver of the satellite 100, may be used to effectively desaturate the reaction wheel without affective the external torque estimation over time. FIG. 13A shows a chart of the estimated external torque as a function of time during a period where a desaturation process is performed. FIG. 13B shows the corresponding atmospheric density estimate as a function of time for the desaturation process shown in FIG. 13A. The shaded regions of each plot indicate the period of time when the estimators of torque and density are paused for the flip. As shown, the flipping maneuver performed during measurement of a periodic atmospheric density waveform may induce a temporary error at approximately four times the RMS error of the overall atmospheric density measurement.

Additionally, this anomalous error occurs predictably at known measurement times, which suggests the external torque and density estimation is robust to the desaturation technique. The simulations of the satellite 100 indicate that the desaturation process should be performed approximately every 8 hours during normal measurement operations. The flipping maneuver takes about 2 minutes to perform. Thus, the downtime of the satellite 100 for desaturation is about 0.4% of the total operational lifetime of the satellite 100.

An Exemplary Constellation of SPATULA Satellites for Density Mapping

The previous results suggest a SPATULA satellite 100 can effectively measure the local atmospheric density proximate to the satellite 100. In particular, the drag flap 120 increases the sensitivity of the satellite 100 to drag torques caused by atmospheric drag applied along the ram side of the satellite 100. For the satellite 100 depicted in FIGS. 2A and 2B, the satellite 100 may not be sensitive to cross-track orbital winds applied along non-ram sides of the satellite 100.

One approach is to use a constellation of SPATULA satellites 100 that follow different orbital planes. Such a constellation may be used, in part, to quantify the vector nature of the thermospheric winds in the atmosphere as well estimate a global atmospheric density map.

4.1 Spherical Harmonic Density Function Estimation

The atmospheric density may be assumed to be a mathematically smooth function on the surface of a sphere (e.g., the spherical surface has a radius equal to the orbital radius of the satellite 100). Under this assumption, the global atmospheric density estimate may be described using a series of spherical harmonics according to Eq. (48), $$\hat{\rho}(\Omega) = \sum_{\ell,m}^{\ell_{max}} a_{\ell,m} Y_{\ell,m}(\Omega) \qquad (48)$$

where $Y_{l,m}$ denotes the Laplace spherical harmonics of degree l and order m and $\alpha_{l,m}$ is the coefficient of $Y_{l,m}$. The longitude, $\lambda$, and latitude, $\varphi$, define a solid angle location, $\Omega = (\lambda, \varphi)$, on the spherical shell. $1_{max}$ is the highest spherical harmonic degree of the density estimate function.

Given that a SPATULA satellite 100 has recorded numerous atmospheric density estimates, which are evenly spaced in time over the course of a single orbit 150, a vector of raw measurements, $\rho'$, may be converted to a corrected measurement vector, $\rho^c$, for the orbit 150 using an approximate inverse of the frequency-domain transfer function depicted in FIGS. 12A and 12B. This transfer function may be applied up to a cutoff frequency, $f_{cutoff}$, to avoid division by arbitrarily small, poorly-characterized gains. If the estimated transfer function of the SPATULA estimator is defined by a gain term G(f) and a phase term $\psi$(f), then the vector of corrected measurements $\rho^c$ is given by, $$\rho^c = IFFT\left(FFT(\rho') \cdot \begin{cases} \frac{1}{G(f)} e^{-i\phi(f)} & \text{for } |f| < f_{cutoff} \\ 1 & \text{for } |f| \geq f_{cutoff} \end{cases}\right) \qquad (49)$$

If the orbital period is P, then $f_{cutoff}$ should be close to but greater than $1_{max}/P$, since at most $1_{max}$ oscillations per orbit can be characterized by the density estimate function according to Eq. (48).

The corrected measurement vectors from each satellite 100 may be combined such that the constellation provides N corrected density measurements $\rho_1^c \ldots \rho_N^c$ at locations $\Omega_1 \ldots \Omega_N$. In order to estimate the global density function, the spherical harmonic coefficients $\alpha_{l,m}$ should be estimated from the measurements taken around the sphere. An exemplary procedure to determine the spherical harmonic coefficients is given by Pollaine and Haan. The goal is to find the coefficients that reduce the least-squares error function as follow, $$\hat{\alpha} = \operatorname*{argmin}_{a_{\ell,m}} \frac{1}{2} \sum_{i=1}^{N} \left(\sum_{\ell,m}^{\ell_{loss}} (a_{\ell,m} Y_{\ell,m}(\Omega_i)) - \rho_i^c\right)^2 \qquad (50)$$

where $\hat{\alpha}$ is the estimated vector containing the spherical harmonic coefficients. By setting partial derivatives to zero and rearranging the terms in Eq. (50), a set of equations can be derived as follows, $$\sum_{p,q}^{\ell_{loss}} a_{p,q} \left( \sum_{i=1}^{N} Y_{p,q}(\Omega_i) Y_{\ell,m}(\Omega_i) \right) = \sum_{i=1}^{N} \rho_i^c Y_{\ell,m}(\Omega_i). \quad (51)$$

These equations by Pollaine and Haan are equivalent to the following matrix equations, $$\sum_{i=1}^{N} \underbrace{\begin{bmatrix} Y_{0,0}(\Omega_i)Y_{0,0}(\Omega_i) & \cdots & Y_{0,0}(\Omega_i)Y_{max}(\Omega_i) \\ Y_{1,-1}(\Omega_i)Y_{0,0}(\Omega_i) & \cdots & Y_{1,-1}(\Omega_i)Y_{max}(\Omega_i) \\ Y_{1,0}(\Omega_i)Y_{0,0}(\Omega_i) & \cdots & Y_{1,0}(\Omega_i)Y_{max}(\Omega_i) \\ Y_{1,1}(\Omega_i)Y_{0,0}(\Omega_i) & \cdots & Y_{1,1}(\Omega_i)Y_{max}(\Omega_i) \\ \vdots & \ddots & \vdots \\ Y_{max}(\Omega_i)Y_{0,0}(\Omega_i) & \cdots & Y_{max}(\Omega_i)Y_{max}(\Omega_i) \end{bmatrix}}_{M} \underbrace{\begin{bmatrix} a_{0,0} \\ a_{1,-1} \\ a_{1,0} \\ a_{1,1} \\ \vdots \\ a_{max} \end{bmatrix}}_{\hat{a}} = \quad (52)$$

$$\sum_{i=1}^{N} \rho_i^c \underbrace{\begin{bmatrix} Y_{0,0}(\Omega_i) \\ Y_{1,-1}(\Omega_i) \\ Y_{1,0}(\Omega_i) \\ Y_{1,1}(\Omega_i) \\ \vdots \\ Y_{max}(\Omega_i) \end{bmatrix}}_{z}$$

where $Y_{max} = Yl_{max}$, $l_{max}$. Eq. (52) may be solved by matrix inversion $\hat{\alpha} = M^{-1}z$ or by a more efficient matrix left division algorithm $\hat{\alpha} = M\backslash z$, as long as M is full rank. For a spherical harmonic degree $l_{max}$, there will be $(l_{max}+1)^2$ coefficients, and so the number of measurements N should satisfy $N \geq (l_{max}+1)^2$ for M to be invertible.

4.2 Constellation Orbit(s)

The inversion of Eq. (52) determines a lower bound on the number of observations for the estimate to be solvable. In other words, the estimate only provides meaningful results if the measurements are spread out across the surface of the sphere. Circular orbits trace great circles around a shell of constant altitude if perturbations are ignored. For measurements made along the great circle paths, Pollaine and Haan imposes the number of great circle paths should be at least one greater than the reconstructed degree $l_{max}$ and these great circles should be well-distributed over the sphere. This latter specification is the more limiting since many samples can be taken around each orbit, but the number of great circles is limited by the number of constellation orbital planes.

Additionally, this method only estimates the density function at one altitude. To get meaningful results throughout the upper atmosphere, outside models should be used that are either correlated to the density at the one known altitude or used to determine the scale height. If density function estimates can be performed for at least two altitudes (e.g., thus giving $\hat{\rho}_1(\lambda, \varphi)$ at $h_1$ and $\hat{\rho}_2(\lambda, \varphi)$ at $h_2$), then a scale height can be found and an exponential interpolation performed as follows, $$\hat{h}_s(\lambda, \phi) = \frac{h_2 - h_1}{\ln(\hat{\rho}_2(\lambda, \phi)) - \ln(\hat{\rho}_1(\lambda, \phi))} \quad (53)$$

$$\hat{\rho}(\lambda, \phi, h) = \hat{\rho}_1(\lambda, \phi) \exp\left( \frac{h - h_1}{\hat{h}_s(\lambda, \phi)} \right) \quad (54)$$

Furthermore, the refresh rate of the global density estimate is also important to consider. The refresh rate describes how long it takes for the estimated density model to account for sudden changes in the atmospheric density. The harmonic coefficient calculation is based on samples around a great circle. If only one satellite 100 is used per orbital plane, then the full orbital period P is the amount of time for the great circle of samples to be completely refreshed. If two satellites 100 are used per orbital plane and equally spaced, then the great circle may be resampled at every half orbital period. If N satellites 100 are used per orbital plane and are equally spaced along the circular orbit, the orbit may be resampled and the estimation re-run at every interval P/N.

Newly recorded data from each satellite 100 may be incorporated into the global estimate more often than the refresh time of the global density estimate (e.g., or even in real-time as the new data is obtained by each satellite 100). As a result, the global density estimate function may be calculated using data as old as the complete refresh time.

Based on this analysis, a constellation of SPATULA satellites 100 should have the following properties in order to calculate an estimated spherical harmonic density map $\hat{\rho}(\lambda, \varphi, h)$ with a degree of $l_{max}$:

(1) The orbit of each satellite 100 should be circular as assumed in the density estimation analysis.

(2) At least two constant-altitude shells should be used in order to infer a scale height.

(3) At least $l_{max}+1$ separate orbital planes should be used at each sampled altitude.

(4) The orbital planes at each altitude should be distributed to leave as few large gaps as possible.

(5) The number of satellites per orbital plane should be at least the orbital period divided by the desired complete refresh time of the estimate.

4.3 Constellation Simulation
4.3.1 Constellation Design

The preferred constellation shape for the measurement of the global density map of a planet (e.g., Earth) should involve orbit poles spread evenly about the planet in a geodesic pattern. However, this indicates that the satellites 100 should be deployed at multiple different inclinations, which may cause the constellation to drift out of alignment due to differential nodal regression. The main factor in designing the constellation is to assure that the orbital planes are as spread out as possible within each orbital shell so that there are no large gaps between orbits (as this may lead to unsampled or undetermined spherical harmonic modes), and to assure that the constellation is stable. One exemplary constellation that satisfies these conditions is a Walker constellation. If the final constellation should measure $l_{max}$ spherical modes at a given altitude shell, then at least $l_{max}+1$ Walker planes should be used.

With respect to the inclination of the orbital planes, the largest gap along the equator of a p-plane Walker constellation is given by, $$\Delta RAAN = \begin{cases} 360°/p & \text{if } p \text{ is even} \\ 360°/2p & \text{if } p \text{ is odd.} \end{cases} \quad (55)$$

In general, an odd number of orbital planes is recommended to reduce the large gap between orbits as shown in Eq. (55). The approximate angular diameter of the polar gap is given by $180°-2i$. The angular diameter should be no larger than the equatorial plane spacing, but if the angular diameter is smaller, gaps in the rest of the constellation may increase. Therefore, i is chosen to be, $$i = \frac{1}{2}(180° - \Delta RAAN). \quad (56)$$

The number of satellites per plane should be determined by the desired estimation refresh time. It should be appreciated that if a single satellite 100 is used per orbital plane, the refresh time is on the order of 90 minutes, which is sufficient for most use cases. For the purposes of the simulation, only one satellite 100 is considered per orbital plane, but additional satellites 100 may be flexibly added at any time.

With respect to phasing, the best practice is to use a non-zero phasing number f such that the satellites are well-distributed. In this manner, the oldest samples of each great circle are not co-located. For example, if the satellites were all phased together, then one pole would have data at least half the period old each time the estimation is run.

The recommended configuration for a Walker constellation of SPATULA satellites 100 is to choose an even $l_{max}$, such that there are an odd number of planes. Thus, $$i = 90°\left(1 - \frac{1}{\ell_{max} + 1}\right)$$

$$t = \left[\frac{P}{T_{refresh}}\right](\ell_{max} + 1)$$

$$p = \ell_{max} + 1$$

$$f \neq 0$$

At least two of these constellations, at different altitudes, should be established. An exemplary configuration of two nested 84°: 15/15/1 constellations are shown in FIG. 14A.

4.3.2 Simulation

Previously developed atmospheric models were limited to a relative low harmonic degree due to the lack of observable test satellites. For example, the Air Force High Accuracy Satellite Drag Model, or HASDM, used $l_{max}=2$. A constellation of satellites 100 may enable atmospheric models at much higher order harmonics. For a proof of concept, $l_{max}=14$ was chosen. However, it should be appreciated that much higher order harmonics may be used.

Figure 14A:
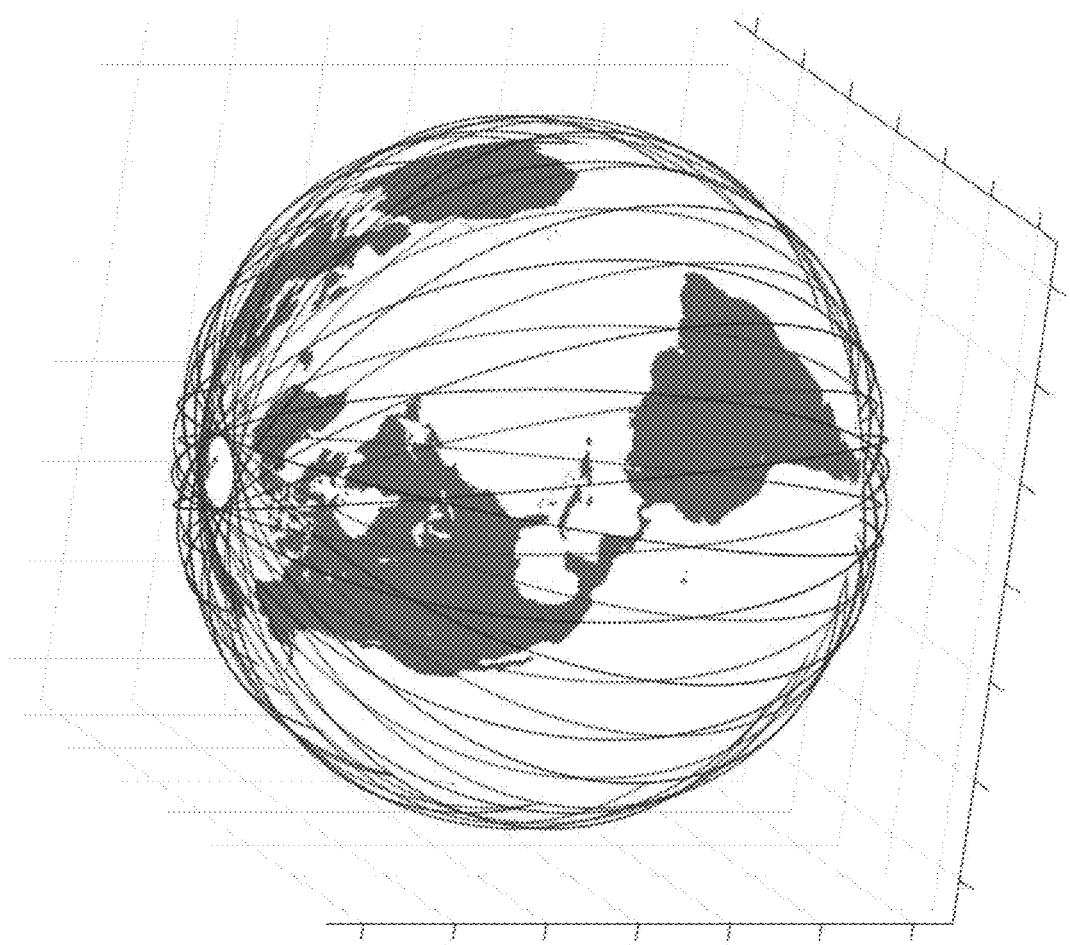
FIG. 14A shows an exemplary configuration of two nested 84°:15/15/1 Walker constellations.
Figure 14B:
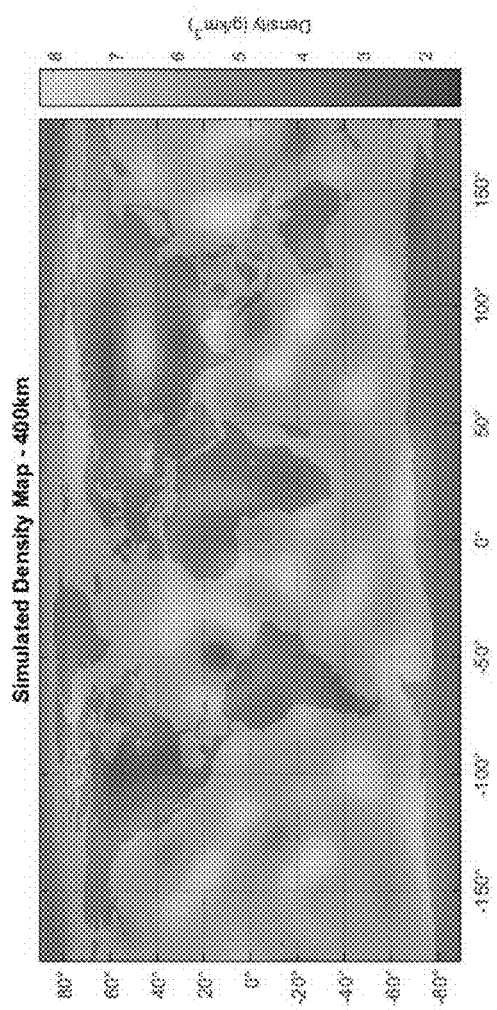
FIG. 14B shows a simulated density map at an altitude of 400 km.
Figure 14C:
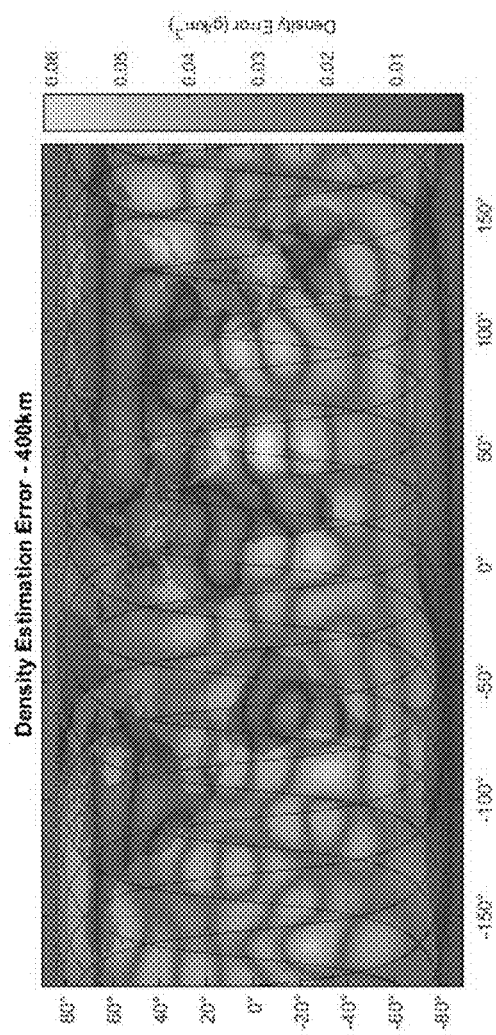
FIG. 14C shows an estimation error map for the simulated density map of FIG. 14B.
Figure 14D:
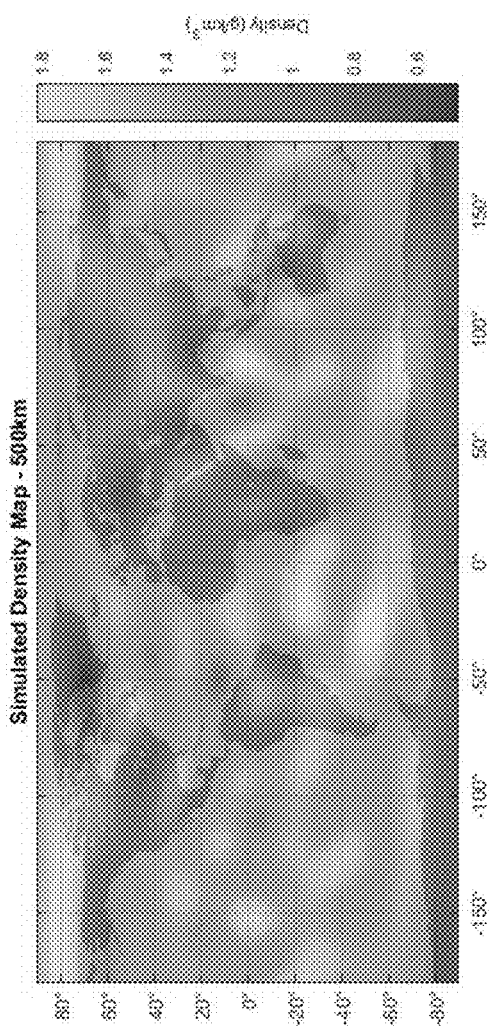
FIG. 14D shows a simulated density map at an altitude of 500 km.
Figure 14E:
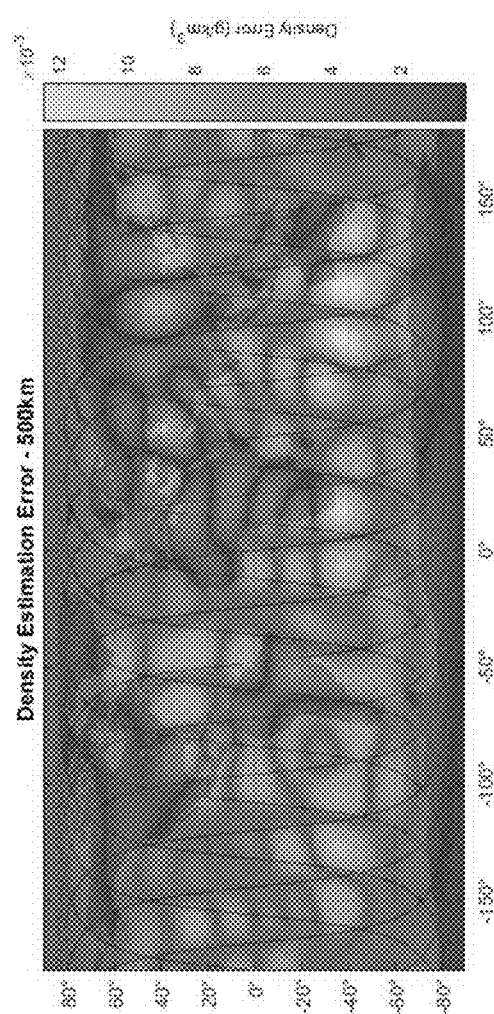
FIG. 14E shows an estimation error map for the simulated density map of FIG. 14D.
Figure 14F:
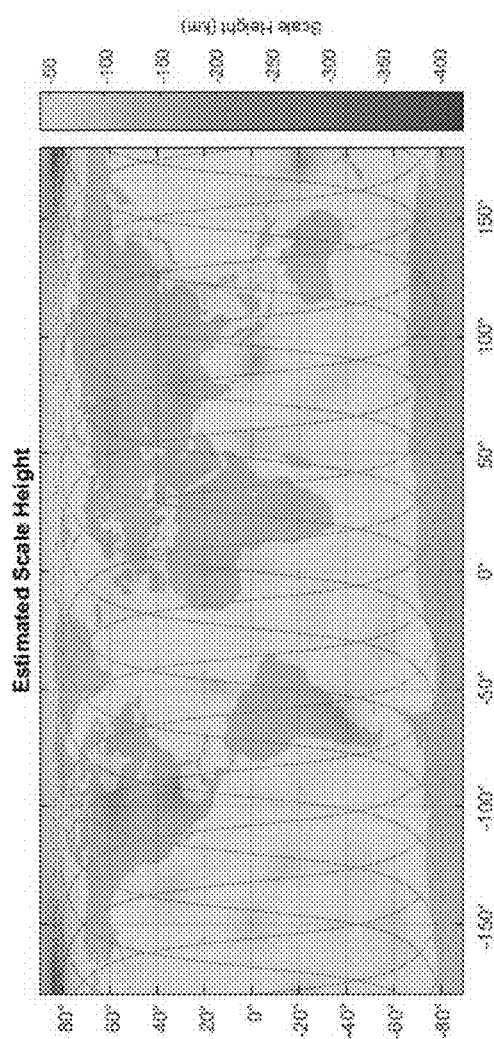
FIG. 14F shows an estimated scale height map.
Figure 14G:
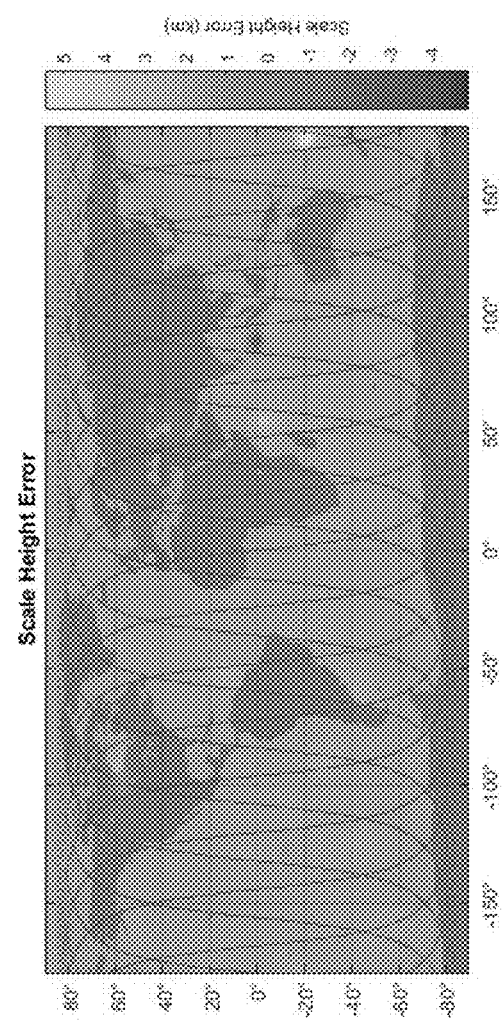
FIG. 14G shows an estimated scale height error map for the estimated scale height map of FIG. 14F.

Two Walker 84°:15/15/1 constellations of SPATULA satellites 100 were simulated using Matlab at 400 km and 500 km altitude as shown in FIG. 14A. Non-physical high-order test atmospheres of degree $l_{max}=14$ were randomly generated at each altitude, within the bounds specified by the Harris-Priester model. To simulate the atmospheric density measurements, the actual density was sampled once per minute around the orbit, and was put through a transfer function based on FIGS. 12A and 12B. In each case, the transfer function was calculated by randomly generating a curve within a 20% envelope (3σ) around the actual transfer function curve. Then, the data was corrected according to Eq. (49) using the transfer function curve of FIGS. 12A and 12B and a cutoff frequency of $2l_{max}/P$. This replicates correction of the measurements using an imperfect characterization of the satellites 100. The corrected measurements were then used to estimate the atmosphere parameters based on the inversion of Eq. (52) using a matrix left division algorithm. Typical simulation results are shown in FIGS. 14B-14G.

The atmospheric density estimates exhibited errors less than 1% of the largest density observed at each altitude. The peaks in estimation error, as expected, fall in the largest gaps of the Walker constellation. The scale heights show small isolated spots with larger errors, but these errors are still within a few kilometers of the correct value. The vast majority of the map, outside of these small zones, is within a kilometer or so of the correct value, which again corresponds to approximately a 1% error. As shown, even with the imperfect transfer function characterization, a constellation of satellites 100 is able to sample and estimate the spherical harmonic coefficients up to l=14. This corresponds to a $15^2=225$ parameter model in each shell and a 450-parameter model overall, which is an improvement over previous empirical models. Furthermore, the simulated atmospheric density profiles were non-physical in that high-order content included in the atmospheric density profile is unlikely to be observed in the actual atmosphere. This suggests the effects of these localized spot errors may be reduced.

Summary of Results

FIG. 15 shows a summary of the estimation error parameters discovered through simulation and discussed in the previous sections. As shown, the simulation results suggest the SPATULA satellite 100 described herein may be used to provide estimates of the atmospheric density at an accuracy and frequency comparable to conventional approaches, but, unlike conventional approaches, the satellite 100 can provide such atmospheric density estimates in real time using a smaller, cheaper satellite design (e.g., a cubesat form factor) with commercially available sensors.

A single SPATULA satellite 100 is able track atmospheric density variations using on-board real-time estimators with a sufficiently large bandwidth to track quick, minute-scale variations. The bandwidth provided by the satellite 100 is comparable to other proposed small satellites configured to measure the atmospheric density, despite being approximately 50 times smaller in size. Without the use of specially designed ultra-high-precision science instruments, the SPATULA satellite 100 is still able to provide results roughly replicating those of the CHAMP and GRACE dedicated science satellites. Furthermore, no ground-based post processing is used since all measurements and processing are performed in-situ in the satellite 100.

Based on the approximate $1 \times 10^{-13}$ kg/m³ RMS error observed, the satellite 100 may be used to provide atmospheric drag estimates from low altitude orbits (e.g., about 300 km) to sun-synchronous orbits (e.g., greater than 600 km). The bandwidth of the method may be sufficient to capture fast transients near the poles as well as sudden changes due to solar activity. The accuracy is high enough to provide meaningful input for the creation of new thermospheric models.

Since the satellite 100 is small and uses commercial-grade measurement equipment, the satellite 100 can be made sufficiently inexpensive to enable deployment of a constellation of satellites 100 able to provide a near real-time spherical harmonic global density map.

In some implementations, the constellation may provide density maps up to high spherical harmonic degrees. However, reaching such large harmonics may not be necessary to produce useful global density maps. For example, the constellation may be gradually deployed by slowly adding orbital planes and increasing the estimated harmonic degree until the full constellation is set up and deployed. Once the desired harmonic degree is achieved, more satellites 100 may be added to each orbital plane in order to decrease the complete refresh time of the estimation. The independence of each satellite 100 and the global nature of the estimation suggests that no single satellite 100 or subset of satellites 100 affects the operation of the constellation. If a portion of the satellites 100 in the constellation are lost, the harmonic degree in the global density map estimation may be reduced to account for such losses.

This aspect makes a constellation of SPATULA satellites especially attractive since the addition of each satellite 100 may improve the spatial and/or temporal resolution of the global density map and the risk of constellation failure is very low.

The use of a drag flap 120 on the satellite 100 provides a way to amplify the measured quantity of interest (i.e., the drag torque) without reducing the performance and/or the lifetime of the satellite 100. For conventional approaches based on measurements of the drag force, a similar amplification of the drag force may be achieved by either increasing the drag coefficient or the cross-sectional area. Although such modifications may enable measurement of the drag force without use of expensive, high-precision accelerometers or other instrumentation, the higher drag force applied to the satellite decreases the lifetime.

Additionally, perturbing orbital forces, which as described above may be orders of magnitude larger than the drag force, do not induce appreciable torques on satellite bodies. Thus, measurements performed in the torque domain may provide a less noisy, cleaner estimation of the atmospheric density while using less expensive sensors and less knowledge of external forces applied to the satellite.

As mentioned above, the study performed modeled a single reaction wheel assuming the drag flap 120 applied a drag torque primarily about a single rotation axis (e.g., the Z axis). However, in actual implementations of the satellite 100, external torques may be applied about all coordinate axes (e.g., the drag flap 120 applies a significant drag torque about the Z axis and other perturbing torques are applied about the X and Y axes). Thus, the satellite 100 may be configured to monitor and estimate external torques applied to the X, Y, and Z axes or any subset of said axes. In other words, the method describe above may be adapted for a full 6-degree of freedom (DoF) model (e.g., 3 translational DOF's and 3 rotational DOF's) to account for cross-axis effects and non-linearities. To achieve this, the controller and the state estimator may be adapted to accommodate a fully 3-axis stabilized satellite 100.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of estimating an atmospheric density proximate to a satellite in an orbit around the Earth, the method comprising:
   A) operating the satellite during the orbit to subject the satellite to a significant external torque;
   B) measuring the external torque to which the satellite is subjected during the orbit; and
   C) estimating the atmospheric density proximate to the satellite based at least in part on the external torque measured in B).

2. The method of claim 1, wherein the satellite comprises:
   a bus; and
   a drag flap coupled to the bus,
   and wherein A) comprises:
   A1) deploying the drag flap during the orbit to subject the satellite to a drag torque about a first axis passing through the bus of the satellite, the significant external torque comprising the drag torque.

3. The method of claim 2, wherein the drag flap comprises:
   a moment arm having a proximal end coupled to the bus and a distal end; and
   a drag panel coupled to the distal end of the moment arm, and wherein in A1):
   the moment arm has a length such that a significant angular acceleration of the satellite is generated about the first axis per unit drag force applied to the flap; and
   the moment arm has a natural frequency greater than or equal to about 1 $min^{-1}$.

4. The method of claim 2, wherein:
   the drag flap has a proximal end coupled to the bus and a distal end;
   the proximal end and the distal end of the drag flap define a longitudinal axis of the drag flap; and
   A1) comprises:
   deploying the drag flap such that the longitudinal axis of the drag flap is substantially parallel to a gravitational gradient.

5. The method of claim 2, wherein the satellite further comprises a reaction wheel, and wherein A) further comprises, after A1):
   A2) applying a first torque to the satellite about the first axis, via the reaction wheel, to counteract the external torque to which the satellite is subjected so as to substantially mitigate rotation of the satellite about the first axis.

6. The method of claim 5, wherein:
   the drag flap has a proximal end coupled to the bus and a distal end;
   the proximal end and the distal end of the drag flap define a longitudinal axis of the drag flap;
   A1) comprises deploying the drag flap such that the longitudinal axis of the drag flap is in a plane perpendicular to the first axis and is positioned at a first angle of rotation about the first axis;
   during A2), a first angular momentum of the reaction wheel about the first axis increases until reaching a first saturation point; and
   A) further comprises:
   A3) upon the first angular momentum of the reaction wheel about the first axis reaching the saturation point, allowing the satellite to rotate about the first axis to reposition the drag flap in the plane perpendicular to the first axis at a second angle of rotation about the first axis so as to desaturate the first angular momentum of the reaction wheel about the first axis;
   A4) applying a second torque to the satellite about the first axis, via the reaction wheel, to counteract the external torque to which the satellite is subjected so as to substantially mitigate rotation of the satellite about the first axis, wherein during A4), a second angular momentum of the reaction wheel about the first axis increases until reaching a second saturation point;
   A5) upon the second angular momentum of the reaction wheel about the first axis reaching the second saturation point, allowing the satellite to rotate about the first axis to reposition the drag flap in the plane perpendicular to the first axis at the first angle of rotation about the first axis so as to desaturate the second angular momentum of the reaction wheel about the first axis; and
   A6) repeating step A2).

7. The method of claim 6, wherein A1) comprises:
   deploying the drag flap such that the longitudinal axis of the drag flap is substantially parallel to a gravitational gradient.

8. The method of claim 1, wherein the satellite comprises a star tracker, a gyroscope, and a reaction wheel, and wherein B) comprises:
   B1) estimating a moment of inertia of the satellite and a moment of inertia of the reaction wheel;
   B2) applying a Kalman filter to the moment of inertia of the satellite from B1), the moment of inertia of the reaction wheel from B1), and a measurement vector to determine an attitude state of the satellite, wherein:
   the measurement vector comprises a star tracker output, a gyroscope output, and a reaction wheel angular velocity output;
   the attitude state of the satellite comprises an angular position of the satellite, an angular velocity of the satellite, a reaction wheel angular velocity, and a reaction wheel torque of the reaction wheel;
   B3) determining an angular acceleration of the satellite based on the angular velocity of the satellite determined in B2);
   B4) determining a net torque on the satellite as the product of the angular acceleration determined in B2) and the moment of inertia of the satellite determined in B1); and B5) determining the external torque to which the satellite is subjected during the orbit by subtracting the reaction wheel torque determined in B2) from the net torque determined in B4).

9. The method of claim 8, further comprising, between B1) and B2):
applying a first low-pass filter transfer function to the star tracker output to obtain a filtered star tracker output;
applying a second low-pass filter transfer function to the gyroscope output to obtain a filtered gyroscope output;
determining a time derivative of the filtered gyroscope output;
subtracting the filtered star tracker output from the time derivative of the filtered gyroscope output to obtain a bias estimate;
subtracting the bias estimate from the gyroscope output to obtain a corrected gyroscope output; and
using the corrected gyroscope output in the measurement vector in place of the gyroscope output.

10. The method of claim 8, wherein estimating the moment of inertia of the satellite and the moment of inertia of the reaction wheel in B1) comprises:
B1a) applying a first torque to the satellite;
B1b) measuring the gyroscope output as a function of time during B1a) to determine a first angular acceleration of the satellite;
B1c) measuring the reaction wheel angular velocity output as a function of time during B1a) to determine a first angular acceleration of the reaction wheel;
B1d) applying a second torque to the satellite, the second torque being substantially similar in magnitude with the first torque and in a direction substantially opposite to the first torque;
B1e) measuring the gyroscope output as a function of time during B1d) to determine a second angular acceleration of the satellite;
B1f) measuring the reaction wheel angular velocity output as a function of time during B1d) to determine a second angular acceleration of the reaction wheel;
B1g) dividing an average of the respective magnitudes of the first torque and the second torque applied in B1a) and B1d), respectively, by an average of the first angular acceleration determined of the satellite in B1b) and the second angular acceleration of the satellite determined in B1e) to estimate the moment of inertia of the satellite; and
B1h) dividing an average of the respective magnitudes of the first torque and the second torque applied in B1a) and B1d), respectively, by an average of the first angular acceleration determined of the reaction wheel in B1c) and the second angular acceleration of the reaction wheel determined in B1f) to estimate the moment of inertia of the satellite.

11. The method of claim 8, wherein the satellite comprises:
a bus; and
a drag flap coupled to the bus,
and wherein A) comprises:
A1) deploying the drag flap during the orbit to subject the satellite to a drag torque about a first axis passing through the bus of the satellite, the significant external torque comprising the drag torque.

12. The method of claim 11, wherein C) comprises:
C1) measuring a position and a velocity of the satellite;
C2) determining a solar radiation pressure torque and a gravity gradient torque from the position and the velocity measured in C1) and the attitude state in B2); and
C3) determining a drag torque applied to the satellite by subtracting the solar radiation pressure torque and the gravity gradient torque determined in C2) from the external torque measured in B).

13. The method of claim 8, wherein C) comprises:
C1) measuring a position and a velocity of the satellite;
C2) determining a solar radiation pressure torque and a gravity gradient torque from the position and the velocity measured in C1) and the attitude state in B2); and
C3) determining a drag torque applied to the satellite by subtracting the solar radiation pressure torque and the gravity gradient torque determined in C2) from the external torque measured in B).

14. The method of claim 1, wherein C) comprises:
C1) measuring a position and a velocity of the satellite;
C2) determining a solar radiation pressure torque and a gravity gradient torque from the position and the velocity measured in C1) and the attitude state in B2); and
C3) determining a drag torque applied to the satellite by subtracting the solar radiation pressure torque and the gravity gradient torque determined in C2) from the external torque measured in B).

15. The method of claim 1, wherein the satellite is a cubesat.

16. The method of claim 1, wherein in C), the estimated atmospheric density has a root mean square (RMS) error ranging between about $1 \times 10^{-13}$ kg/m$^3$ to about $2 \times 10^{-12}$ kg/m$^3$.

17. The method of claim 1, wherein in C), the estimated atmospheric density has a bandwidth ranging between about 0.03 min$^{-1}$ to about 1 min$^{-1}$.

18. A satellite, comprising:
a bus; and
a drag flap, coupled to the bus, to subject the satellite to a drag torque about a first axis passing through the bus of the satellite.

19. The satellite of claim 18, wherein the drag flap comprises:
a moment arm having a proximal coupled to the bus end and a distal end; and
a drag panel coupled to the distal end of the moment arm.

20. The satellite of claim 19, wherein:
the moment arm has a length such that a significant angular acceleration is generated about a first axis per unit drag force applied to the drag flap when the drag flap is deployed and the satellite is in orbit around the Earth; and
the moment arm has a natural frequency greater than about 1 min$^{-1}$.

21. The satellite of claim 18, wherein:
the drag flap has a proximal end coupled to the bus and a distal end;
the proximal end and the distal end of the drag flap define a longitudinal axis of the drag flap;
the drag flap is deployed such that the longitudinal axis is substantially parallel to a gravitational gradient.

22. The satellite of claim 18, wherein the bus comprises a reaction wheel, and wherein after the drag flap is deployed:
(A1) the reaction wheel applies a first torque to the satellite about the first axis to counteract an external torque to which the satellite is subjected so as to substantially mitigate rotation of the satellite about the first axis, the external torque comprising the significant drag torque.

23. The satellite of claim 22, wherein:
the drag flap has a proximal end coupled to the bus and a distal end;

the proximal end and the distal end of the drag flap define a longitudinal axis of the drag flap;

the drag flap is deployed such that the longitudinal axis of the drag flap is in a plane perpendicular to the first axis and is positioned at a first angle of rotation about the first axis, during A1), a first angular momentum of the reaction wheel about the first axis increases until reaching a first saturation point, and after A1):

A2) upon the first angular momentum of the reaction wheel about the first axis reaching the saturation point, the satellite is allowed to rotate about the first axis to reposition the drag flap in the plane perpendicular to the first axis at a second angle of rotation about the first axis so as to desaturate the first angular momentum of the reaction wheel about the first axis;

A3) the reaction wheel applies a second torque to the satellite about the first axis to counteract the external torque to which the satellite is subjected so as to substantially mitigate rotation of the satellite about the first axis, wherein during A3), a second angular momentum of the reaction wheel about the first axis increases until reaching a second saturation point;

A4) upon the second angular momentum of the reaction wheel about the first axis reaching the second saturation point, allowing the satellite to rotate about the first axis to reposition the drag flap in the plane perpendicular to the first axis at the first angle of rotation about the first axis so as to desaturate the second angular momentum of the reaction wheel about the first axis; and A5) repeating step A1).

24. The satellite of claim 18, wherein the bus comprises:
a reaction wheel to measure a reaction wheel angular velocity output;
a star tracker to measure a star tracker output;
a gyroscope to measure a gyroscope output; and
a global positioning system (GPS) receiver to measure a position and a velocity of the satellite.

25. The satellite of claim 24, wherein the bus further comprises:
a processor configured to:
B) determine the external torque to which the satellite is subjected during the orbit; and
C) estimate the atmospheric density proximate to the satellite based at least in part on the external torque determined in B).

26. The satellite of claim 25, wherein B) comprises:
B1) estimate a moment of inertia of the satellite and a moment of inertia of the reaction wheel;
B2) apply a Kalman filter to the moment of inertia of the satellite from B1), the moment of inertia of the reaction wheel from B1), and a measurement vector to determine an attitude state of the satellite, wherein:

the measurement vector comprises the star tracker output, the gyroscope output, and the reaction wheel angular velocity output;

the attitude state of the satellite comprises an angular position of the satellite, an angular velocity of the satellite, a reaction wheel angular velocity, and a reaction wheel torque of the reaction wheel;

B3) determine an angular acceleration of the satellite based on the angular velocity of the satellite determined in B2);

B4) determine a net torque on the satellite as the product of the angular acceleration determined in B2) and the moment of inertia determined in B1); and B5) determine the external torque to which the satellite is subjected during the orbit by subtracting the reaction wheel torque determined in B2) from the net torque determined in B4).

27. The satellite of claim 25, wherein C) comprises:
C1) measure the position and the velocity of the satellite;
C2) determining a solar radiation pressure torque and a gravity gradient torque from the position and the velocity measured in C1) and the attitude state in B2); and
C3) determining a drag torque applied to the satellite by subtracting the solar radiation pressure torque and the gravity gradient torque determined in C2) from the external torque measured in B).

28. The satellite of claim 18, wherein the satellite is a cubesat.

29. The satellite of claim 25, wherein the atmospheric density has a root mean square (RMS) error of ranging between about $1\times10^{-13}$ kg/m$^3$ to about $2\times10^{-12}$ kg/m$^3$.

30. The satellite of claim 25, wherein the atmospheric density has a bandwidth ranging between about 0.03 min$^{-1}$ to about 1 min$^{-1}$.

31. The satellite of claim 18, wherein the satellite is not coupled to a tracking system or a processor on the ground.

32. The satellite of claim 22, wherein the satellite does not include a magnetic torquer or a thruster to desaturate the reaction wheel.

33. A satellite, comprising:
a bus;
a deployable drag flap, coupled to the bus, to subject the satellite to a significant drag torque, about a first axis passing through the bus of the satellite, when the satellite is in an orbit around the Earth; and
a processor to:
determine the drag torque to which the satellite is subjected during the orbit; and
estimate an atmospheric density proximate to the satellite based at least in part on the drag torque.

* * * * *